(12) United States Patent
Kanamori et al.

(10) Patent No.: US 6,380,640 B1
(45) Date of Patent: Apr. 30, 2002

(54) METHOD OF CONTROLLING POWER OUTPUT APPARATUS

(75) Inventors: Akihiko Kanamori, Okazaki; Yasutomo Kawabata, Aichi-gun; Jiro Eto, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 26 days.

(21) Appl. No.: 09/664,961

(22) Filed: Sep. 18, 2000

(30) Foreign Application Priority Data

Oct. 7, 1999 (JP) .......................................... 11-287256

(51) Int. Cl.$^7$ ............................................... H02P 9/04
(52) U.S. Cl. ..................................... 290/40 C; 310/114
(58) Field of Search ............................... 290/40 C, 45, 290/38 R; 310/114, 112, 92, 78; 701/22, 113; 322/16; 180/65.2; 123/179.3

(56) References Cited

U.S. PATENT DOCUMENTS

| | | | | | |
|---|---|---|---|---|---|
| 5,708,314 A | * | 1/1998 | Law | ............................ | 310/103 |
| 5,730,676 A | * | 3/1998 | Schmidt | ...................... | 475/149 |
| 5,818,116 A | * | 10/1998 | Nakae et al. | ............. | 123/339.1 |
| 5,856,709 A | * | 1/1999 | Ibaraki et al. | ............... | 180/165 |
| 5,909,720 A | * | 6/1999 | Yamaoka et al. | ........ | 123/179.3 |
| 5,934,395 A | * | 8/1999 | Koide et al. | ................ | 180/65.2 |
| 6,018,199 A | * | 1/2000 | Shiroyama et al. | ...... | 123/179.3 |
| 6,018,694 A | * | 1/2000 | Egami et al. | .............. | 180/65.2 |
| 6,054,844 A | * | 4/2000 | Frank | ......................... | 180/65.2 |

* cited by examiner

Primary Examiner—Joseph Waks
(74) Attorney, Agent, or Firm—Oblon, Spivak, McClelland, Maier & Neustadt, P.C.

(57) ABSTRACT

A method of controlling a power output apparatus including an engine, a drive shaft, first and second electric motors and a coupling device is provided. When a hybrid vehicle starts from rest, ECU operates to run the vehicle in EV mode only by means of one of the electric motors. When the operating point of the drive shaft passes a boundary that separates the underdrive region from the overdrive region, and enters the overdrive region, fuel supply to the engine is started so as to start the engine, and the coupling device is controlled so that coupling of the rotary shaft of the second electric motor is switched from the first coupling state in which the rotary shaft is coupled with the drive shaft to the second coupling state in which the rotary shaft is coupled with the output shaft of the engine. After switching, the ECU operates to run the vehicle in HV mode, utilizing the engine and the first and second electric motors.

38 Claims, 25 Drawing Sheets

METHOD OF CONTROLLING POWER OUTPUT APPARATUS

INCORPORATION BY REFERENCE

The disclosure of Japanese Patent Application No. HEI 11-287256 filed on Oct. 7, 1999 including the specification, drawings and abstract is incorporated herein by reference in its entirety.

BACKGROUND OF THE INVENTION

1. Field of the Invention

The present invention relates to a method of controlling a power output apparatus including a prime mover, such as an engine, and an electric motor or motors, as power sources, and more particularly to a method of controlling such a power output apparatus that is provided with a coupling device capable of coupling a rotary shaft of the electric motor to at least one of a drive shaft and an output shaft of the prime mover.

2. Discussion of Related Art

In recent years, hybrid vehicles, such as that as disclosed in Japanese laid-open Patent Publication No. HEI 9-47094, have been proposed wherein a power output apparatus having an engine and an electric motor(s) as power sources is installed on the vehicle. In such a hybrid vehicle, the power output apparatus installed on the vehicle transmits a part of the power generated by the engine to a drive shaft through a power adjusting device, and converts the remaining power into electric power in a regenerative manner. The electric power may be stored in a battery, or used for driving the electric motor as a power source other than the engine. During the power transmitting process as described above, the power output apparatus controls the power adjusting device and the electric motor so as to output the power generated by the engine to the drive shaft at a desired rotation speed with desired torque. This makes it possible to operate the engine with a high operating efficiency by selecting an appropriate engine operating point, irrespective of the required output to be transmitted from the drive shaft, and therefore the hybrid vehicle is excellent in terms of energy saving or resource conservation and exhaust emission control, as compared with a conventional vehicle having only an engine as a power source.

In the power output apparatus as described above, the rotary shaft of the electric motor may be coupled to the drive shaft or the output shaft of the engine. In a first coupling state in which the rotary shaft of the electric motor is coupled to the drive shaft, so-called power circulation, or transmission of power from the downstream side to the upstream side, occurs during overdrive operations (overdrive running) in which the rotation speed of the drive shaft is higher than the engine speed, with a result of a reduced amount of power being generated by the engine and effectively transmitted to the drive shaft. Thus, the power output apparatus placed in the above coupling state exhibits a higher operating efficiency during underdrive operations (underdrive running) in which the rotation speed of the drive shaft is lower than the engine speed, as compared with the operating efficiency during overdrive operation. In a second coupling state in which the rotary shaft of the electric motor is coupled to the output shaft of the engine, on the other hand, the power effectively transmitted to the drive shaft is reduced due to the above-described power circulation occurring during underdrive operations (underdrive running). Thus, the power output apparatus exhibits a higher operating efficiency during overdrive operations (overdrive running), as compared with that during underdrive operations (underdrive running).

In view of the above situations, a power output apparatus has been proposed which is capable of switching the coupling state of the rotary shaft of the electric motor, namely, coupling the rotary shaft to a selected one of the drive shaft and the output shaft of the engine, and an example of such an apparatus is disclosed in Japanese laid-open Patent Publication No. HEI 10-271749. The power output apparatus of this type includes a first clutch that permits coupling and uncoupling of the rotary shaft of the electric motor to and from the output shaft of the engine, and a second clutch that permits coupling and uncoupling of the rotary shaft of the electric motor to and from the drive shaft. Where the rotation speed of the drive shaft becomes lower than the engine speed (during underdrive running), the first clutch is released while the second clutch is engaged or applied, so that the rotary shaft of the electric motor is coupled to the drive shaft. Where the rotation speed of the drive shaft becomes higher than the engine speed (during overdrive running), on the other hand, the first clutch is engaged while the second clutch is released, so that the rotary shaft of the electric motor is coupled to the output shaft of the engine. In this manner, the power output apparatus operates with a sufficiently high efficiency during both underdrive operations and overdrive operations.

In the following description, the coupling state in which the rotary shaft of the electric motor is coupled to the drive shaft will be called "underdrive (UD) coupling", and the coupling state in which the rotary shaft of the electric motor is coupled to the output shaft of the engine will be called "overdrive (OD) coupling".

In the hybrid vehicle on which the power output apparatus as described above is installed, the coupling state of the rotary shaft of the electric motor is changed in the following manner depending upon running conditions of the vehicle.

When the vehicle is started from its rest state, the vehicle is always started while UD coupling is established, so that the drive shaft can generate a large driving torque. With UTD coupling thus established, the sum of the torque from the engine and the torque from the electric motor is applied as driving torque to the drive shaft.

While the vehicle is running at a high-speed, on the other hand, OD coupling is established so as to reduce loss in the power output apparatus (i.e., loss in the engine, electric motor, power adjusting device and others), and improve the fuel economy during high-speed running.

When the vehicle starts from rest with UTD coupling established as described above, the vehicle keeps running only by means of the electric motor, without starting the engine. More specifically, the electric motor produces driving torque to be applied to the drive shaft, using electric power stored in a battery. With this arrangement, the vehicle is able to run without using a low-speed operating region in which the engine operates with a poor efficiency, thus assuring improved fuel economy.

Here, the mode in which the vehicle runs only by means of the electric motor without using the engine will be called "EV mode" (or "EV running"), and the mode in which the engine is started and the vehicle runs using both the engine and the electric motor will be called "HV mode" (or "HV running").

FIG. 26 is a diagram showing operating patterns in which a hybrid vehicle starts from its rest state. In FIG. 26, the vertical axis indicates torque, and the horizontal axis indicates rotation speed. FIG. 26 shows operating characteristics of a power output apparatus.

In FIG. 26, curve LIM is the maximum output line of the power output apparatus. Accordingly, a region defined by the vertical axis indicating the torque, the horizontal axis indicating the rotation speed, and the curve LIM indicates a range in which the operating point of the drive shaft can be located, namely, the operating region of the power output apparatus. The operating point is expressed as a combination of the torque and the rotation speed.

The curve EL is an operating line used when determining the target operating point of the engine. The engine exhibits the highest efficiency on this operating line EL, and the engine operates with optimum fuel economy if the target operating point of the engine is determined according to this operating line EL.

In general, the operating line of the engine is a boundary on which the engine speed and the rotation speed of the drive shaft are equal to each other. Accordingly, the engine operates with the rotary shaft of the electric motor held in the OD coupling state in a region in which the torque is higher than the operating line EL, and operates with the rotary shaft held in the UD coupling state in a region in which the torque is lower than the operating line EL. The region in which the torque is lower than the operating line EL will be hereinafter called "overdrive region" ("OD region"), and the region in which the torque is higher than the operating line EL will be called "underdrive region" ("UD region"). Also, the operating line EL may be called "UD/OD region boundary" when appropriate.

In FIG. 26, curve ESU is an engine start judgement line based on which it is determined whether the engine should be started or not. In general, the engine is at rest or stopped when the operating point of the drive shaft lies in a region on the lower left-hand side of the engine start judgement line ESU, and the engine is started with fuel supplied to the engine when the operating point of the drive shaft passes the engine start judgement line ESU and enters a region on the upper right-hand side of the judgement line ESU. In this case, therefore, the engine is started under an engine start condition that the operating point of the drive shaft lies in the upper right-hand region with respect to the engine start judgement line ESU.

Each of curve DL1 and curve DL2 represents a path followed by the operating point of the drive shaft when the vehicle starts from its rest state and runs.

In FIG. 26, "DD" denotes a curve on which the running resistance is equal to 0%. Each of P1~P6 denote curves at which power is equal to a certain value. The curves P1~P6 are plotted so that the power increases in the order of P1, P2, . . . P5, P6.

The curve DL1 and the curve DL2 represent two different cases in which the vehicle starts from its rest state and runs in their respective manners. In either case, the vehicle starts from rest with the rotating shaft of the electric motor held in the UD coupling state, as described above. Also, when the vehicle starts from rest, the engine is not started, and the vehicle runs in the EV mode (EV running) only by means of the electric motor.

In the case of curve DL1, the driver of the vehicle depresses an accelerator pedal by a large degree after the start of the vehicle, with a result of an increased required power to be generated by the engine, whereby the operating point of the drive shaft passes the engine start judgement line ESU (namely, the engine start condition is satisfied). As a result, fuel is supplied to the engine so as to start the engine, and the vehicle runs in the HV mode (HV running) using both the engine and the electric motor. If the vehicle is further accelerated until the operating point of the drive shaft passes the engine operating line (i.e., UD/OD region boundary) EL, and enters from the UD region into the OD region, the coupling state of the rotary shaft of the electric motor switches from UD coupling to OD coupling. A method of switching the coupling state of the rotary shaft of the electric motor from UD coupling to OD coupling during HV running of the vehicle is disclosed in, for example, Japanese laid-open Patent Publication No. HEI 10-271749.

In the case of curve DL2, on the other hand, the vehicle is started, and then runs in the EV mode only by means of the electric motor while it is being accelerated at a low rate. In this case, the operating point of the drive shaft does not pass the engine start judgement line ESU, and therefore the vehicle is kept running in the EV mode with the engine being at rest. If the vehicle is then accelerated, the operating point of the drive shaft leaves the UD region, passes the operating line of the engine (i.e., the UD/OD region boundary) EL, and enters the OD region. If the vehicle is further accelerated, the operating point of the drive shaft passes the engine start judgement line ESU within the OD region (namely, satisfies the engine start condition).

As described above, the operation in the case where the operating point of the drive shaft passes the UD/OD region boundary EL and enters from the UD region into the OD region during HV running of the vehicle is disclosed in the above-identified publications. However, none of the above-identified publications discloses the operation in the case where the vehicle is accelerated so that the operating point of the drive shaft passes the UD/OD region boundary EL and enters the OD region from the UD region during EV running, and where the engine start condition is subsequently satisfied, as in the case of curve DL2. Thus, substantially no consideration had been conventionally given to the case as indicated by curve DL2.

SUMMARY OF THE INVENTION

It is therefore an object of the present invention to provide a method of controlling a power output apparatus that is able to switch the coupling state of a rotary shaft of an electric motor and start the engine in appropriate timing in the case where the operating point of the drive shaft enters from a UD region into an OD region during EV running, and where the engine start condition is subsequently started.

To accomplish at least a part of the above object, the present invention provides a first method of controlling a power output apparatus which includes an engine including an output shaft, a drive shaft that outputs power, a power adjusting device that includes a first electric motor and is coupled with the output shaft and the drive shaft, the power adjusting device being capable of adjusting at least the power transmitted to the drive shaft by means of the first electric motor, a second electric motor having a rotary shaft, and a coupling device operable to couple the rotary shaft of the second electric motor to at least one of the drive shaft and the output shaft, the power output apparatus having an operating region represented by the relationship between the torque and the speed of rotation, the operating region being divided by a predetermined boundary into a first region in which the rotary shaft of the second electric motor is coupled with the drive shaft, and a second region in which the rotary shaft of the second electric motor is coupled with the output shaft, the method comprising the steps of: (a) operating the second electric motor while keeping the engine stopped when an operating point of the drive shaft lies in the first region and the rotary shaft of the second electric motor is coupled with the drive shaft through the coupling device; and (b) when the operating point of the drive shaft passes the boundary and enters the second region, starting fuel supply to the engine so as to start the engine, while at the same time switching coupling of the rotary shaft of the second electric motor from a first coupling state in which the rotary shaft is coupled with the drive shaft, to a second coupling state in which the rotary shaft is coupled with the output shaft of the engine.

In the first control method as described above, when the operating point of the drive shaft passes the predetermined boundary and enters the second region while operating the second electric motor with the engine being stopped, fuel begins to be supplied to the engine so as to start the engine, and the coupling device is caused to switch coupling of the rotary shaft of the second electric motor from the first coupling state with the drive shaft to the second coupling state with the output shaft of the engine.

According to the first control method, therefore, the drive shaft is initially rotated by operating only the second electric motor, and, when the operating point of the drive shaft enters from the first region into the second region, the rotary shaft of the second electric motor is immediately coupled to the output shaft of the engine, so that the drive shaft can be rotated by operating both the engine and the second electric motor.

Suppose that the above-indicated boundary is the operating line of the engine, and the first region is the UD region as described above, while the second region is the OD region, and that the power output apparatus as described above is used for running a motor vehicle. In this case, when the operating point of the drive shaft enters the OD region from the UD region while the vehicle is running in the EV mode using only the second electric motor, the rotary shaft of the second electric motor is brought into the OD coupling state in which the rotary shaft is coupled with the drive shaft, and both the engine and the second electric motor are operated so as to run the vehicle in the HV mode.

In one preferred form of the first control method of the present invention, the process (b) includes the steps of: starting fuel supply to the engine so as to start the engine when the operating point of the drive shaft passes the boundary and enters the second region; controlling the first electric motor and the engine so that the rotation speed and torque of the output shaft of the engine become substantially equal to those of the drive shaft after the engine is started; and causing the coupling device to switch coupling of the rotary shaft of the second electric motor from the first coupling state with the drive shaft to the second coupling state with the output shaft, after the rotation speed and torque of the output shaft become substantially equal to those of the drive shaft.

Since coupling of the rotary shaft of the second electric motor is switched to the second coupling state after the rotation speed and torque of the output shaft are made substantially equal to those of the drive shaft after the start of the engine, the switching operation can be accomplished without suffering from any shock.

In the present specification, the statement that "the rotation speed and torque of the output shaft are made substantially equal to those of the drive shaft" should be interpreted to include the case where a difference in the rotation speed between the output shaft and the drive shaft falls within a certain allowable range, and the case where a difference in the torque between the output shaft and the drive shaft falls within a certain allowable range.

In another preferred form of the first control method of the present invention, the above-indicated step (b) includes the steps of: controlling the first electric motor and the engine so that the rotation speed and torque of the output shaft become substantially equal to those of the drive shaft when the operating point of the drive shaft passes the boundary and enters the second region; causing the coupling device to switch coupling of the rotary shaft of the second electric motor from the first coupling state with the drive shaft to the second coupling state with the output shaft, after the rotation speed and torque of the output shaft become substantially equal to those of the drive shaft; and starting fuel supply to the engine so as to start the engine after switching to the second coupling state in which the rotary shaft of the second electric motor is coupled with the output shaft.

Since coupling of the rotary shaft of the second electric motor is switched to the second coupling state after the rotation speed and torque of the output shaft of the engine are made substantially equal to those of the drive shaft, the switching operation can be accomplished without suffering from any shock. Also, the speed of rotation of the engine does not rapidly increase upon coupling of the rotary shaft of the second electric motor with the output shaft since the speed of rotation of the output shaft has already increased to about the rotation speed of the drive shaft. This makes it possible to suppress torque variations and vibration that would otherwise occur due to a rapid increase in the engine speed. In addition, a coupling device having a small coupling capacity or capability (i.e., such a coupling device that is able to couple two elements having a small difference in the maximum speed of rotation) may be used as the above-indicated coupling device for switching coupling of the rotary shaft of the second electric motor. Furthermore, coupling of the rotary shaft of the second electric motor is switched before the start of the engine, and therefore the switching operation can be smoothly accomplished without being affected by variations in the torque and rotation speed that would occur immediately after the start of the engine.

In the present specification, the statement that "the rotation speed of the output shaft is made substantially equal to that of the drive shaft" should be interpreted to include the case where a difference in the rotation speed between the output shaft and the drive shaft falls within a certain allowable range.

The present invention also provides a second method of controlling the power output apparatus as described above, comprising the steps of: (a) operating the second electric motor while keeping the engine stopped so that the second electric motor outputs driving torque to the drive shaft when an operating point of the drive shaft lies in the first region and the rotary shaft of the second electric motor is coupled with the drive shaft through the coupling device; (b) causing the coupling device to switch coupling of the rotary shaft of the second electric motor from a first coupling state in which the rotary shaft is coupled with the drive shaft, to a second coupling state in which the rotary shaft is coupled with the output shaft of the engine, when the operating point of the drive shaft passes the boundary and enters the second region; and (c) after switching to the second coupling state in which the rotary shaft of the second electric motor is coupled with the output shaft of the engine, causing the first electric motor to output driving torque to the drive shaft, instead of the second electric motor, while causing the second electric motor to cancel reactive torque generated by the first electric motor at the output shaft.

In the second control method as described above, when the operating point of the driving shaft passes the above-indicated boundary and enters the second region while the second electric motor is operating to output driving torque to the drive shaft with the engine stopped, coupling of the rotary shaft of the second electric motor is switched from the first coupling state with the drive shaft to the second coupling state with the output shaft of the engine. After the switching, the first electric motor operates to output driving torque to the drive shaft, and the second electric motor operates to cancel reactive torque that is generated by the first electric motor at the output shaft.

According to the second control method, coupling of the rotary shaft of the second electric motor is switched from the first coupling state with the drive shaft to the second coupling state with the output shaft when the operating point of the drive shaft enters from the first region into the second region. In this case, driving torque can be still outputted by the electric motor with the engine stopped, though the first electric motor, rather than the second electric motor, outputs the driving torque to the drive shaft.

Suppose that the above-indicated boundary is the operating line of the engine, and the first region is the UD region as described above, while the second region is the OD region, and that the power output apparatus as described above is used for running a motor vehicle. In this case, even when the operating point of the drive shaft enters the OD region from the UD region, the vehicle that has been running in the EV mode using the second electric motor continues to run in the EV mode, using the first electric motor.

In one preferred form of the second control method of the present invention, the step (b) comprises the steps of: controlling the first electric motor so that the rotation speed and torque of the output shaft become substantially equal to those of the drive shaft when the operating point of the drive shaft passes the boundary and enters the second region; and causing the coupling device to switch coupling of the rotary shaft of the second electric motor from the first coupling state with the drive shaft to the second coupling state with the output shaft, after the rotation speed and torque of the output shaft become substantially equal to those of the drive shaft.

The present invention also provides a third method of controlling the power output apparatus as described above, comprising the steps of: (a) operating the second electric motor while keeping the engine stopped when an operating point of the drive shaft lies in the first region and the rotary shaft of the second electric motor is coupled with the drive shaft through the coupling device; (b) when the operating point of the drive shaft passes the boundary and enters the second region, keeping the rotary shaft of the second electric motor coupled with the drive shaft through the coupling device, and operating the second electric motor while keeping the engine stopped; and (c) when a target power to be outputted from the drive shaft satisfies a predetermined condition, starting fuel supply to the engine so as to start the engine, and causing the coupling device to switch coupling of the rotary shaft of the second electric motor from a first coupling state in which the rotary shaft is coupled with the drive shaft, to a second coupling state in which the rotary shaft is coupled with the output shaft of the engine.

In the third control method as described above, even when the operating point of the drive shaft passes the above-indicated boundary and enters the second region while the second electric motor is being operated with the engine stopped, the coupling device maintains coupling of the rotary shaft of the second electric motor with the drive shaft, and the second electric motor continues to be operated with the engine stopped. When the target power to be outputted from the drive shaft subsequently satisfies a predetermined condition, fuel begins to be supplied to the engine so as to start the engine, and the coupling device is caused to switch coupling of the rotary shaft of the second electric motor from the first coupling state with the drive shaft to the second coupling state with the output shaft of the engine.

According to the third control method, switching of the rotary shaft of the second electric motor does not take place while the second electric motor is being operated with the engine stopped, even if the operating point of the drive shaft enters from the first region into the second region. Accordingly, the drive shaft can be smoothly rotated over a wide range of the speed of rotation, without causing torque variations and vibration that would otherwise occur upon switching. When the target power subsequently satisfies the predetermined condition, the rotary shaft of the second electric motor is immediately coupled to the output shaft of the engine so that the operating state in which the drive shaft is rotated only by means of the second electric motor is shifted to the operating state in which the drive shaft is rotated by operating both the engine and the second electric motor.

Suppose that the above-indicated boundary is the operating line of the engine, and the first region is the UD region as described above, while the second region is the OD region, and that the power output apparatus as described above is used for running a motor vehicle. In this case, while the vehicle is running in the EV mode with only the second electric motor operated, the coupling of the rotary shaft of the second electric motor is not switched to OD coupling even when the operating point of the drive shaft enters from the UD region into the OD region. Thus, the control method of the present invention can assure smooth EV running of the vehicle over a wide vehicle speed range, without causing any torque variation and vibration. If the target power subsequently satisfies the predetermined condition, the coupling state of the rotary shaft of the second electric motor is switched to OD coupling, and the EV running of the vehicle can be immediately switched to the HV running.

In one preferred form of the third control method of the present invention, the step (c) comprises the steps of: starting fuel supply to the engine so as to start the engine when the target power satisfies the predetermined condition; controlling the first electric motor and the engine so that the rotation speed and torque of the output shaft of the engine become substantially equal to those of the drive shaft after the engine is started; and causing the coupling device to switch coupling of the rotary shaft of the second electric motor from the first coupling state to the second coupling state, after the rotation speed and torque of the output shaft become substantially equal to those of the drive shaft.

Since coupling of the rotary shaft of the second electric motor is switched to the second coupling state after the rotation speed and torque of the output shaft are made substantially equal to those of the drive shaft after the start of the engine, the switching operation can be accomplished without suffering from any shock.

In another preferred form of the third control method of the present invention, the step (c) comprises the steps of: controlling the first electric motor so that the rotation speed of the output shaft of the engine becomes substantially equal to that of the drive shaft when the target power satisfies the predetermined condition; causing the coupling device to switch coupling of the rotary shaft of the second electric motor from the first coupling state to the second coupling state, after the rotation speed of the output shaft of the engine becomes substantially equal to that of the drive shaft; and starting fuel supply to the engine so as to start the engine after switching to the second coupling state in which the rotary shaft of the second electric motor is coupled with the rotary shaft.

Since coupling of the rotary shaft of the second electric motor is switched in the manner as described above, the switching operation can be accomplished without suffering from any shock. Also, the speed of rotation of the engine does not rapidly increase upon coupling of the rotary shaft of the second electric motor with the output shaft, and therefore torque variations and vibration can be suppressed or prevented. Furthermore, a coupling device having a small coupling capacity or capability can be used as the coupling device of the power output apparatus. Moreover, coupling of the rotary shaft of the second electric motor is switched before the start of the engine, and therefore the switching operation can be smoothly accomplished without being affected by variations in the torque and rotation speed that would occur immediately after the start of the engine.

Preferably, the third control method of the present invention further includes the step of: (d) causing the coupling device to switch coupling of the rotary shaft of the second electric motor from the first coupling state with the drive shaft to the second coupling state with the output shaft when the rotation speed of the rotary shaft of the second electric motor exceeds a predetermined particular speed.

In the third control method as described above, while the second electric motor is operating with the engine stopped, the rotary shaft of the second electric motor is kept coupled with the drive shaft with no switching of coupling states even when the operating point of the drive shaft enters from the first region into the second region. It is, however, to be noted that the speed of rotation of the second electric power is limited to be equal to or lower than a permissible maximum speed, which makes it difficult to increase the speed of rotation of the drive shaft to be higher than the permissible maximum speed since the rotation speed of the drive shaft is limited by the second electric motor. If the above-indicated predetermined particular speed is set to be equal to or lower than the permissible maximum speed, for example, coupling of the rotary shaft of the second electric motor is switched from the first coupling state with the drive shaft to the second coupling state with the output shaft when the rotation speed of the rotary shaft of the second electric motor exceeds the particular speed, so that the rotation speed of the drive shaft is no longer limited or restricted by the second electric motor. This makes it possible to increase the rotation speed of the drive shaft to be higher than the permissible maximum speed.

In one preferred form of the third control method of the present invention, the above-indicated step (d) comprises the steps of: controlling the first electric motor so that the rotation speed of the output shaft of the engine becomes substantially equal to that of the drive shaft when the rotation speed of the rotary shaft of the second electric motor exceeds the predetermined speed; and causing the coupling device to switch coupling of the rotary shaft of the second electric motor from the first coupling state with the drive shaft to the second coupling state with the output shaft after the rotation speed of the output shaft becomes substantially equal to that of the drive shaft.

Since coupling of the rotary shaft of the second electric motor is switched in the manner as described above, the switching operation can be accomplished without suffering from any shock. Also, the speed of rotation of the engine does not rapidly increase upon coupling of the rotary shaft of the second electric motor with the output shaft, and therefore torque variations and vibration can be suppressed or prevented. Furthermore, a coupling device having a small coupling capacity or capability can be used as the coupling device of the power output apparatus.

The present invention also provides a fourth method of controlling the power output apparatus as described above, comprising the steps of: (a) operating the second electric motor while keeping the engine stopped when an operating point of the drive shaft lies in the first region and the rotary shaft of the second electric motor is coupled with the drive shaft through the coupling device; (b) keeping the rotary shaft of the second electric motor coupled with the drive shaft through the coupling device, and operating the second electric motor while keeping the engine stopped, when the operating point of the drive shaft passes the boundary and enters the second region; (c) controlling the first electric motor so that the rotation speed of the output shaft of the engine becomes substantially equal to that of the drive shaft when the operating point of the drive shaft passes the boundary and enters the second region; and (d) when a target power to be outputted from the drive shaft satisfies a predetermined condition after the rotation speed of the output shaft of the engine is made substantially equal to that of the drive shaft, starting fuel supply to the engine so as to start the engine, and causing the coupling device to switch coupling of the rotary shaft of the second electric motor from a first coupling state in which the rotary shaft is coupled with the drive shaft, to a second coupling state in which the rotary shaft is coupled with the output shaft of the engine.

In the fourth control method as described above, when the operating point of the drive shaft passes the above-indicated boundary and enters the second region while the second electric motor is being operated with the engine stopped, the coupling device maintains coupling of the rotary shaft of the second electric motor with the drive shaft, and the second electric motor continues to be operated with the engine stopped. In the meantime, the first electric motor is controlled so that the rotation speed of the output shaft becomes substantially equal to that of the drive shaft. When the target power to be outputted from the drive shaft satisfies a predetermined condition after the rotation speed of the output shaft is made substantially equal to that of the drive shaft, fuel supply to the engine is started thereby to start the engine, and the coupling device is caused to switch coupling of the rotary shaft of the second electric motor from the first coupling state with the drive shaft to the second coupling state with the output shaft of the engine.

According to the fourth control method, switching of the rotary shaft of the second electric motor does not take place while the second electric motor is being operated with the engine stopped, even if the operating point of the drive shaft enters from the first region into the second region. Accordingly, the drive shaft can be smoothly rotated over a wide range of its rotation speed, without causing torque variations and vibration that would otherwise occur upon switching. Also, the rotation speed of the output shaft is controlled to be substantially equal to that of the drive shaft when the operating point of the drive shaft enters the second region. When the target power subsequently satisfies the predetermined condition, therefore, it takes only a moment to start the engine and switch coupling of the rotary shaft of the second electric motor, so that both the engine and the second electric motor can immediately operate to rotate the drive shaft.

Suppose that the above-indicated boundary is the operating line of the engine, and the first region is the UD region as described above, while the second region is the OD region, and that the power output apparatus as described above is used for running a motor vehicle. In this case, while the vehicle is running in the EV mode with only the second electric motor operated, the coupling of the rotary shaft of the second electric motor is not switched to OD coupling even when the operating point of the drive shaft enters from the UD region into the OD region. Thus, the control method of the present invention can assure smooth EV running of the vehicle over a wide vehicle speed range, without causing any torque variation and vibration. Also, the rotation speed of the output shaft of the engine is made substantially equal to that of the drive shaft when the operating point of the drive shaft enters the OD region. When the target power satisfies the predetermined condition, therefore, the engine can be instantly started, and coupling of the rotary shaft of the second electric motor can be instantly switched, so that the vehicle can immediately start running in the HV mode, thus assuring improved response of the driving torque of the vehicle to an acceleration demand operation of the driver.

In one preferred form of the fourth control method of the present invention, the step (d) comprises the steps of: starting fuel supply to the engine so as to start the engine when the target power satisfies the predetermined condition; and causing the coupling device to switch coupling of the rotary shaft of the second electric motor from the first coupling state with the drive shaft to the second coupling state with the output shaft after the engine is started.

Since the rotation speed of the output shaft is controlled to be substantially equal to that of the drive shaft after the operating point of the drive shaft enters the second region, the rotation speed of the output of the engine has already been made substantially equal to that of the drive shaft when the target power satisfies the predetermined condition. Accordingly, coupling of the rotary shaft of the second electric motor can be switched immediately after the start of the engine, without causing any shock upon switching.

In another preferred form of the fourth control method of the present invention, the step (d) comprises the steps of: causing the coupling device to switch coupling of the rotary shaft of the second electric motor from the first coupling state with the drive shaft to the second coupling state with the output shaft when the target power satisfies the predetermined condition; and starting fuel supply to the engine so as to start the engine after switching to the second coupling state in which the rotary shaft of the second electric motor is coupled with the output shaft.

Since the rotation speed of the output shaft is controlled to be substantially equal to that of the drive shaft after the operating point of the drive shaft enters the second region, coupling of the rotary shaft of the second electric motor can be switched any time without suffering from any shock. Also, the speed of rotation of the engine does not rapidly increase, and torque variations and vibration can be suppressed. Furthermore, a coupling device having a small coupling capacity or capability may be used as the coupling device of the power output apparatus. Moreover, coupling of the rotary shaft of the second electric motor is switched before the start of the engine, and therefore the switching operation can be smoothly accomplished without being affected by variations in the torque and rotation speed that would occur immediately after the start of the engine.

Preferably, the fourth control method of the present invention further comprises the step of: (e) causing the coupling device to switch coupling of the rotary shaft of the second electric motor from the first coupling state with the drive shaft to the second coupling state with the output shaft when the rotation speed of the rotary shaft of the second electric motor exceeds a predetermined particular speed.

In the fourth control method as well as the third control method, while the second electric motor is operating with the engine stopped, the rotary shaft of the second electric motor is kept coupled with the drive shaft with no switching of coupling states even when the operating point of the drive shaft enters from the first region into the second region. In this case, the speed of rotation of the drive shaft is limited or restricted by the second electric motor, and it is thus impossible to increase the rotation speed of the drive shaft to be higher than the permissible maximum speed of the second electric motor. In view of this situation, coupling of the rotary shaft of the second electric motor is switched from the first coupling state with the drive shaft to the second coupling state with the output shaft when the rotation speed of the rotary shaft of the second electric motor exceeds the particular speed, so that the rotation speed of the drive shaft can be increased to be higher than the permissible maximum speed of the second motor.

The present invention also provides a fifth method of controlling the power output apparatus as described above, comprising the steps of: (a) operating the second electric motor while keeping the engine stopped when an operating point of the drive shaft lies in the first region and the rotary shaft of the second electric motor is coupled with the drive shaft through the coupling device; and (b) causing the coupling device to switch from a first coupling state in which the rotary shaft of the second electric motor is coupled with the drive shaft, to a second coupling state in which the rotary shaft is coupled with the output shaft of the engine, when the rotation speed of the rotary shaft of the second electric motor exceeds a predetermined particular speed.

In the fifth control method as described above, if the rotation speed of the rotary shaft of the second electric motor exceeds the particular speed where the rotary shaft of the second electric motor is coupled with the drive shaft, the coupling device is caused to switch coupling of the rotary shaft of the second electric motor from the first coupling state with the drive shaft to the second coupling state with the output shaft of the engine.

Since the rotation speed of the second electric motor is limited to be equal to or lower than the permissible maximum speed, the rotation speed of the drive shaft, which is restricted by the second electric motor, cannot be increased to be higher than the permissible maximum speed of the second motor if the rotary shaft of the second electric motor is kept coupled with the drive shaft. For example, the above-indicated particular speed is set to be equal to or lower than the permissible maximum speed. In this case, when the rotation speed of the rotary shaft of the second electric motor exceeds the particular speed, coupling of the rotary shaft of the second electric motor is switched from the first coupling state with the drive shaft to the second coupling state with the output shaft, so that the rotation speed of the drive shaft is no longer restricted or limited by the second electric motor, and thus is allowed to be increased to be higher than the permissible maximum speed.

In any of the first through fifth control methods of the present invention, when the coupling device switches coupling of the rotary shaft of the second electric motor from the first coupling state with the drive shaft to the second coupling state with the output shaft of the engine, the coupling device may couple the rotary shaft of the second electric motor to the output shaft of the engine while maintaining coupling of the rotary shaft of the second electric motor with the drive shaft, and subsequently uncouple the rotary shaft of the second electric motor from the drive shaft.

In the manner as described above, the rotary shaft of the second electric motor is coupled to the output shaft of the engine while being kept coupled with the drive shaft, so that the drive shaft and the output shaft can be mechanically directly coupled to each other. With this arrangement, the second electric motor is able to keep outputting driving torque to the drive shaft even during switching of coupling until the rotary shaft of the second electric motor is uncoupled or disengaged from the drive shaft.

In any of the first through third control methods of the present invention, in which coupling of the rotary shaft of the second electric motor is switched after the engine is started, the coupling device may initially uncouple the rotary shaft of the second electric motor from the drive shaft, and subsequently couple the rotary shaft of the second electric motor to the output shaft when the coupling device switches coupling of the rotary shaft of the second electric motor from the first coupling state with the drive shaft to the second coupling state with the output shaft of the engine.

Where the engine has already been started, the engine may operate to output driving torque to the drive shaft through the power output apparatus even if the rotary shaft of the second electric motor is uncoupled from the drive shaft. Thus, the rotary shaft of the second electric motor may be coupled to the output shaft after being uncoupled or disengaged from the drive shaft.

In any of the first through fifth control methods of the present invention, the power adjusting device may include, as the first electric motor, a doubled-rotor motor including a first rotor coupled to the output shaft and a second rotor coupled to the drive shaft, or may include a planetary gear train in addition to the first electric motor, which planetary gear train includes three rotary shafts that are respectively coupled to the output shaft, the drive shaft, and the rotary shaft of the first electric motor.

Thus, the power adjusting device may employ an electrically distributed type structure, using the doubled-rotor electric motor, or a mechanically distributed type structure, using planetary gears and others.

The present invention as explained above is applied to a method of controlling a power output apparatus. It is, however, possible to construct the present invention in the form of the power output apparatus itself that employs the control method, or various apparatuses, such as hybrid vehicles, on which such a power output apparatus is installed.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF THE PREFERRED EMBODIMENTS

Some non-limiting preferred embodiments of the present invention will be described in detail with reference to the drawings.

(1) Construction of Power Output Apparatus

Figure 1:
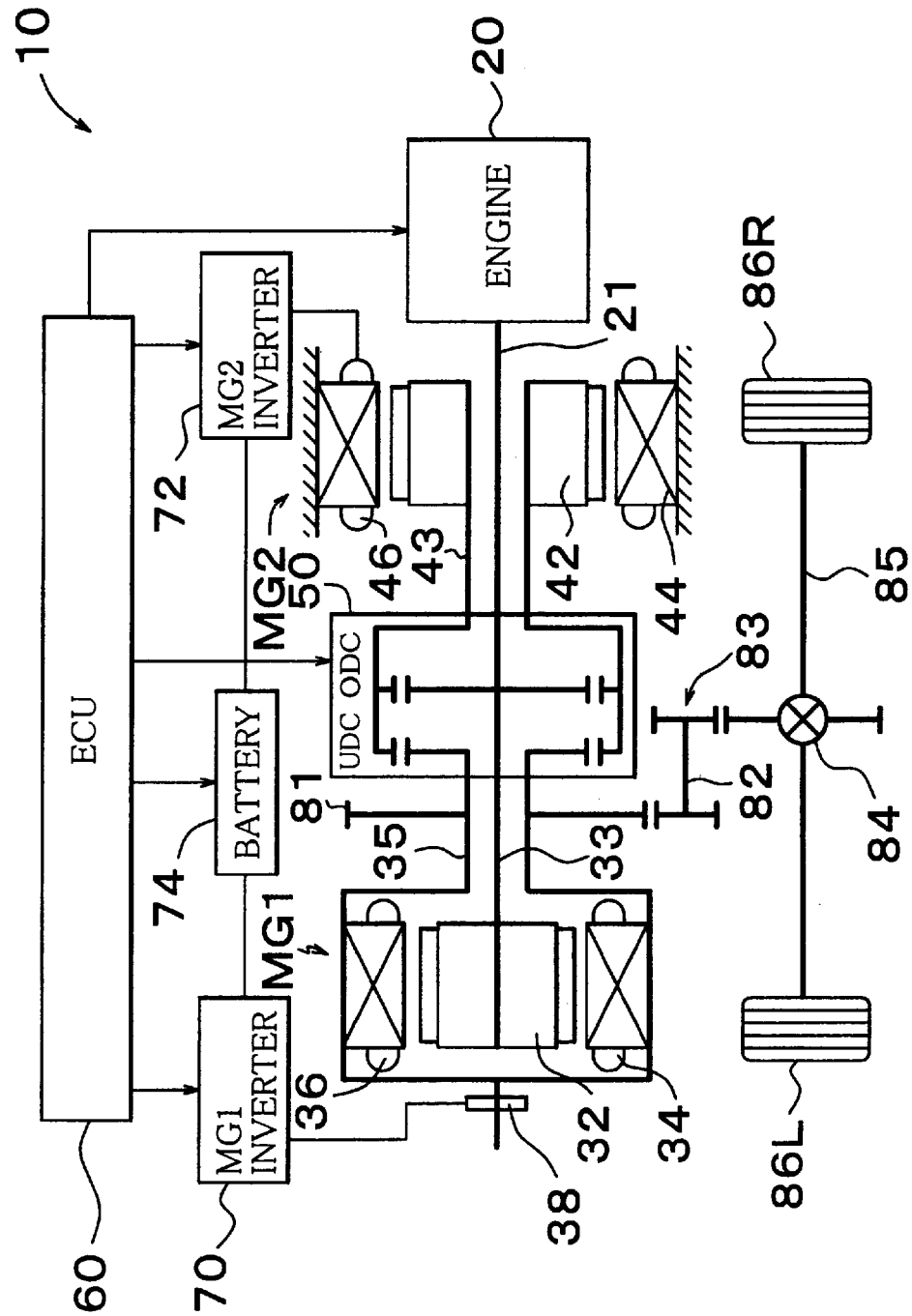
FIG. 1 is a view schematically showing the construction of a hybrid vehicle on which is installed a power output apparatus to which the control method of the present invention is applied.

Referring to FIG. 1, the construction of a power output apparatus that employs a control method of the present invention will be initially explained. FIG. 1 schematically shows the construction of a hybrid vehicle on which the power output apparatus employing the control method of the present invention is installed.

The power output apparatus 10 mainly includes an engine 20, motor MG1, motor MG2, switchable clutch assembly 50, ECU (Electronic Control Unit) 60, MG1 inverter 70, MG2 inverter 72, and a battery 74.

The ECU 60 operates to control the operating or driving state of the hybrid vehicle. The ECU 60 is a one-chip microcomputer incorporating CPU, ROM, RAM and other components, and is constructed such that the CPU performs various control operations as described later, according to programs stored in the ROM. To the ECU 60 are electrically connected an accelerator pedal position sensor for detecting the amount of depression of an accelerator pedal (not shown), various sensors (not shown) for detecting the operating states of the engine 20 and motors MG1, MG2, a sensor for detecting the current state of the battery 74, and the like. The ECU 60 performs the above control operations based on signals received from these sensors.

The engine 20 may be an ordinary gasoline engine, and operates to rotate a crankshaft 21 as an output shaft of the engine.

The operations of the engine 20 are controlled by the ECU 60. The ECU 60 mainly controls the opening of a throttle valve (not shown) disposed in the engine 20, the amount of fuel injected, the timing of opening/closing of intake and exhaust valves (not shown), and so forth.

Main components provided between the crankshaft 21 of the engine 20 and a transmission shaft 82 that outputs power for driving axles 85 include motor MG1 consisting of a doubled-rotor electric motor, motor MG2 consisting of an ordinary electric motor, and switchable clutch assembly 50 for switching or changing the coupling state of a rotor shaft 43 of the motor MG2.

Of the above-indicated components, the motor MG1 is basically constructed as a synchronous motor using a permanent magnet, but is different from ordinary electric motors in that a member around which a three-phase coil for generating a magnetic field is wound is not a stator fixed to the case, but a rotor that can be freely rotated. Namely, the motor MG1 includes an inner rotor 32 that is equivalent to a rotor of an ordinary motor, and an outer rotor 34 around which the three-phase coil 36 is wound, and the outer motor 34 as well as the inner rotor 32 can be freely rotated. The electric motor thus constructed is called "doubled-rotor motor" as stated above. Such a doubled-rotor motor, in which the outer rotor 34 provided with the three-phase coil 36 is also rotated, requires a mechanism for supplying electric power to the rotating coil 36. While the power output apparatus 10 is provided with a slip ring 38 serving as this mechanism for supplying power to the three-phase coil 36, the slip ring 38 may be replaced by other types of components, such as a differential transformer. In operation, the inner rotor 32 and the outer rotor 34 of the motor MG1 rotate relative to each other due to the interaction of a magnetic field generated by the permanent magnet provided in the inner rotor 32 and a magnetic field formed by the three-phase coil 36 provided in the outer rotor 34. Since the above-described interaction is reversible, the motor MG1 may operate as a generator, and electric power corresponding to a difference in the rotation speeds of the two rotors may be regenerated from the motor MG1.

An inner rotor shaft 33 is coupled to the inner rotor 32 of the motor MG1, and an outer rotor shaft 35 as a drive shaft is coupled to the outer rotor 34. The inner rotor shaft 33 is coupled with the crankshaft 21 through a damper (not shown). The outer rotor shaft 35 is coupled with the transmission shaft 82 via an output gear 81. The transmission shaft 82 is in turn coupled with the axles 85 provided with drive wheels 86R, 86L, via reduction gears 83 and differential gears 84.

Since the inner rotor 32 and the outer rotor 34 are both rotatable, the motor MG1 is able to transmit power from one of the inner rotor shaft 33 and outer rotor shaft 35 to the other. Although the motor MG1 itself cannot change the magnitude of torque according to the law of action and reaction, the rotation speed of the other shaft increases if the rotor MG1 operates as an electric motor for power running, and the resulting power (=rotation speed×torque) outputted from the other shaft increases. If the motor MG1 operates as a generator for regenerative running, the rotation speed of the other shaft is lowered, and electric power (=difference in the rotation speed×torque) corresponding to a difference in the rotation speed between the inner and outer rotor shafts 33, 35 is taken out or retrieved. Namely, the use of the motor MG1 makes it possible to take out a part of power as electric power, while transmitting the remaining power. If neither power running nor regenerative running is performed, the motor MG1 is placed in a state in which no power is transmitted. This operating state is equivalent to a state in which a mechanical clutch is released, and therefore the doubled-rotor motor may also be called "clutch motor".

In the meantime, the motor MG2 is constructed as a synchronous motor using a permanent magnet, like the motor MG1. In the power output apparatus 10, the permanent magnet is provided on the side of the rotor 42, and a three-phase coil 46 is provided on the side of the stator 44. The stator 44 of the motor MG2 is fixed to the case, and the rotor 42 is coupled with a hollow rotor shaft 43. The inner rotor shaft 33 coupled with the crankshaft 21 extends through the hollow rotor shaft 43 along the axis thereof.

The MG1 inverter 70 and MG2 inverter 72 connected to the battery 74 are provided for driving the above-described motor MG1 and motor MG2. The MG1 inverter 70 is a transistor inverter including a plurality of transistors as switching devices, and is electrically connected to the ECU 60. When the ECU 60 controls the ON/OFF time of the transistors of the MG1 inverter 70 through PWM (Pulse Width Modulation), three-phase alternating current flows between the battery 74 and the three-phase coil 36 wound around the outer rotor 34 of the motor MG1, through the MG1 inverter 70 and the slip ring 38 connected to the battery 74 and the coil 36, respectively. Owing to the flow of the three-phase alternating current, a rotating magnetic field is formed at the outer rotor 34, and rotation of the motor MG1 is controlled. In this manner, electric power stored in the battery 74 may be used for power running of the motor MG1, or electric power regenerated from the motor MG1 may be stored in the battery 74.

The motor MG2, on the other hand, is connected to the battery 74 via the MG2 inverter 72. The MG2 inverter 72 also consists of a transistor inverter, and is connected to the ECU 60 to operate under the control of the ECU 60. When transistors of the MG2 inverter 72 are switched on/off in response to a control signal from the ECU 60, three-phase alternating current flows through the three-phase coil 46 wound around the stator 44, to thus form a rotating magnetic field, whereby the motor MG2 is rotated. Needless to say, the motor MG2 is also capable of performing regenerative operations.

The switchable clutch assembly 50 is able to couple the rotor shaft 43 of the motor MG2 to at least one of the outer rotor shaft 35 and inner rotor shaft 33 of the motor MG1. The switchable clutch assembly 50 includes an underdrive clutch UDC and an overdrive clutch ODC. The rotor shaft 43 of the motor MG2 is coupled to the outer rotor shaft 35 of the motor MG1 when the underdrive clutch UDC is engaged, and the rotor shaft 43 is uncoupled from the outer rotor shaft 35 when the underdrive clutch UDC is released. On the other hand, the rotor shaft 43 of the motor MG2 is coupled to the inner rotor shaft 33 of the motor MG1 when the overdrive clutch ODC is engaged, and the rotor shaft 43 is uncoupled from the inner rotor shaft 33 when the overdrive clutch ODC is released. These clutches UDC, ODC may be operated by a hydraulic circuit that is not illustrated in the figure.

As described above, the UD coupling is established when the underdrive clutch UDC is engaged and the rotor shaft 43 of the motor MG2 is coupled to the outer rotor shaft 35 of the motor MG1. When the overdrive clutch ODC is engaged, and the rotor shaft 43 of the motor MG2 is coupled to the inner rotor shaft 33 of the motor MG1, the rotor shaft 43 is coupled to the crankshaft 21 of the engine 20 through the inner rotor shaft 33 and damper, and therefore the OD coupling is established. The switchable clutch assembly 50 permits both the underdrive clutch UDC and overdrive clutch ODC to be placed in the engaged state. In this case, the rotor shaft 43 of the motor MG1 is coupled to both of the outer rotor shaft 35 and inner rotor shaft 33 of the motor MG1. With this arrangement, the outer rotor shaft 35 of the motor MG1 and the crankshaft 21 of the engine 20 (the inner rotor shaft 33 of the motor MG1) are mechanically connected directly with each other through the switchable clutch assembly 50. To the contrary, the underdrive clutch UDC and overdrive clutch ODC may also be both placed in the released state. In this case, the rotor shaft 43 of the motor MG2 is uncoupled or disengaged from both the outer rotor shaft 35 of the motor MG1 and the crankshaft 21 of the engine 20 (the inner rotor shaft 33 of the motor MG1).

The ECU 60 controls the switchable clutch assembly 50 in the manner as described later depending upon the running conditions of the hybrid vehicle, so that the rotor shaft 43 of the motor MG2 is coupled to a selected one or both of the outer rotor shaft 35 and the inner rotor shaft 33 of the motor MG1.

The power output apparatus 10 as shown in FIG. 1 employs the motor MG1 in the form of a doubled-rotor motor as a power adjusting device for increasing or reducing the power received from the engine 20, by conversion to electric power and transmitting the resulting power, and distribution of the power is achieved by slippage between the inner rotor 32 and outer rotor 34 of the motor MG1. A part of the power from the engine 20 is directly transmitted in mechanical form to the outer rotor shaft 35 as the drive shaft through the motor MG1, and another part of the power is taken out as electric power from the motor MG1 due to slipping or relative rotation of the two rotors 32, 34. The electrical energy taken out from the motor MG1 may be stored in the battery 74, or may be supplied to the motor MG2 as the other motor, to be used for increasing the torque of the outer rotor shaft 35 as the drive shaft. Thus, the power output apparatus 10 is able to freely control power to be transmitted to the outer rotor shaft 35, by means of the engine 20 that generates power, motor MG1 that converts the power into electric power or vice versa through slipping rotation of two rotors, and the motor MG2 capable of power running and regenerative running.

(2) Basic Operation of Power Output Apparatus

Next, the basic operation of the power output apparatus as shown in FIG. 1 will be described in which the power transmitted from the engine 20 is converted into a combination of the required rotation speed and the required torque, and then outputted to the outer rotor shaft 35 as the drive shaft. In the power output apparatus as shown in FIG. 1, the manner of the above conversion differs depending upon the relationship between the rotation speed Ne of the engine 20 and the rotation speed Nd of the outer rotor shaft 35 of the motor MG1, and the coupling state of the rotor shaft 43 of the motor MG2.

Initially, the case where the rotation speed Nd of the outer rotor shaft 35 as the drive shaft is smaller than the rotation speed Ne of the engine 20 will be explained. In the case of an underdrive operation in which the rotation speed Nd of the outer rotor shaft 35 is smaller than the rotation speed Ne of the engine 20, the ECU 60 controls the switchable clutch assembly 50 to engage the underdrive clutch UDC and release the overdrive clutch ODC to thus establish UD coupling, so as to avoid reduction in the operating efficiency of the power output apparatus 10 due to occurrence of power circulation.

Figure 2:
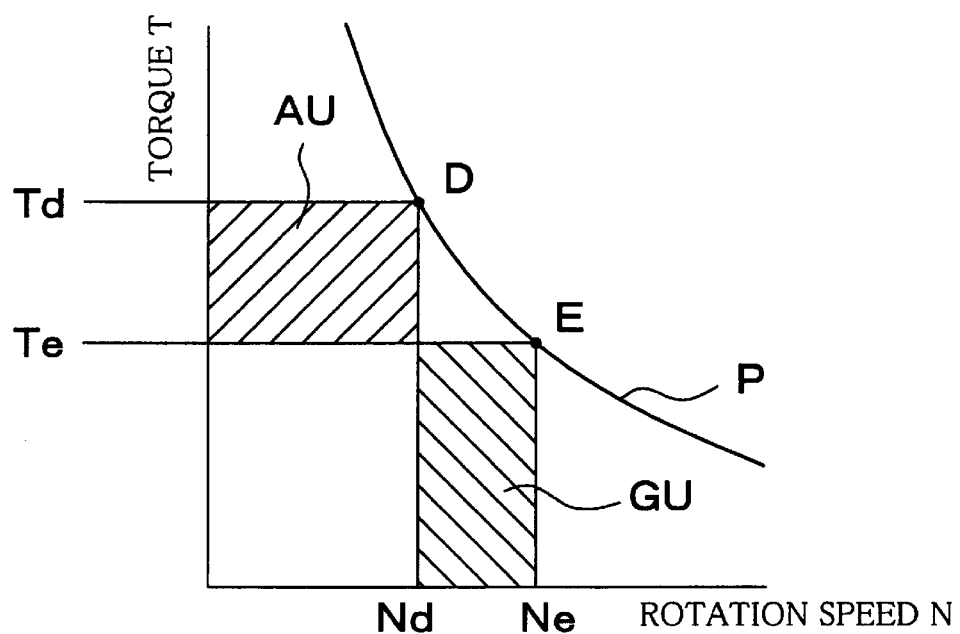
FIG. 2 is a graph useful in explaining the manner of conversion of torque during UD coupling.

FIG. 2 shows the manner of conversion of the torque in the above case. In FIG. 2, the horizontal axis indicates the rotation speed N, and the vertical axis indicates the torque T, while "E" represents an operating point of the engine 20 and "D" represents an operating point of the outer rotor shaft 35. Curve P is plotted in FIG. 2 such that the power, namely, the product of rotation speed and torque, is constant on the curve P. There will be now considered the case where power E generated with a torque Te by the engine 20 is converted into power D with a torque Td higher than the torque Te, and the resulting power D is outputted from the outer rotor shaft 35.

Where the conversion as shown in FIG. 2 is performed, the rotation speed Nd of the outer rotor shaft 35 is smaller than the rotation speed Ne of the engine 20. Since the outer rotor of the motor MG1 rotates at the rotation speed Nd, while the inner rotor rotates at rotation speed Ne that is higher than Nd, the motor MG1 as a whole rotates in a reverse direction, and the rotation speed Nmg1 of the motor MG1 becomes a negative value. The torque Tmg1 of the motor MG1 is a positive value that is equal to the output torque Te of the engine 20 according to the law of action and reaction. Namely, the motor MG1 operates to transmit a part of the power generated by the engine 20 to the outer rotor shaft 35 as the drive shaft, while regenerating the rest of the power as electric power. In this case, the electric power obtained as a result of regeneration is equal to the product of the rotation speed Nmg1 of the motor MG1 and the torque Tmg1, which is equal to the area of a hatched region GU in FIG. 2.

In the meantime, the torque Td of the outer rotor shaft 35 is larger than the torque Te of the engine 20. Accordingly, the motor MG2 is operated with a positive torque Tmg2 at a positive rotation speed Nmg2. Namely, electric power is supplied to the motor MG2 for power running. The electric power supplied at this time is equal to the rotation speed Nmg2 of the motor MG2 and the torque Tmg2, which is equal to the area of a hatched region AU in FIG. 2. Assuming that both of the motors (MG1, MG2) operate at an efficiency of 100%, the electric power regenerated by the motor MG1 is equal to the electric power supplied to the motor MG2. Namely, the motor MG1 takes out a quantity of energy that corresponds to the region GU in the form of electric power, which is then supplied to the motor MG2 as a quantity of energy that corresponds to the region AU, so that the power represented by the operating point E of the engine 20 is converted into the state of the operating point D. Since the operating efficiency is less than 100% in reality, the above-described conversion is realized by taking electric power out of the battery 74, or causing the engine 20 to generate excess power equivalent to the loss in power transmission. In the conversion as described above, the electric power regenerated by the motor MG1 located on the upstream side is supplied to the motor MG2 located on the downstream side, and therefore no power circulation takes place, with a result of no reduction in the operating efficiency of the power output apparatus 10.

In the UD coupling, the operating points of the motor MG1 and motor MG2 are determined as follows, so as to accomplish the above-described conversion.

Rotation speed Nmg1 of the motor MG1=Nd−Ne

Torque Tmg1=Te

Rotation speed Nmg2 of the motor MG2=Nd

Torque Tmg2=Td−Te                                                (1)

Next, the case where the rotation speed Nd of the outer rotor shaft 35 is higher than the rotation speed Ne of the engine 20 will be explained. In the case of an overdrive operation in which the rotation speed Nd of the outer rotor shaft 35 is higher than the rotation speed Ne of the engine 20, the ECU 60 controls the switchable clutch assembly 50 to release the underdrive clutch UDC and engage the overdrive clutch ODC to thus establish OD coupling, so as to avoid reduction in the operating efficiency of the power output apparatus 10 due to occurrence of power circulation.

Figure 3:
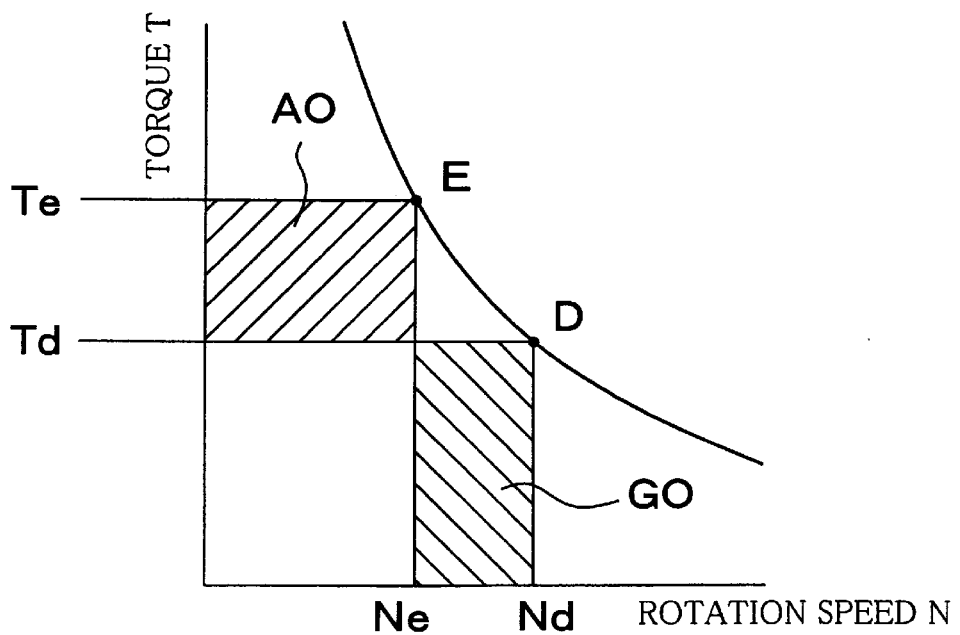
FIG. 3 is a graph useful in explaining the manner of conversion of torque during OD coupling.

FIG. 3 shows the manner of conversion of the torque in the above case. Where the conversion as shown in FIG. 3 is performed, the rotation speed Nd of the outer rotor shaft 35 is higher than the rotation speed Ne of the engine 20. Accordingly, the motor MG1 rotates at a positive rotation speed Nmg1 with a positive torque Tmg1. Namely, electric power is supplied to the motor MG1 for power running. In this case, the electric power supplied to the motor MG1 is equal to the product of the rotation speed Nmg1 of the motor MG1 and the torque Tmg1, which is equal to the area of a hatched region GO in FIG. 3. In the meantime, the torque Td of the outer rotor shaft 35 is smaller than the torque Te of the engine 20. Accordingly, the motor MG2 is operated with a negative torque Tmg2 at a positive rotation speed Nmg2. Namely, the motor MG2 performs a regenerative operation. The electric power obtained as a result of regeneration is equal to the product of the rotation speed Nmg2 of the motor MG2 and the torque Tmg2, which is equal to the area of a hatched region AO in FIG. 2. Assuming that both of the motors (MG1, MG2) operate at an efficiency of 100%, the electric power regenerated by the motor MG2 is equal to the electric power supplied to the motor MG1. In the conversion as described above, the electric power regenerated by the motor MG2 located on the upstream side is supplied to the motor MG1 located on the downstream side, and therefore no power circulation takes place, with a result of no reduction in the operating efficiency of the power output apparatus 10.

In the OD (overdrive) coupling, the operating points of the motor MG1 and motor MG2 are determined as follows, so as to accomplish the above-described conversion.

Rotation speed Nmg1 of the motor MG1=Nd−Ne

Torque Tmg1=Td

Rotation speed Nmg2 of the motor MG2=Ne

Torque Tmg2=Td−Te                                                (2)

As explained above, the power output apparatus 10 as shown in FIG. 1 is able to convert power generated by the engine 20 into power as a combination of required rotation speed and required torque, in a selected manner depending upon the relationship between the rotation speed Ne of the engine 20 and the rotation speed Nd of the outer rotor shaft 35 of the motor MG1, and the coupling state of the rotor shaft 43 of the motor MG2. The power output apparatus 10 then outputs the power resulting from the conversion, from the outer rotor shaft 35 as the drive shaft.

(3) Method of Controlling Power Output Apparatus

In the following, a method of controlling the power output apparatus according to the present invention will be explained. The control method of the present invention is applied when the hybrid vehicle on which the power output apparatus 10 as shown in FIG. 1 is installed starts from a stopped or rest state, and is accelerated at a low rate, namely, runs at a small acceleration. More specifically, the control is intended mainly for the case where the operating point of the drive shaft enters an OD region from an UD region while the vehicle is running in the EV mode with UD coupling, or the case where an engine start condition is subsequently satisfied.

As described above, the control method of the present invention includes the first through fifth control methods, which will be briefly explained as follows.

First control method: when the operating point of the drive shaft enters from the UD region into the OD region, fuel begins to be supplied to the engine, so as to start the engine, and at the same time switching from UD coupling to OD coupling is effected.

Second control method: when the operating point of the drive shaft enters from the UD region into the OD region, switching from UD coupling to OD coupling is effected while the vehicle keeps running in the EV mode.

Third control method: Switching from UD coupling to OD coupling is not effected even when the operating point of the drive shaft enters from the UD region into the OD region, and the vehicle keeps running in the EV mode with the UD coupling maintained. When a certain engine start condition is subsequently satisfied, fuel begins to be supplied to the engine, to thereby start the engine, and at the same time switching from UD coupling to OD coupling is effected.

Fourth control method: Switching from UD coupling to OD coupling is not effected even when the operating point of the drive shaft enters from the UD region into the OD region, and the vehicle keeps running in the EV mode with the UD coupling maintained. When the operating point enters the OD region from the UD region, however, the rotation speed of the output shaft of the engine is controlled to be substantially equal to the rotation speed of the drive shaft (engine follow-up control). If a certain engine start condition is subsequently satisfied, fuel begins to be supplied to the engine to thereby start the engine, and switching from UD coupling to OD coupling is effected.

Fifth control method: Switching from UD coupling to OD coupling is not effected even when the operating point of the drive shaft enters from the UD region into the OD region, and the vehicle keeps running in the EV mode with the UD coupling maintained. When the rotation speed of the motor MG2 then exceeds a particular rotation speed, switching from UD coupling to OD coupling is effected.

The first through fifth control methods of the present invention will be now explained one by one in their respective embodiments with reference to the drawings.

(4) First Control Method

Figure 4:
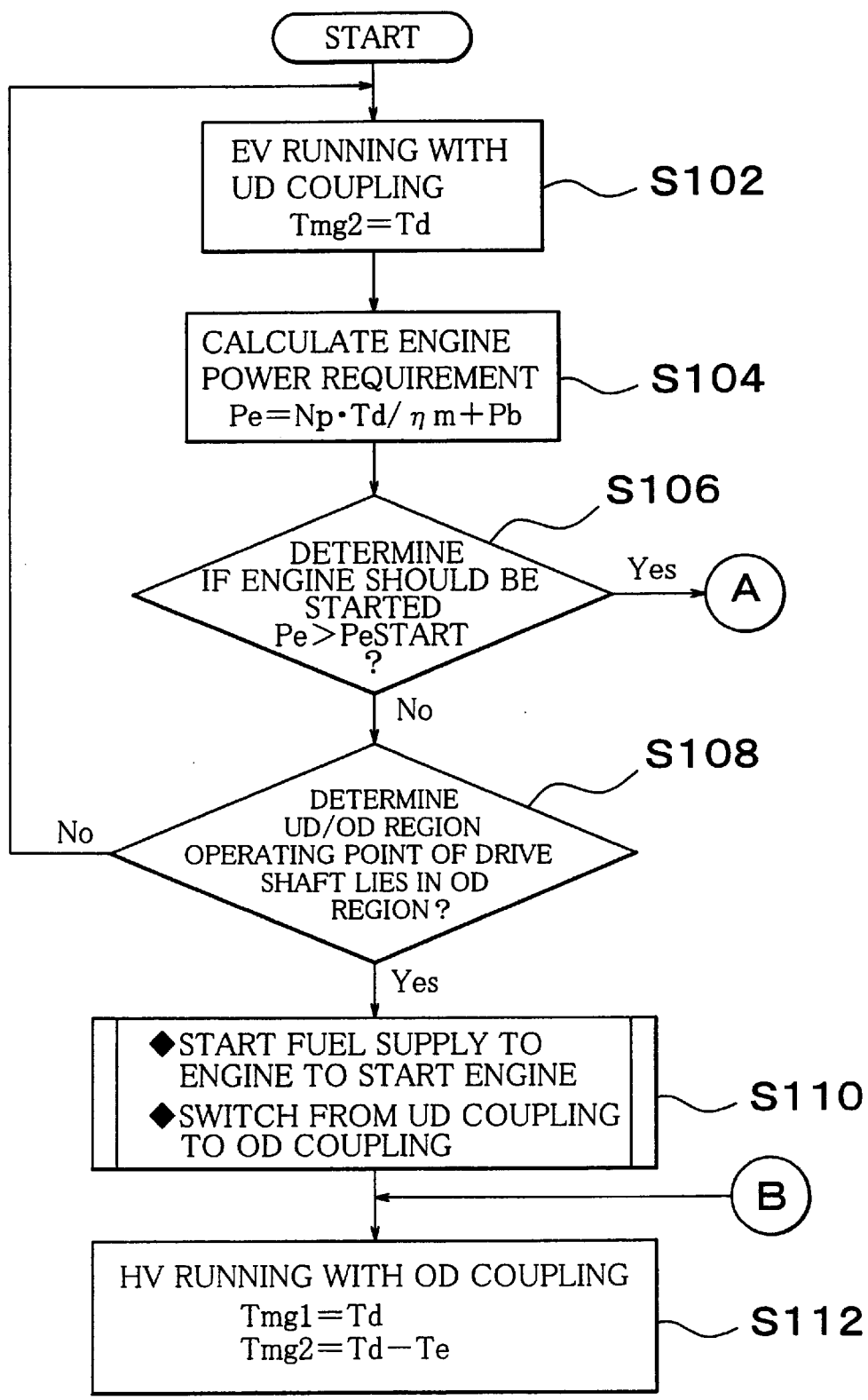
FIG. 4 is a flowchart showing a control routine of the first embodiment according to the first control method of the present invention.
Figure 5:
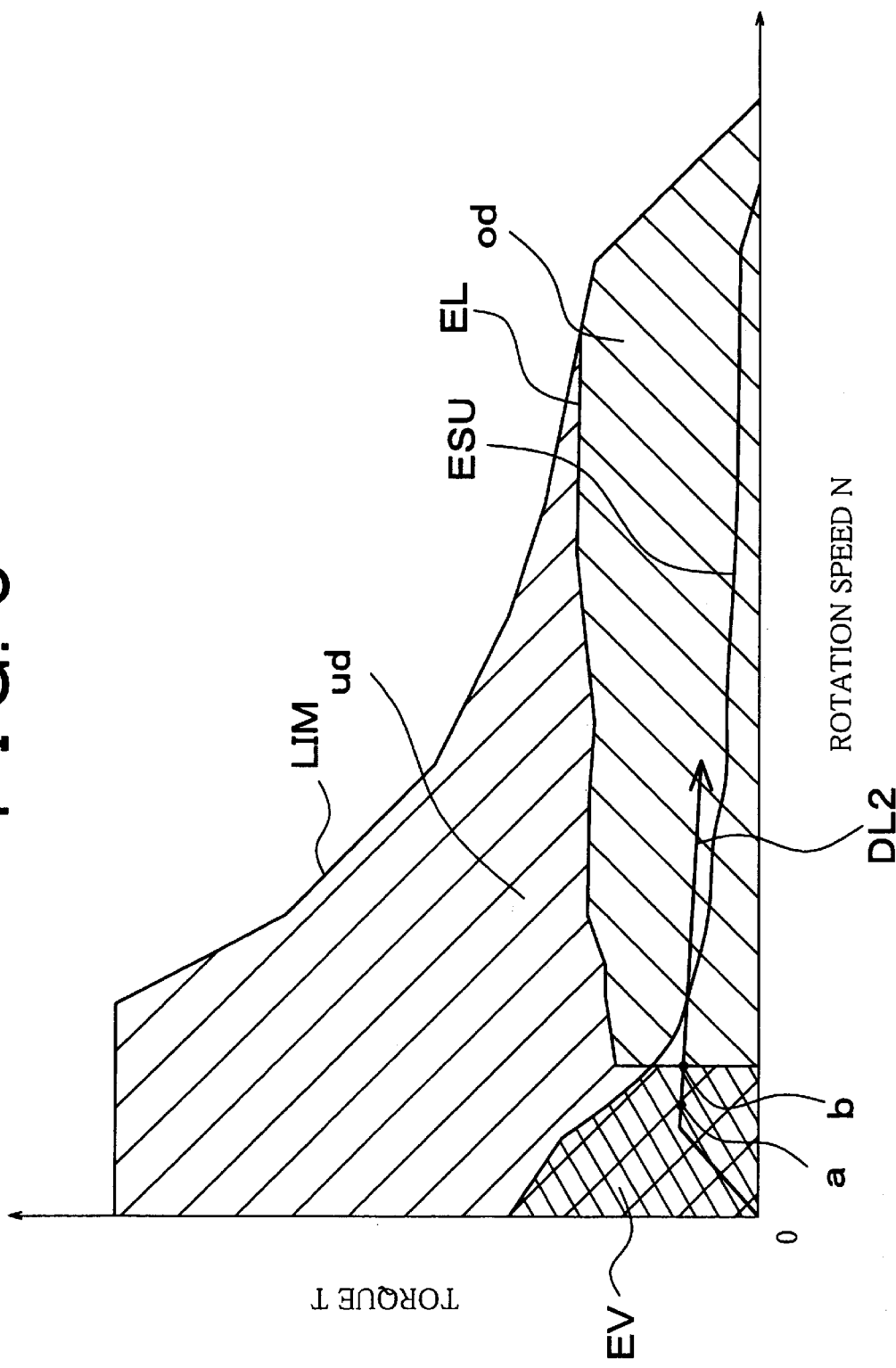
FIG. 5 is a diagram showing EV running region, UD coupling region and OD coupling region when the first control method of the present invention is employed.

FIG. 4 is a flowchart showing a control routine of the first embodiment according to the first control method of the present invention. FIG. 5 is a diagram showing "EV running region", "UD coupling region", and "OD coupling region" when the first control method of the present invention is employed.

Figure 26:
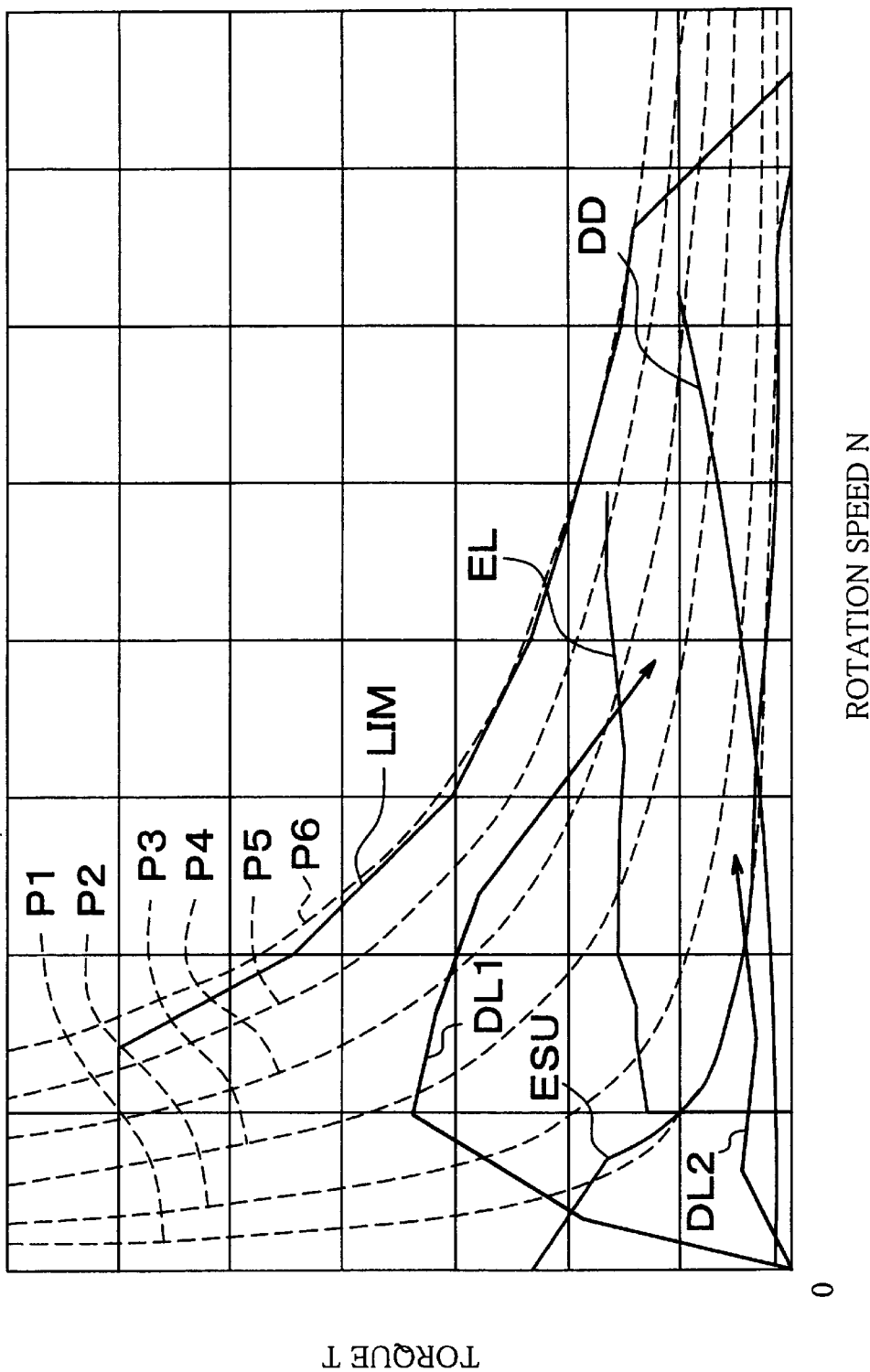
FIG. 26 is a diagram showing operating patterns when a hybrid vehicle starts from rest.

In FIG. 5, the vertical axis, horizontal axis, and respective curves represent the same parameters or contents as those of FIG. 26, and therefore will not be explained herein. In addition, "EV" in FIG. 5 denotes an EV running region in which the hybrid vehicle runs in the EV mode, "ud" denotes a UD coupling region in which UD coupling is actually established, and "od" denotes an OD coupling region in which OD coupling is actually established. As described above, the region on the higher-torque side of the engine operating line EL is called "UD region", and the region on the lower-torque side of the engine operating line EL is called "OD region", while the engine operating line EL itself is called "UD/OD region boundary". It is, however, to be noted that the UD coupling region and OD coupling region as indicated above are different from the UD region and OD region, respectively. In the first control method, however, these UD and OD coupling regions coincide with the UD and OD regions, respectively.

In the present embodiment, the ECU 60 performs a control operation according to the control routine as shown in FIG. 4 during a period in which the vehicle starts from rest and is accelerated at a low rate. During this period, the operating point of the outer rotor shaft 35 of the motor MG1 as the drive shaft follows a path as indicated by curve DL2 in FIG. 5.

When the vehicle starts from rest, the ECU 60 initially executes step S102 to start the vehicle with UD coupling (i.e., with the rotor shaft 43 of the motor MG2 being coupled with the outer rotor shaft 35 of the motor MG1), without starting the engine 20, and run the vehicle in the EV mode only using the motor MG2. More specifically, the ECU 60 controls the switchable clutch assembly 50 to engage the underdrive clutch UDC, so that the rotor shaft 43 of the motor MG2 is coupled with the outer rotor shaft 35 of the motor MG1 as the drive shaft, to thus establish UD coupling. At this time, the overdrive clutch ODC is released.

The ECU 60 does not control the engine 20, and keeps the engine 20 stopped. Also, the ECU 60 controls the MG1 inverter 70 to bring all of the transistors in the MG1 inverter 70 into the OFF state, thereby to zero the torque Tmg1 of the motor MG1. Furthermore, the ECU 60 controls the MG2 inverter 72 to operate the motor MG2 so that the torque Tmg2 of the motor MG2 becomes substantially equal to a target torque Td of the drive shaft.

Since the engine 20 is stopped, and the torque Te of the engine is equal to zero, so the torque Tmg1 of the motor MG1 and the torque Tmg2 of the motor MG2 during UD coupling need to be controlled according to the following expressions (3), as is apparent from the above-indicated expressions (1).

$$Tmg1=0$$
$$Tmg2=Td \tag{3}$$

Consequently, the torque Tmg2 generated by the motor MG2 is transmitted to the outer rotor shaft 35 as the drive shaft, through the rotor shaft 43 and the switchable clutch assembly 50, and the outer rotor shaft 35 outputs a driving torque that is substantially equal to the target torque Td of the drive shaft. The driving torque is then transmitted to the drive wheels through the output gears 81, transmission shaft 82, reduction gears 83, differential gears 84 and axles 85 in this order, to thus cause the vehicle to run in the EV mode only by means of the motor MG2.

The target torque Td of the drive shaft as described above is determined in advance by the ECU 60. More specifically, the ECU 60 reads the amount of depression of an accelerator pedal (not shown) from an accelerator pedal position sensor (not shown), calculates a required torque that is demanded by the driver, based on the amount of depression, and determines the target torque Td of the drive shaft to be generated by the outer rotor shaft 35 as the drive shaft, based on the required torque.

The ECU 60 then executes step S104 to read the rotation speed Nd of the outer rotor shaft 35 as the drive shaft, and calculate power (engine power requirement) Pe to be generated by the engine 20 according to the following expression (4), using the rotation speed Nd of the drive shaft and the previously obtained target torque Td of the drive shaft.

$$Pe = Nd \cdot Td / \eta nm + Pb \tag{4}$$

In the above expression (4), "ηm" is motor unit efficiency representing the efficiency of the motors MG1, MG2. The value of "ηm" ranges from 0 to 1, and the efficiency is 100% when "ηm" is equal to 1. It is, however, to be noted that "ηm" may be the efficiency of either of the motors MG1, MG2. "Pb" is a battery charge/discharge required value. More specifically, "Pb" is a feedback value for use in charging or discharging the battery 74 depending upon the current state of the battery 74. The battery 74 will be charged when "Pb" is a positive (+) value, and discharged when "Pb" is a negative (−) value.

The ECU 60 then executes step S106 to make an engine start judgement, namely, judge whether the engine 20 should be started or not, based on the engine power requirement Pe calculated in step S104. More specifically, the ECU 60 compares the engine power requirement Pe with a predetermined threshold value PeSTART (fixed value), and determines that the engine 20 should be started when the engine power requirement Pe is larger than the threshold value PeSTART. Namely, Pe>PeSTART is an engine start condition. If the ECU 60 determines that the engine 20 should be started, the control flow goes to "A" to start a routine of FIG. 9 that will be described later.

If the engine power requirement Pe is smaller than the threshold value PeSTART, the ECU 60 determines that the engine 20 need not be started, and goes to step S108 while keeping the engine 20 stopped.

The engine start judgement is made in principle by comparing the engine power requirement Pe with the threshold value PeSTART. In exceptional cases, such as when the rotation speed of the outer rotor shaft 35 as the drive shaft is in the vicinity of zero, the engine start judgement line ESU as shown in FIG. 5 is used instead of the threshold value PeSTART. More specifically, the ECU 60 obtains an operating point of the outer rotor shaft 35 as the drive shaft, based on a combination of the rotation speed Nd of the drive shaft and the target torque Td of the drive shaft. The ECU 60 then determines that the engine 20 should be started when the operating point lies in a region on the upper right-hand side of the engine start judgement line ESU as shown in FIG. 5, and determines that the engine 20 need not be started when the operating point lies in a region on the lower left-hand side of the engine start judgement line ESU. Where the engine start judgement line ESU is used, therefore, the engine start condition is that in which the operating point of the drive shaft lies in the upper right-hand region with respect to the engine start judgement line ESU.

If the operating point of the outer rotor shaft 35 as the drive shaft is currently located at point "a" on curve DL2 in FIG. 5, for example, the ECU 60 determines that the engine 20 need not be started since the operating point lies in the lower left-hand region with respect to the engine start judgement line ESU.

In the manner as described above, the engine start judgement is made twice, using the threshold value PeSTART and the engine start judgement line ESU.

The threshold value PeSTART and the engine start judgement line EST are obtained in advance through experiments, and stored as data or a map in the ROM within the ECU 60.

If step S106 determines that the engine 20 need not be started, the ECU 60 makes a UD/OD region judgement in step S108. More specifically, the ECU 60 determines whether the operating point has passed the UD/OD region boundary EL as the operating line of the engine 20, and has entered the OD region.

If the current operating point of the drive shaft is located at point "a" as in the case described above, the operating point has not passed the UD/OD region boundary EL, but still lies in the UD region, and therefore the control flow goes back to step S102, to repeat the same operations as performed in the last cycle. If the current operating point of the drive shaft is located at point "b" on curve DL2, for example, the control flow goes to step S110 since the operating point passes the UD/OD region boundary EL and lies in the OD region.

The UD/OD region boundary (namely, the operating line of the engine 20) EL is obtained in advance through experiments, and stored as a map in the ROM within the ECU 60.

In step S110, the ECU 60 controls the engine 20 to start the engine 20 by starting fuel supply into the engine 20, and controls the switchable clutch assembly 50 to effect switching from UD coupling to OD coupling. Specific contents of the process of step S110 will be described later in greater detail.

After the start of the engine 20 and switching to the OD coupling, the ECU 60 goes to step S112 to run the vehicle in the HV mode with OD coupling, using the engine 20 and the motors MG1, MG2.

More specifically, the ECU 60 calculates the engine power requirement Pe again, and determines which point on the operating line EL of the engine 20 as shown in FIG. 5 corresponds to the engine power requirement Pe, to thus determine the target operating point of the engine 20. Namely, the engine power requirement Pe is represented by the product of the target rotation speed Ne and target torque Te of the engine 20. Thus, the point on the operating line EL of the engine 20 at which the product of the rotation speed and torque is equal to the value of the engine power requirement Pe provides the target operating point of the engine 20. In an actual operation, the target operating point of the engine 20 is determined by reading an operating point corresponding to the engine power requirement Pe, from a map of the operating line EL stored in the ROM within the ECU 60.

The ECU 60 then determines the torque Tmg1 of the motor MG1 and the torque Tmg2 of the motor MG2 according to respective expressions (5), based on the target operating point of the engine 20 determined as the operating point of the drive shaft, and performs control to satisfy the expressions (5). These expressions (5) derive from the above-indicated expressions (2) for OD coupling.

$$Tmg1=Td$$
$$Tmg2=Td-Te \qquad (5)$$

More specifically, the ECU 60 controls the MG1 inverter 70 so that the torque Tmg1 of the motor MG1 becomes equal to the target torque Td of the drive shaft, and controls the MG2 inverter 72 to operate the motor MG2 so that the torque Tmg2 of the motor MG2 becomes substantially equal to a difference between the target torque Td of the drive shaft and the target torque Te of the engine 20.

The operations of the motors MG1, MG2 may be controlled by known or conventional processes for controlling synchronous motors. In the present embodiment, so-called proportional integral control is implemented. Namely, the current torque of each motor is detected, and a command value of voltage applied to each phase is set based on a deviation from the determined target torque and the target rotation speed. The voltage to be applied is set by the proportional term, integral term and cumulative term of the above-indicated deviation. Proportional coefficients applied to the respective terms are set to appropriate values obtained through experiments, or the like. The thus determined voltage is converted into the duty cycle of switching of transistors that constitute the MG1 inverter 70 and MG2 inverter 72, which is in turn applied to each motor under PWM control.

The ECU 60 also controls the engine 20 so that the operating point of the engine 20 coincides with the target operating point determined in the above manner.

As a result of the above operations, the torque Te generated by the engine 20 is transmitted to the inner rotor shaft 33 through the crankshaft 21, while the torque Tmg2 (<0) generated at the motor MG2 as a negative value is transmitted to the inner rotor shaft 33 via the rotor shaft 43 and the switchable clutch assembly 50, whereby the torque as expressed by Te+Tmg2 (where Tmg2<0) is transmitted to the motor MG1. The torque Te+Tmg2 thus transmitted to the motor MG1 is transmitted as the torque Tmg1 (Te+Tmg2) of the motor MG1 to the outer rotor shaft 35 as the drive shaft, and the outer rotor shaft 35 outputs a driving torque that is substantially equal to the target torque Td (=Tmg1=Te+Tmg2) of the drive shaft. In this manner, the vehicle runs in the HV mode with OD coupling, using the engine 20 and the motors MG1, MG2.

In the present embodiment as described above, the vehicle runs in the EV mode with UD coupling when it is started. When the operating point of the drive shaft passes the UD/OD region boundary EL and enters the OD region, the fuel begins to be supplied to the engine 20, to start the engine 20, and at the same time switching from the UD coupling to the OD coupling is effected, so that the vehicle runs in the HV mode with the OD coupling established.

In the present embodiment, the region EV in which the vehicle runs in the EV mode is defined as an overlap of the UD region and the lower left-hand region defined by the engine start judgement line ESU. The vehicle runs in the HV mode in the rest of the UD region and the entire OD region. In the present embodiment, the UD region provides the UD coupling region "ud" in which the UD coupling is actually established, and the OD region provides the OD coupling region "od" in which the OD coupling is actually established.

In the manner as described above, the vehicle starts running in the EV mode only with the motor MG2 operated, and, when the operating point of the drive shaft enters from the UD region into the OD region, the coupling state of the rotor shaft 43 of the motor MG2 is changed to OD coupling, so that the vehicle starts running in the HV mode, using the engine 20 and the motors MG1, MG2.

Next, the process of step S110 in FIG. 4 will be more specifically explained. In the present invention, the process of step S110 may be executed in a selected one of three methods as described below.

In the first and second methods, the fuel supply to the engine 20 is initially started so as to start the engine 20, and switching from UD coupling to OD coupling is subsequently effected. In the third method, switching from UD coupling to OD coupling is initially effected, and the fuel supply to the engine 20 is subsequently started so as to start the engine 20. In the first of these methods, switching from UD coupling to OD coupling is carried out while the drive shaft (the outer rotor shaft 35 of the motor MG1) and the output shaft of the engine 20 (crankshaft 21, inner rotor shaft 33 of the motor MG1) are directly coupled with each other. In the second of these methods, switching from UD coupling to OD coupling is carried out while the rotor shaft 43 of the motor MG2 is uncoupled or disengaged from both of the drive shaft (outer rotor shaft 35 of the motor MG1) and the output shaft of the engine 20 (crankshaft 21, inner rotor shaft 33 of the motor MG1).

Figure 6:
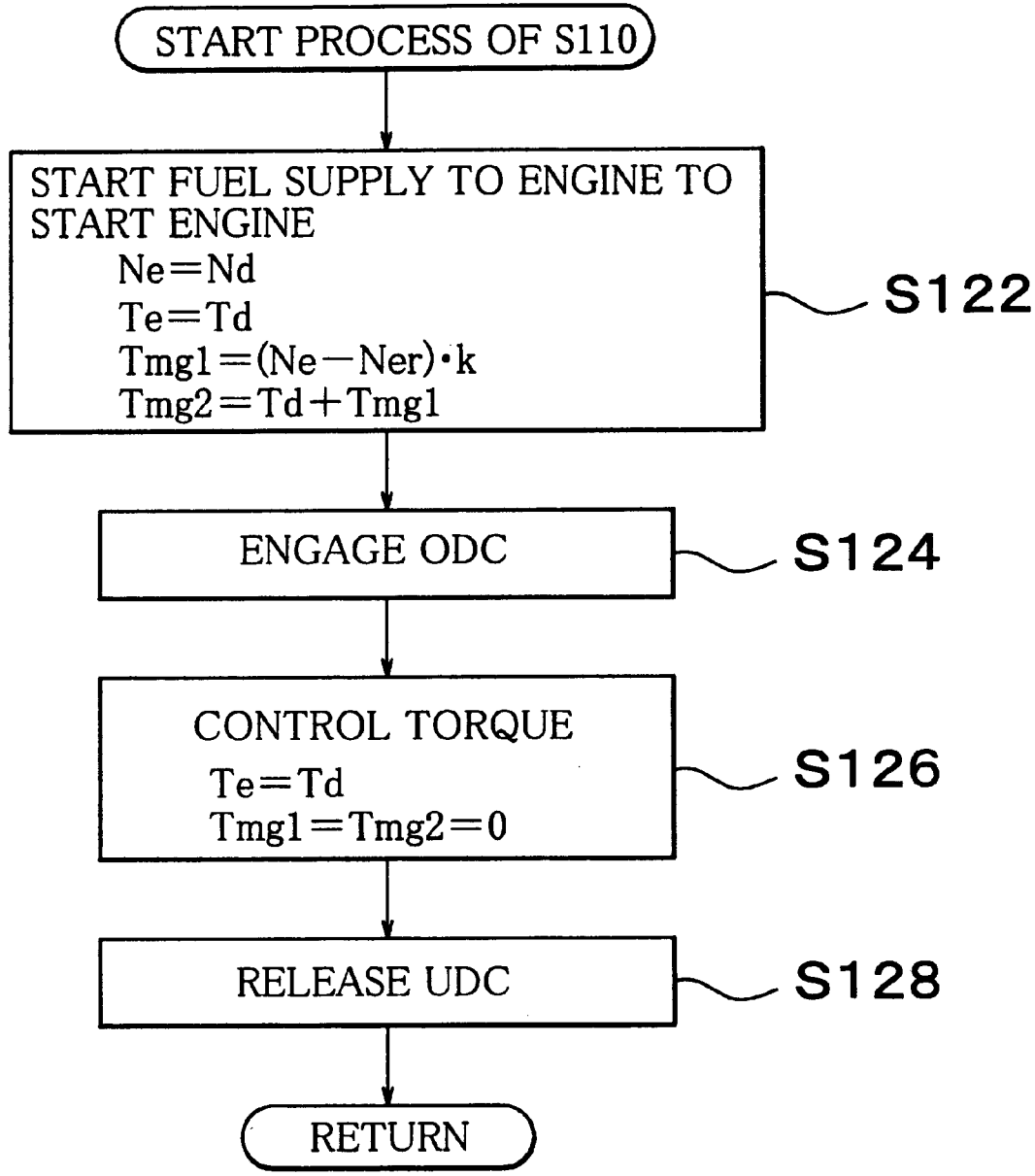
FIG. 6 is a flowchart showing a control routine as the first manner of executing step S110 in FIG. 4.

FIG. 6 is a flowchart showing a control routine according to the first method, as one form of the process of step S110 in FIG. 4. Upon the start of the process of step S110, the ECU 60 goes to step S122 as shown in FIG. 6 to control the engine 20 to start fuel supply to the engine 20, and also fire a spark plug (not shown) of the engine 20, thereby to start the engine 20. At this time, the ECU 60 controls the MG1 inverter 70 so that the motor MG1 produces an engine start torque at the inner rotor shaft 33 linked with the crankshaft 21 of the engine, so as to rotate the crankshaft 21 of the engine 20 by external force, to thus start the engine 20. At the same time, the ECU 60 controls the MG2 inverter 72 so as to cancel a reactive torque generated at the outer rotor shaft 35 by the motor MG1, so that a torque that is substantially equal to the engine start torque generated by the motor MG1 is generated by the motor MG2 at the rotor shaft 43 that is linked with the outer rotor shaft 35 of the motor MG1 via the switchable clutch assembly 50.

After the engine 20 is started in the manner as described above, the ECU performs further control as follows. The ECU 60 determines the target rotation speed Ne and target torque Te of the engine 20 according to respective expressions (6) so that the target operating point of the engine 20 becomes substantially equal to the operating point of the drive shaft, and determines the torque Tmg1 of the motor MG1 and the torque Tmg2 of the motor MG2 according to respective expressions (6), and performs control so as to satisfy the expressions (6).

$$Ne=Nd$$

$$Te=Td$$

$$Tmg1=(Ne-Ner) \cdot k$$

$$Tmg2=Td+Tmg1 \qquad (6)$$

where "Ner" is the current rotation speed of the engine 20 (i.e., the current rotation speed of the crankshaft 21), and "k" is control gain.

More specifically, the ECU 60 controls the engine 20 to adjust the opening of the throttle valve (not shown) of the engine 20, so that the torque of the engine 20 becomes substantially equal to the torque Td of the drive shaft, and at the same time controls the MG1 inverter 70 to adjust the torque Tmg1 of the motor MG1 so that the rotation speed of the engine 20 becomes substantially equal to the rotation speed Nd of the drive shaft. Furthermore, the ECU 60 controls the MG2 inverter 72 so that the torque Tmg2 of the motor Mg2 becomes substantially equal to the sum of the torque Td of the drive shaft and the torque Tmg1 of the motor MG1. As a result, the operating point of the engine 20 almost matches or coincides with the operating point of the drive shaft.

In the example as explained above, the ECU 60 controls the engine 20 and the MG1, MG2 inverters 70, 72 after the engine 20 is started, so that the rotation speed of the engine 20 becomes substantially equal to that of the drive shaft, and the torque of the engine 20 becomes substantially equal to that of the drive shaft. This control operation may be replaced by an alternative control operation as follows.

In the alternative operation, the ECU 60 controls the MG1 inverter 70 so that the motor MG1 makes the rotation speed of the engine 20 substantially equal to the rotation speed of the drive shaft, and then fuel begins to be supplied to the engine 20 so as to start the engine 20. Subsequently, the ECU 60 controls the engine 20 so that the torque of the engine 20 becomes substantially equal to the that of the drive shaft. With this control performed, the rotation speed of the engine 20 has been already made equal to that of the drive shaft by the time when the engine 20 is started, and therefore the operating point of the engine 20 can coincide with the operating point of the drive shaft in an even shorter time after the engine 20 is started.

After the operating point of the engine 20 substantially coincides with the operating point of the drive shaft in the manner as described above, the ECU 60 controls the switchable clutch assembly 50 to engage or apply the overdrive clutch ODC in step S124. Since the underdrive clutch UDC is also in the engaged state at this time, the rotor shaft 43 of the motor MG2 is coupled to both of the outer rotor shaft 35 and the inner rotor shaft 33 of the motor MG1. In this case, therefore, the outer rotor shaft 35 of the motor MG1 and the crankshaft 21 of the engine 20 (inner rotor shaft 33 of the motor MG1) are mechanically coupled directly with each other via the switchable clutch assembly 50.

Subsequently, the ECU 60 executes step S126 to determine the target torque Te of the engine 20, the torque Tmg1 of the motor MG1 and the torque Tmg2 of the motor MG2 according to respective expressions (7) below, and performs control so as to satisfy the expressions (7).

$$Te=Td$$

$$Tmg1=Tmg2=0 \qquad (7)$$

While the outer rotor shaft 35 and the crankshaft 21 are directly coupled with each other, the ECU 60 controls the engine 20 so that the torque of the engine 20 becomes substantially equal to the torque Td of the drive shaft, and controls the MG1 inverter 70 and MG2 inverter 72 to bring all of the transistors in the MG1 inverter 70 and MG2 inverter 72 into the OFF state, so that the torque Tmg1 of the motor MG1 and the torque Tmg2 of the motor MG2 are both made substantially equal to zero.

Thus, while the outer rotor shaft 35 and the crankshaft 21 are directly coupled with each other, the torque Te generated by the engine 20 is directly transmitted to the outer rotor shaft 35 as the drive shaft through the crankshaft 21 and the switchable clutch assembly 50, and the outer rotor shaft 35 outputs a driving torque that is almost equal to the target torque Td (=Te) of the drive shaft. Since the motors MG1, MG2 produce no torque, the rotors 32, 34 of the motor MG1 and the rotor 42 of the motor MG2 are only caused to rotate along with the crankshaft 21. Meanwhile, the vehicle runs only with the engine 20 operating.

Subsequently, the ECU 60 controls the switchable clutch assembly 50 to release the underdrive clutch UDC in step S128. As a result, the rotor shaft 43 of the motor MG2 that is coupled with the outer rotor shaft 35 and the inner rotor shaft 33 are uncoupled from the outer rotor shaft 35, and coupled only with the inner rotor shaft 33, to thus establish OD coupling.

Upon completion of switching from UD coupling to OD coupling in the manner as described above, the control routine as shown in FIG. 6 is finished, and the ECU 60 returns to the control routine as shown in FIG. 4.

In the first method as shown in FIG. 6, the coupling state of the rotor shaft 43 of the motor MG2 is switched from UD coupling to OD coupling after the operating point of the engine 20 is made substantially equal to the operating point of the drive shaft, and the torque and rotation speed of the inner rotor shaft 33 of the motor MG1 (those of the crankshaft 21 of the engine) are made substantially equal to those of the outer rotor shaft 35 as the drive shaft. Thus, switching of the coupling can be smoothly accomplished without causing any shock upon switching.

Figure 7:
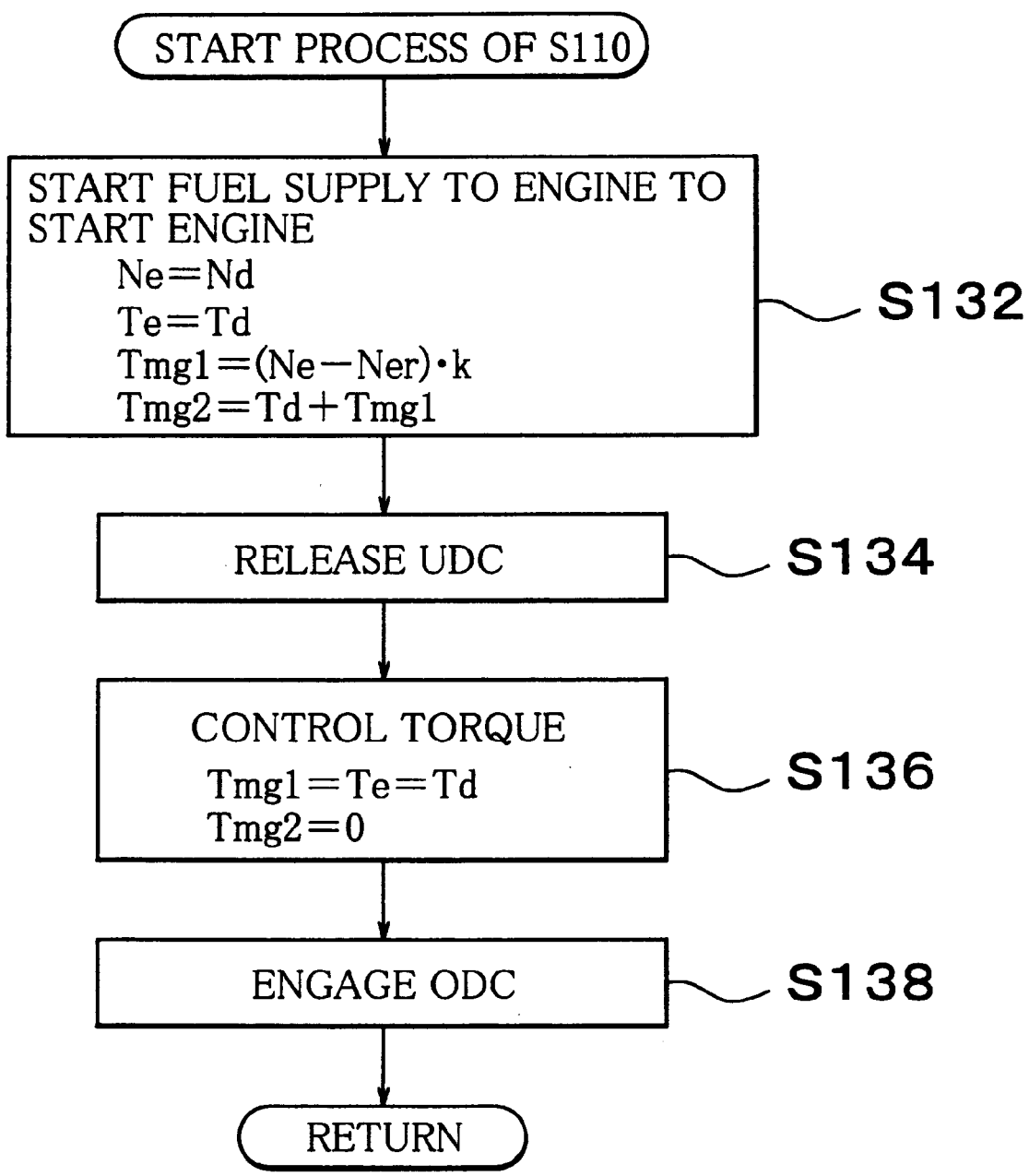
FIG. 7 is a flowchart showing a control routine as the second manner of executing step S110 in FIG. 4.

FIG. 7 is a flowchart showing a control routine according to the second method, as another form of the process of step S110 in FIG. 4. Upon the start of the process of step S110, the ECU 60 performs the same operation in step S132 as that of step S122 as shown in FIG. 6, so as to start the engine 20 and make the operating point of the engine 20 substantially equal to that of the drive shaft.

The ECU 60 then executes step S134 to control the switchable clutch assembly 50 so as to release the underdrive clutch UDC. As a result, the rotor shaft 43 of the motor MG2 is uncoupled or disengaged from both of the outer rotor shaft 35 of the motor MG1 and the crankshaft 21 of the engine 20 (the inner rotor shaft 33 of the motor MG 1).

Subsequently, the ECU 60 executes step S136 to determine the target torque Te of the engine 20, the torque Tmg1 of the motor MG1 and the torque Tmg2 of the motor MG2 according to respective expressions (8) below, and performs control so as to satisfy the expressions (8).

$$Tmg1=Te=Td$$

$$Tmg2=0 \tag{8}$$

While the rotor shaft 43 of the motor MG2 is uncoupled from both of the outer rotor shaft 35 and inner rotor shaft 33 of the motor MG1, the ECU 60 controls the engine 20 so that the torque of the engine 20 becomes substantially equal to the torque Td of the drive shaft, and controls the MG1 inverter 70 so that the torque Tmg1 of the motor MG1 becomes substantially equal to the target torque Te of the engine 20. Furthermore, the ECU 60 controls the MG2 inverter 72 to bring all of the transistors in the MG2 inverter 72 into the OFF state, so that the torque Tmg2 of the motor MG2 becomes almost equal to zero.

As a result, the torque Te generated by the engine 20 is transmitted to the motor MG1, through the crankshaft 21 and the inner rotor shaft 33, while the rotor shaft 43 of the motor MG2 is uncoupled from both of the outer rotor shaft 35 and inner rotor shaft 33 of the motor MG1. The torque transmitted to the motor MG1 is then transmitted as torque Tmg1 (=Te) of the motor MG1 to the outer rotor shaft 35 as the drive shaft. In the meantime, no torque is transmitted from the motor MG2 to the outer rotor shaft 35 since the rotor shaft 43 of the motor MG2 is uncoupled from the outer rotor shaft 35 and the inner rotor shaft 33, and the torque Tmg2 of the motor MG2 is zero. Accordingly, the outer rotor shaft 35 outputs a driving torque that is almost equal to the target torque Td (=Tmg1=Te) of the drive shaft. Meanwhile, the vehicle runs by means of the engine 20 and the motor MG1, while the rotor shaft 43 of the motor MG2 keeps rotating at an almost constant rotation speed due to the inertia.

Subsequently, the ECU 60 controls the switchable clutch assembly 50 so as to engage the overdrive clutch ODC in step S138. As a result, the rotor shaft 43 of the motor MG2 that was uncoupled from both of the outer rotor shaft 35 and the inner rotor shaft 33 is coupled to the inner rotor shaft 33, to thus establish OD coupling.

Upon completion of switching from the UD coupling to the OD coupling as described above, the control routine as shown in FIG. 7 is finished, and the ECU 60 returns to the control routine as shown in FIG. 4.

In the second method as shown in FIG. 7, too, the coupling state of the rotor shaft 43 of the motor MG2 is switched from UD coupling to OD coupling after the torque and rotation speed of the inner rotor shaft 33 of the motor MG1 (the crankshaft 21 of the engine 20) are made substantially equal to those of the outer rotor shaft 35 as the drive shaft, as in the process as shown in FIG. 6. Thus, switching from UD coupling to OD coupling can be smoothly accomplished without causing any shock upon switching.

Figure 8:
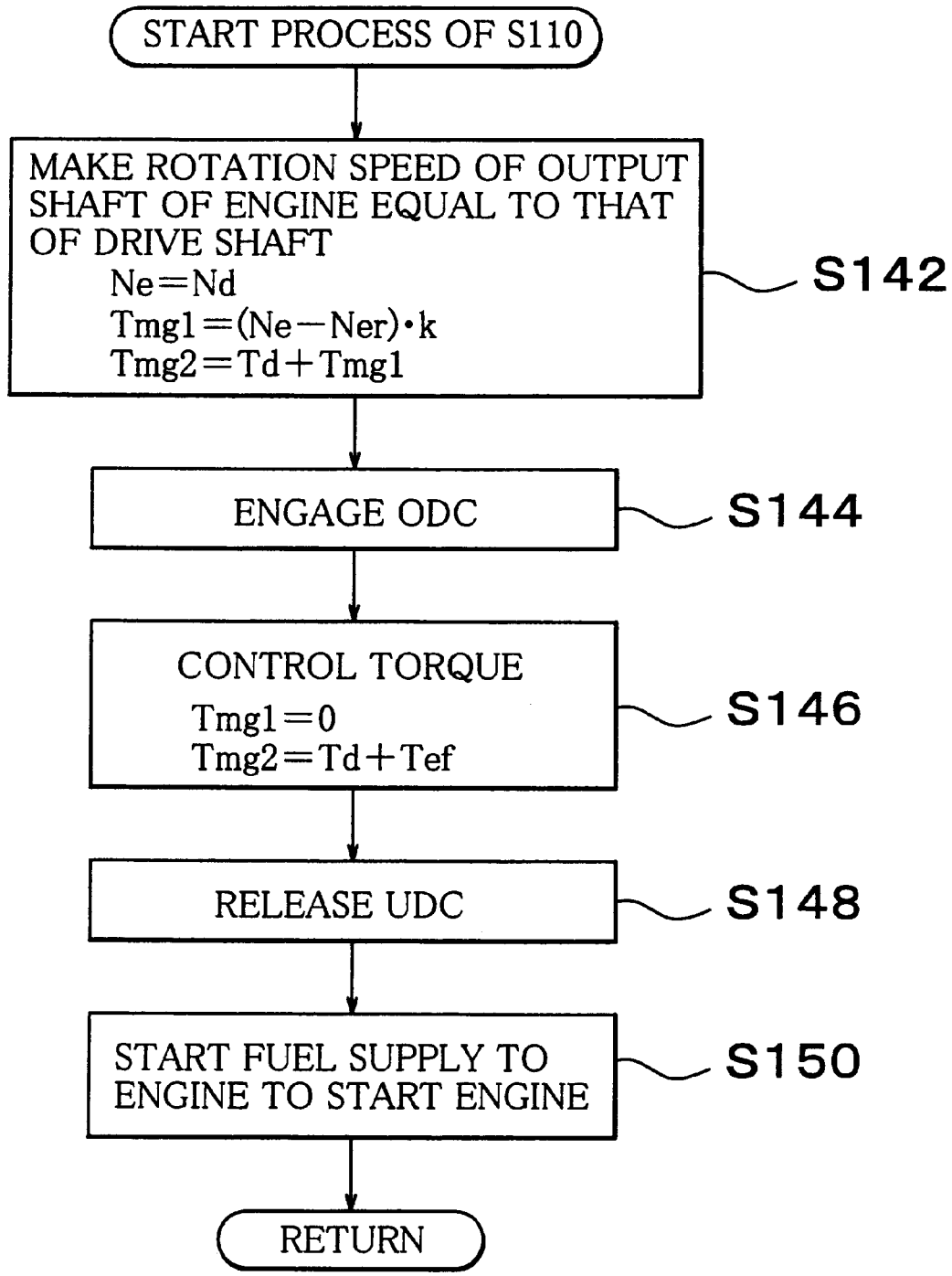
FIG. 8 is a flowchart showing a control routine as the third manner of executing step S110 in FIG. 4.

FIG. 8 is a flowchart showing a control routine according to the third method, as a further form of the process of step S110 in FIG. 4. Upon the start of the process of step S110, the ECU 60 executes step S142 to control the rotation speed of the output shaft of the engine 20 to be substantially equal to the rotation speed of the drive shaft. More specifically, the ECU 60 determines the target rotation speed Ne of the engine 20, the torque Tmg1 of the motor MG 1 and the torque Tmg2 of the motor MG2 according to respective expressions (9), and performs control so as to satisfy the expressions (9).

$$Ne=Nd$$

$$Tmg1=(Ne-Ner) \cdot k$$

$$Tmg2=Td+Tmg1 \tag{9}$$

Namely, the ECU 60 controls the MG1 inverter 70 to adjust the torque Tmg1 of the motor MG1 so that the rotation speed of the engine 20 becomes substantially equal to the rotation speed Nd of the drive shaft, and controls the MG2 inverter 72 so that the torque Tmg2 of the motor MG2 becomes substantially equal to the sum of the torque Td of the drive shaft and the torque Tmg1 of the motor MG1. As a result, the rotation speed of the crankshaft 21 as the output shaft of the engine 20 becomes substantially equal to that of the outer rotor shaft 35. At this time, the engine 20 itself is at rest with no fuel supplied thereto, and therefore no torque is generated by the engine 20.

The ECU 60 then executes step S144 to control the switchable clutch assembly 50 so as to engage the overdrive clutch ODC. At this time, the underdrive clutch UDC is also in the engaged state, as in the case of step S124 in FIG. 6, and therefore the rotor shaft 43 of the motor MG2 is coupled to both of the outer rotor shaft 35 and the inner rotor shaft 33 (crankshaft 21 of the engine 20) of the motor MG1.

Subsequently, the ECU 60 executes step S146 to determine the torque Tmg1 of the motor MG1 and the torque Tmg2 of the motor MG2 according to respective expressions (10), and performs control so as to satisfy these expressions (10).

$$Tmg1=0$$

$$Tmg2=Td+Tef \tag{10}$$

where Tef is friction torque of the engine 20.

More specifically, the ECU 60 controls the MG1 inverter 70 to bring all of the transistors in the MG1 inverter 70 into the OFF state, so that the torque Tmg1 of the motor MG1 is made substantially equal to zero. Also, the ECU 60 controls the MG2 inverter 72 so that the torque Tmg2 of the motor MG2 becomes substantially equal to the sum of the target torque Td of the drive shaft and the friction torque Tef of the engine 20.

At this time, the crankshaft 21 as the output shaft of the engine 20 is rotated, but the engine 20 itself is at rest with no fuel supplied thereto. Also, the rotor shaft 43 of the motor MG2, crankshaft 21 of the engine (the inner rotor shaft 33 of the motor MG1) and the outer rotor shaft 35 of the motor MG1 are coupled with each other in the switchable clutch assembly 50, and thus integrated as a unit. When the torque Tmg2 of the motor MG2, which is obtained by adding the friction torque Tef of the engine 20 to the target torque Td of the drive shaft (Tmg2=Td+Tef), is transmitted to the switchable clutch assembly 50 through the rotor shaft 43, the torque Tmg2 is reduced in the clutch assembly 50 by an amount corresponding to the friction torque Tef of the engine, but the torque Td obtained by subtracting the friction torque Tef of the engine 20 from the torque Tmg2 (=Td+Tef) of the motor Mg2 is still transmitted from the clutch assembly 50 to the outer rotor shaft 35. Thus, the outer rotor shaft 35 outputs a driving torque that is equal to the target torque Td of the drive shaft. Also, no torque is generated in the motor MG1, and therefore the rotors 32, 34 of the motor MG1 are merely caused to rotate in accordance with rotation of the motor MG2. Meanwhile, the vehicle runs in the EV mode only by means of the motor MG2.

The ECU 60 then executes step S148 to control the switchable clutch assembly 50 so as to release the underdrive clutch UDC. As a result, the rotor shaft 43 of the motor MG2 that was coupled with the outer rotor shaft 35 and inner rotor shaft 33 are uncoupled from the outer rotor shaft 35, and coupled only with the inner rotor shaft 33, to thus establish OD coupling.

Subsequently, the ECU 60 controls the engine 20 to start fuel supply to the engine 20, and also fire a spark plug (not shown) of the engine 20, thereby to start the engine 20 in step S150. Since the crankshaft 21 of the engine 20 has been already rotating in this step, the engine 20 is immediately started by starting fuel supply to the engine 20.

When the start of the engine 20 is completed, the control routine as shown in FIG. 8 is finished, and the ECU 60 returns to the control routine as shown in FIG. 4.

In the third method as shown in FIG. 8, the coupling state of the rotor shaft 43 of the motor MG2 is switched from UD coupling to OD coupling after the rotation speed of the inner rotor shaft 33 of the motor MG1 (the crankshaft 21 of the engine 20) is made substantially equal to the rotation speed of the outer rotor shaft 35. Thus, switching from UD coupling to OD coupling can be smoothly accomplished without causing any shock upon switching.

Also, since switching from UD coupling to OD coupling is carried out before the engine 20 is started with fuel supplied to the engine 20, the switching of the coupling state can be accomplished without being affected by variations in the torque or rotation speed immediately after the start of the engine.

During the period from a point of time at which the overdrive clutch ODC is engaged to a point of time at which the underdrive clutch UDC is released, the motor MG2 is adapted to generate torque Tmg2 that is greater than the target torque Td of the drive shaft by an amount of the friction torque Tef of the engine. Accordingly, the driving torque outputted from the drive shaft will not vary during this period.

In the third method as described above, however, electric power stored in the battery 74 is required to compensate for the energy (engine rotation energy) for rotating the crankshaft 21 as the output shaft of the engine 20, in addition to the energy for running the vehicle before the engine 20 is started. Thus, the third method can be implemented when a sufficient quantity of electric power is stored in the battery 74.

In the third method in which the engine 20 is not started and generates no torque upon switching from the UD coupling to the OD coupling, the switching of the coupling state may be carried out while the drive shaft and the output shaft of the engine 20 are directly coupled to each other, but the switching cannot be carried out while the rotor shaft 43 of the motor MG2 is uncoupled from both of the drive shaft and the output shaft of the engine 20. This is because, in the latter case, vibration or shock due to a sudden change in the driving torque occurs upon switching from the UD coupling to the OD coupling since the motor MG2 that has been outputting the driving torque is uncoupled from the drive shaft in the switchable clutch assembly 50 at the same time that the underdrive clutch UDC is released, with a result that no driving torque exists.

Figure 9:
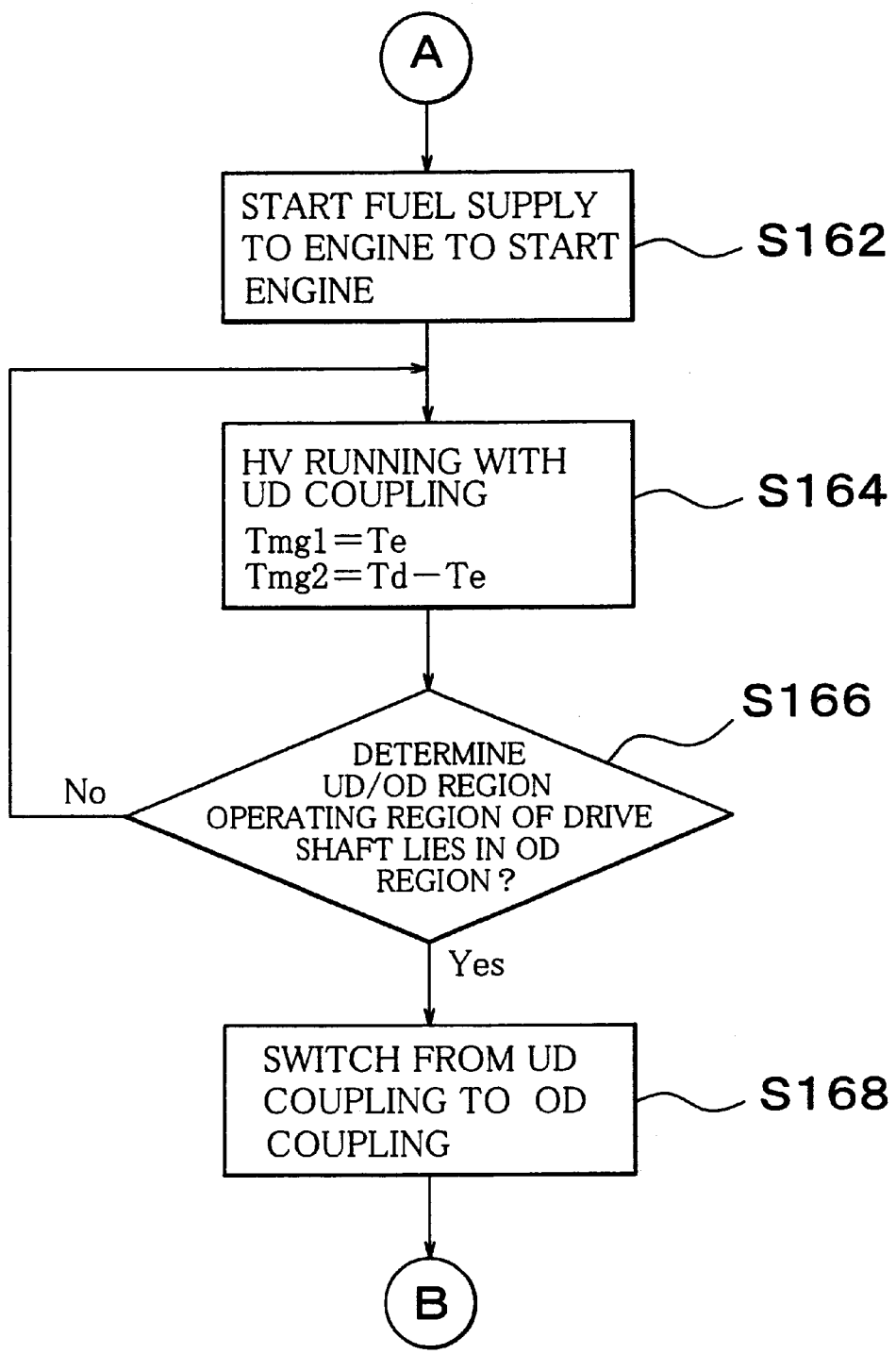
FIG. 9 is a flowchart showing a control routine to be executed between A and B in FIG. 4.

Referring next to FIG. 9, there will be described a process to be executed in the case where step S106 in FIG. 4 determines that the engine 20 should be started. FIG. 9 is a flowchart showing a control routine between A and B in the routine of FIG. 4.

Once the process as shown in FIG. 9 is started, the ECU 60 initially controls the engine 20 to start fuel supply to the engine 20, and also to fire a spark plug (not shown) of the engine 20, thereby to start the engine 20 in step S162. At the same time, the ECU 60 controls the MG1 inverter 70 to cause the motor MG1 to generate engine start torque at the inner rotor shaft 33 linked with the crankshaft 21 of the engine 20, and thus rotate the crankshaft 21 of the engine 20 by external force, thereby to start the engine 20. At the same time, in order to cancel reaction torque produced by the motor MG1 at the outer rotor shaft 35, the ECU 60 controls the MG2 inverter 72 to cause the motor MG2 to generate torque that is substantially equal to the engine start torque produced by the motor MG1, at the rotor shaft 43 that is coupled with the outer rotor shaft 35 of the motor MG1 through the switchable clutch assembly 50.

After the engine 20 is started in the above manner, the ECU 60 executes step S164 to run the vehicle in the HV mode with UD coupling, using the engine 20, the motor MG1 and the motor MG2.

More specifically, the ECU 60 calculates the engine power requirement Pe again, and determines which point on the operating line EL of the engine 20 as shown in FIG. 5 corresponds to the engine power requirement Pe, so as to determine the target operating point of the engine 20, as in the process of step S112 in FIG. 4. The ECU 60 then determines the torque Tmg1 of the motor MG1 and the torque Tmg2 of the motor MG2 according to respective expressions (11) below, based on the operating point of the drive shaft and the thus determined target operating point of the engine 20, and performs control so as to satisfy the expressions (11). These expressions (11) derive from the above-indicated expressions (1) for UD coupling.

$$Tmg1=Te$$

$$Tmg2=Td-Te \qquad (11)$$

Namely, the ECU 60 controls the MG1 inverter 70 so that the torque Tmg1 of the motor MG1 becomes equal to the target torque Te of the engine 20, and controls the MG2 inverter 72 so that the torque Tmg2 of the motor MG2 becomes substantially equal to a difference between the target torque Td of the drive shaft and the target torque Te of the engine 20.

The ECU 60 also controls the engine 20 so that the operating point of the engine 20 coincides with the determined target operating point.

As a result of the above operations, the torque Te generated by the engine 20 is transmitted to the motor MG1 through the crankshaft 21 and the inner rotor shaft 33. While the torque Te transmitted to the motor MG1 is then transmitted as the torque Tmg1 (=Te) of the motor MG1 to the outer rotor shaft 35 as the drive shaft, the torque Tmg2 (>0) generated by the motor MG2 is also transmitted to the outer rotor shaft 35 through the rotor shaft 43 and the switchable clutch assembly 50, so that the total torque Te+Tmg2 is transmitted to the outer rotor shaft 35. Accordingly, the outer rotor shaft 35 outputs driving torque that is equal to the target torque Td (=Te+Tmg2) of the driving torque. In this manner, the vehicle runs in the HV mode with the UD coupling, using the engine 20, and the motors MG1, MG2.

The ECU 60 then makes a UD/OD region judgement in step S166. More specifically, the ECU 60 determines whether the operating point of the outer rotor shaft 35 as the drive shaft has passed the UD/OD region boundary EL as the operating line of the engine 20, and entered the OD region, as in the case of step S108 in FIG. 4. If the ECU 60 determines that the operating point of the drive shaft still lies in the UD region, the control flow returns to step S164, as shown in FIG. 9, to repeat steps S164 and S166. If the operating point of the drive shaft has passed the UD/OD region boundary EL and lies in the OD region, the control flow goes to step S168.

In step S168, the ECU 60 controls the switchable clutch assembly 50 to switch the coupling state of the rotor shaft 43 of the motor MG2 from UD coupling to OD coupling. The UD coupling may be switched to the OD coupling during HV running by such a method as disclosed in Japanese Laid-open Patent Publication No. HEI 10-271749, for example. More specifically, the UD coupling is switched to the OD coupling in the switchable clutch assembly 50 when a difference between the rotation speed of the output shaft of the engine 20 and the rotation speed of the drive shaft falls within a certain permissible range, and a difference between the torque of the output shaft of the engine 20 and the torque of the drive shaft enters falls within a certain permissible range.

Upon completion of switching from UD coupling to OD coupling, the process as shown in FIG. 9 is finished, and the ECU 60 returns to B as shown in FIG. 4.

In the manner as described above, the process (between A and B in FIG. 4) is executed in the case where step S106 in FIG. 4 determines that the engine 20 should be started.

(5) Second Control Method

Figure 10:
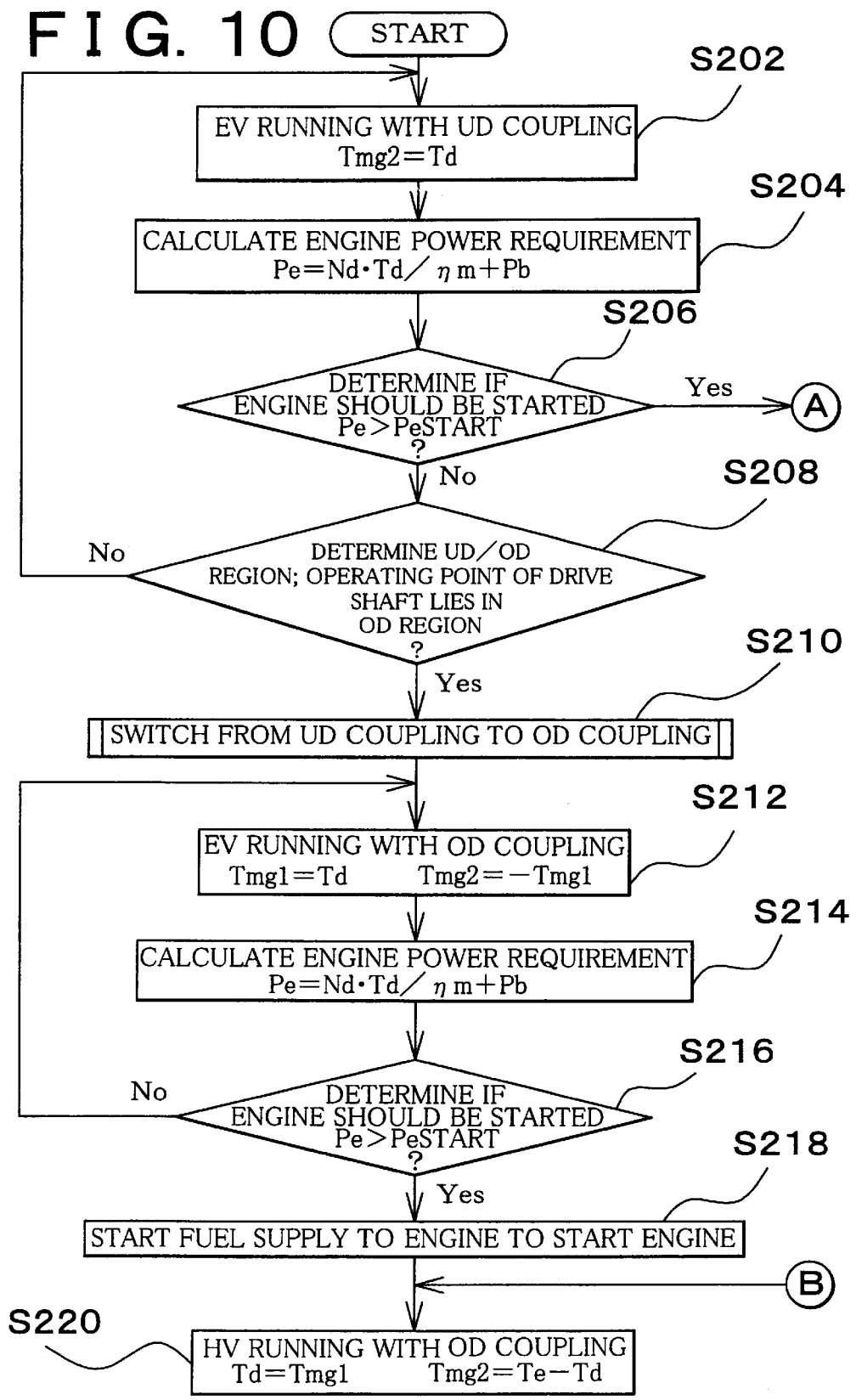
FIG. 10 is a flowchart showing a control routine of the second embodiment according to the second control method of the present invention.
Figure 11:
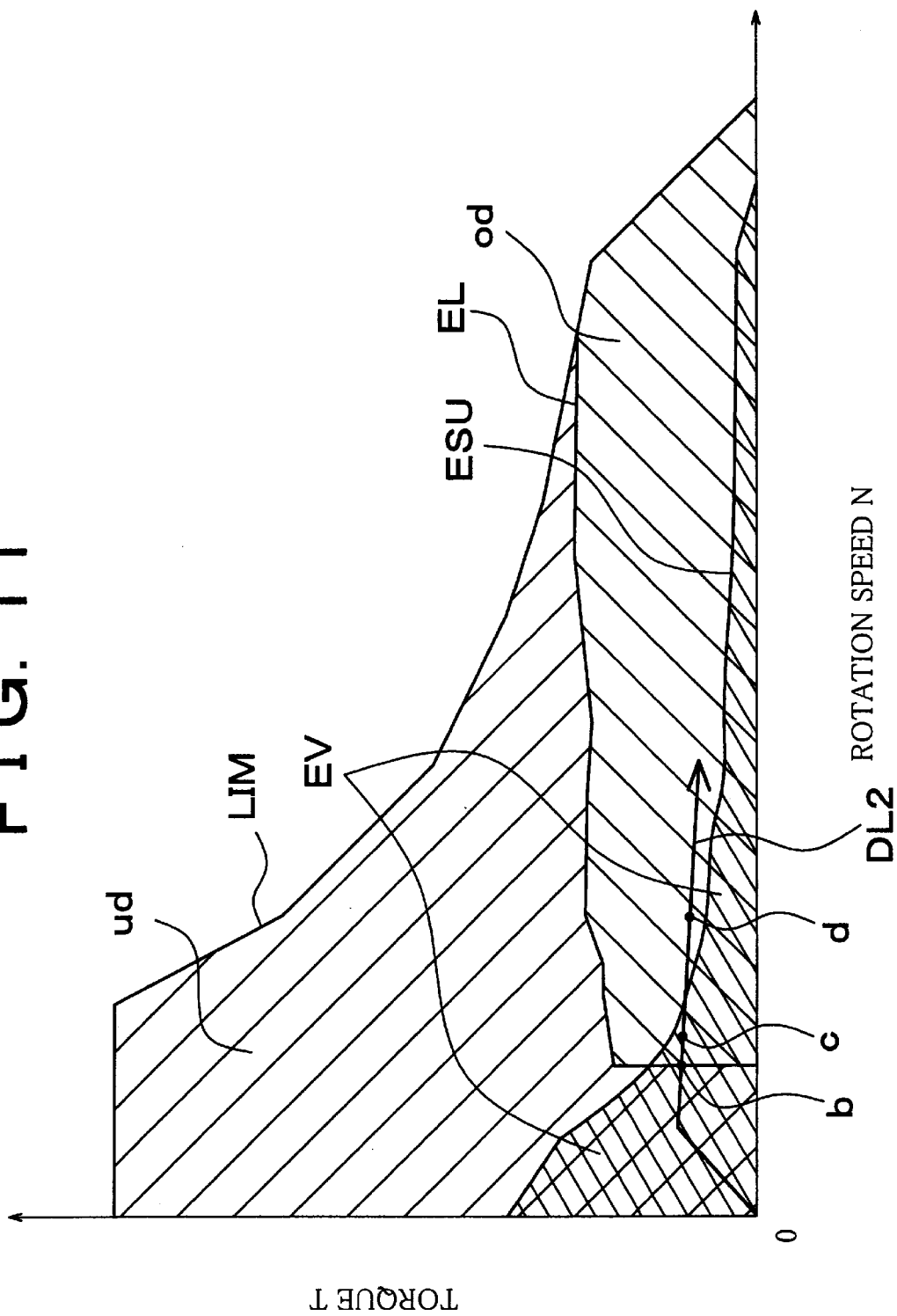
FIG. 11 is a diagram showing EV running region, UD coupling region and OD coupling region when the second control method of the present invention is employed.

FIG. 10 is a flowchart showing a control routine of the second embodiment according to the second control method of the present invention. FIG. 11 is a diagram showing EV running region, UD coupling region, and OD coupling region when the second control method of the present invention is employed.

In FIG. 11, the vertical axis, horizontal axis, and respective curves and regions represent the same parameters or contents as those of FIG. 5, and thus will not be explained herein.

In the present embodiment, the ECU 60 performs a control operation according to the control routine as shown in FIG. 10 during a period in which the vehicle starts from rest, and is accelerated at a low rate. During this period, the operating point of the outer rotor shaft 35 of the motor MG1 as the drive shaft follows a path as indicated by curve DL2 in FIG. 11.

In the present embodiment, the operations of steps S202~S208 are identical with those of steps S102~S108 as shown in FIG. 4, and thus will not be explained herein.

If it is found in step S208 that the current operating point of the drive shaft is located at point "b" on the curve DL2 as shown in FIG. 11, the operating point has passed the UD/OD region boundary EL and lies in the OD region, and therefore the control flow goes to step S210. In step S210, the ECU 60 controls the switchable clutch assembly 60 to switch from UD coupling to OD coupling. Specific contents of the process of step S210 will be described later in greater detail.

After switching to OD coupling, the ECU 60 executes step S212 to cause the vehicle to continue EV running with OD coupling, using the motors MG1, MG2, while the engine 20 is stopped. More specifically, the ECU 60 determines the torque Tmg1 of the motor MG1 and the torque Tmg2 of the motor MG2 according to expressions (12), and performs control so as to satisfy these expressions (12).

$$Tmg1=Td$$
$$Tmg2=-Tmg1 \quad (12)$$

Namely, the ECU 60 controls the MG1 inverter 70 to operate the motor MG1 so that the torque Tmg1 of the motor MG1 becomes substantially equal to the target torque Td of the outer rotor shaft 35 as the drive shaft, and controls the MG2 inverter 72 so that the torque Tmg2 of the motor MG2 becomes substantially equal to the torque (-Tmg1) having the same magnitude as the torque Tmg1 of the motor MG1 and acting in the direction opposite to that of the torque Tmg1.

Since the motor MG1 generates the torque Tmg1 at the outer rotor shaft 35 as the drive shaft, the outer rotor shaft 35 outputs a driving torque that is substantially equal to the target torque Td (=Tmg1) of the drive shaft. At this time, the motor MG1 generates the reverse torque (-Tmg1) of the same magnitude at the inner rotor shaft 33, as the reaction to the torque generated at the outer rotor shaft 35, according to the law of action and reaction. In view of this, the motor MG2 generates the reverse torque (-Tmg1) of the same magnitude as the torque (Tmg1) generated by the motor MG1, at the rotor shaft 43 linked with the inner rotor shaft 33 of the motor MG1 via the switchable clutch assembly 50, so that the above-described reaction force is cancelled. In this manner, the vehicle runs in the EV mode with OD coupling, utilizing the motors MG1, MG2.

Although the rotation speed Ne of the crankshaft 21 as the output shaft of the engine 20 approaches the rotation speed Nd of the outer rotor shaft 35 as the drive shaft upon switching from UD coupling to OD coupling in step S210, the rotation speed Ne returns to zero after switching, and the crankshaft 21 is held stopped.

The ECU 60 then executes step S214 to calculate the engine power requirement Pe again as in step S204, and executes step S216 to make an engine start judgement as in step S206. The engine start judgement is made based on two criteria, using the threshold value PeSTART and the engine start judgement line ESU. If the current operating point of the drive shaft is located at point "c" on curve DL2 as shown in FIG. 11, for example, the ECU 60 judges based on the engine start judgement line ESU that the engine 20 need not be started since the operating point lies in the lower left-hand region defined by the engine start judgement line ESU, and the control flow returns to step S212 as shown in FIG. 10 to repeat the steps S212, S214 and S216. If the driver depresses the accelerator pedal, to accelerate the vehicle until the operating point of the drive shaft reaches point "d" on the curve DL2, the operating point passes the engine start judgement line ESU and enters the region on the upper right-hand side of the judgement line ESU, and the control flow goes to step S218.

In step S218, the ECU60 controls the engine 20 to start fuel supply to the engine 20 and also to fire a spark plug (not shown) of the engine 20, thereby to start the engine 20. At the same time, the ECU 60 controls the MG2 inverter 72 to cause the motor MG2 to generate engine start torque at the rotor shaft 43 that is linked with the crankshaft 21 of the engine 20 via the switchable clutch assembly 50, to forcibly rotate the crankshaft 21 that has been stopped, thereby to start the engine 20.

Once the engine 20 is started, the ECU 60 executes step S220 to run the vehicle in the HV mode with OD coupling, using the engine 20 and the motors MG1, MG2. The specific method of running the vehicle in the HV mode with OD coupling is the same as the method as explained above with respect to step S122 in FIG. 4, and therefore will not be explained herein.

In the present embodiment, the vehicle runs in the EV mode with UD coupling when it is started. When the operating point of the drive shaft passes the UD/OD region boundary EL and enters the OD region, the UD coupling is switched to OD coupling. Unlike the first control method, however, the vehicle keeps running in the EV mode with the OD coupling while the engine 20 is stopped, until the operating point of the drive shaft passes the engine start judgement line ESU. When the operating point of the drive shaft passes the engine start judgement line ESU and enters the upper right-hand region defined by the judgement line ESU, fuel begins to be supplied to the engine 20, to start the engine 20. Thereafter, the vehicle runs in the HV mode with OD coupling.

In the present embodiment, the entire region on the lower left-hand side of the engine start judgement line ESU, out of the operating region of the power output apparatus 10, provides region EV in which the vehicle runs in the EV mode, and the vehicle runs in the HV mode in the rest of the operating region. In the present embodiment, the UD region provides the UD coupling region "ud" in which the UD coupling is actually established, and the OD region provides the OD coupling region "od" in which the OD coupling is actually established.

In the present embodiment as described above, the vehicle that was running in the EV mode using only the motor MG2 with UD coupling can be kept running in the EV mode with OD coupling, using the motors MG1 and MG2, even after the operating point of the drive shaft enters the OD region from the UD region.

Next, the process of step S210 in FIG. 10 will be more specifically explained. In the present invention, the process of step S210 may be executed in a selected one of two methods as described below.

In the first method, the overdrive clutch ODC is immediately engaged upon switching from UD coupling to OD coupling in the switchable clutch assembly 50. In the second method, on the other hand, the rotation speed of the output shaft of the engine 20 is made substantially equal to the rotation speed of the drive shaft before engagement of the overdrive clutch ODC, and the overdrive clutch ODC is engaged in this condition.

Figure 12:
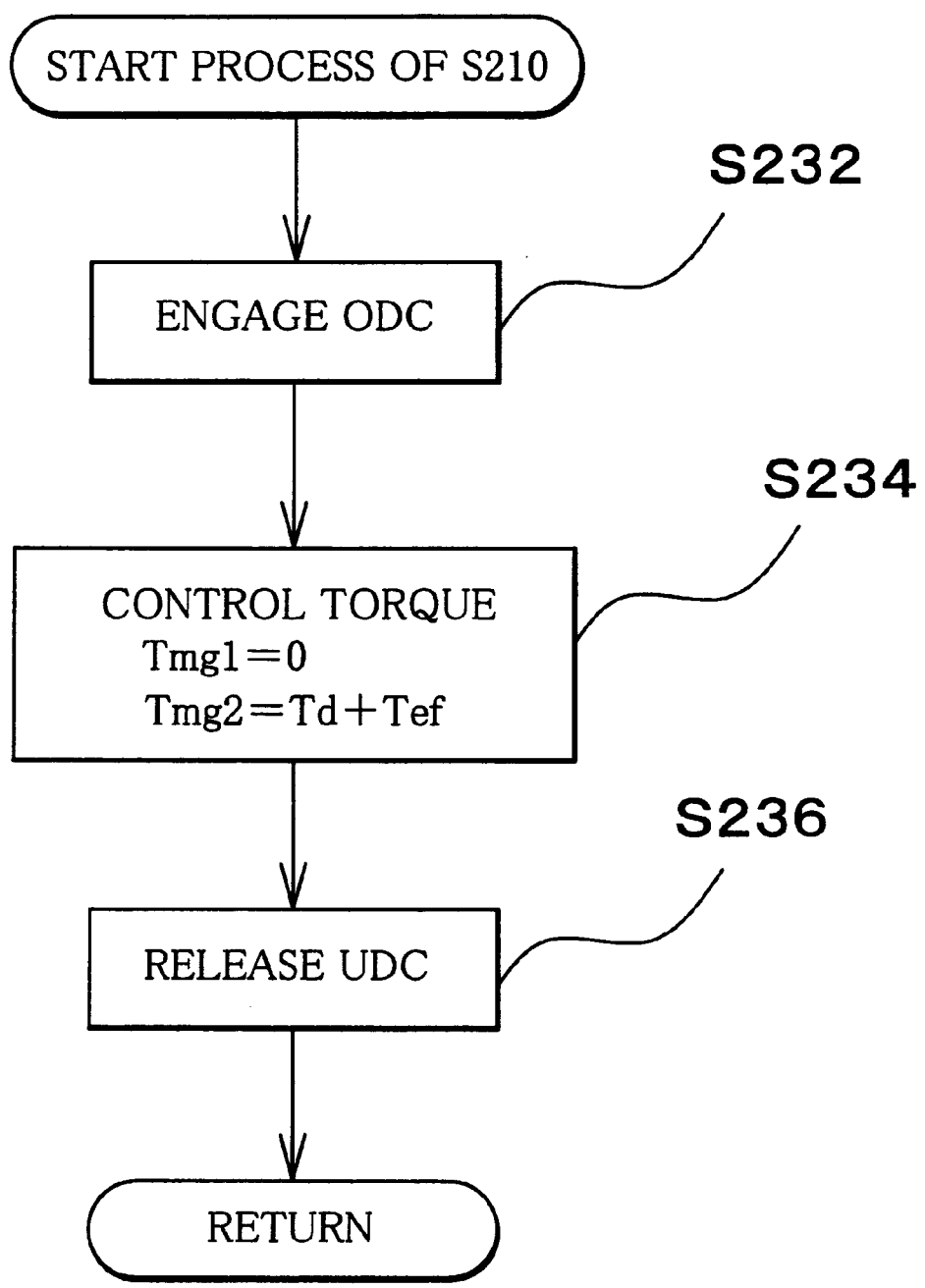
FIG. 12 is a flowchart showing a control routine as the first manner of executing step S210 in FIG. 10.

FIG. 12 is a flowchart showing a control routine according to the first method, as one form of the process of step S210 in FIG. 4. Upon the start of the process of step S210, the ECU 60 executes step S232 as shown in FIG. 12 to control the switchable clutch assembly 50 to engage the overdrive clutch ODC. Since the underdrive clutch UDC is also in the engaged state at this time as in the case of step S144 in FIG. 8, the rotor shaft 43 of the motor MG2 is coupled to both of the outer rotor shaft 35 of the motor MG1 and the inner rotor shaft 33. In this case, therefore, the outer rotor shaft 35 of the motor MG1 and the crankshaft 21 of the engine 20 (the inner rotor shaft 33 of the motor MG1) are directly coupled with each other via the switchable clutch assembly 20.

In the first method as shown in FIG. 12, however, the overdrive clutch ODC must be slowly engaged, since the crankshaft 21 of the engine 20 (the inner rotor shaft 33 of the motor MG1) is at rest and its speed of rotation is zero when the overdrive clutch ODC is engaged.

Subsequently, the ECU 60 executes step S234 to determine the torque Tmg1 of the motor MG1 and the torque Tmg2 of the motor MG2 according to the respective expressions (10) as indicated above, and perform control so as to satisfy the expressions (10).

Namely, the ECU 60 controls the MG1 inverter 70 to turn off all of the transistors within the MG1 inverter 70 so that the torque Tmg1 of the motor MG1 becomes substantially equal to zero. Also, the ECU 60 controls the MG2 inverter 72 so that the torque Tmg2 of the motor MG2 becomes substantially equal to the sum of the target torque Td of the drive shaft and the friction torque Tef of the engine 20.

At this time, the engine 20 itself is at rest with no fuel supplied thereto, and the rotor shaft 43 of the motor MG2, crankshaft 21 of the engine (the inner rotor shaft 33 of the motor MG1) and the outer rotor shaft 35 of the motor MG1 are coupled with each other in the switchable clutch assembly 50, and integrated as a unit. When the torque Tmg2, which is obtained by adding the friction torque Tef of the engine 20 to the target torque Td of the drive shaft (Tmg2= Td+Tef), is generated by the motor MG2 and transmitted to the switchable clutch assembly 50, therefore, the torque Tmg2 is reduced in the switching clutch assembly 50 in an amount corresponding to the friction torque Tef of the engine, but the torque Td obtained by subtracting the friction torque Tef of the engine 20 from the torque Tmg2 (=Td+Tef) of the motor Mg2 is still transmitted from the switchable clutch assembly 50 to the outer rotor shaft 35. Thus, the outer rotor shaft 35 outputs a driving torque that is substantially equal to the target torque Td of the drive shaft. Also, no torque is produced in the motor MG1, and therefore the rotors 32, 34 of the motor MG1 are caused to rotate in accordance with rotation of the motor MG2. Meanwhile, the vehicle runs in the EV mode only by means of the motor MG2.

The ECU 60 then executes step S236 to release the underdrive clutch UDC. As a result, the rotor shaft 43 of the motor MG2 that has been coupled with the outer rotor shaft 35 and inner rotor shaft 33 is uncoupled from the outer rotor shaft 35, and coupled only with the inner rotor shaft 33, to thus establish OD coupling.

Upon completion of the operation of step S236, the control routine as shown in FIG. 12 is finished, and the ECU 60 returns to the process as shown in FIG. 10.

In the first method as shown in FIG. 12, during the period from a point of time when the overdrive clutch ODC is engaged to a point of time when the underdrive clutch UDC is released, the motor MG2 generates torque Tmg2 that is greater than the target torque Td of the drive shaft by an amount of the friction torque Tef of the engine. Accordingly, the driving torque outputted from the drive shaft will not vary during this period.

Figure 13:
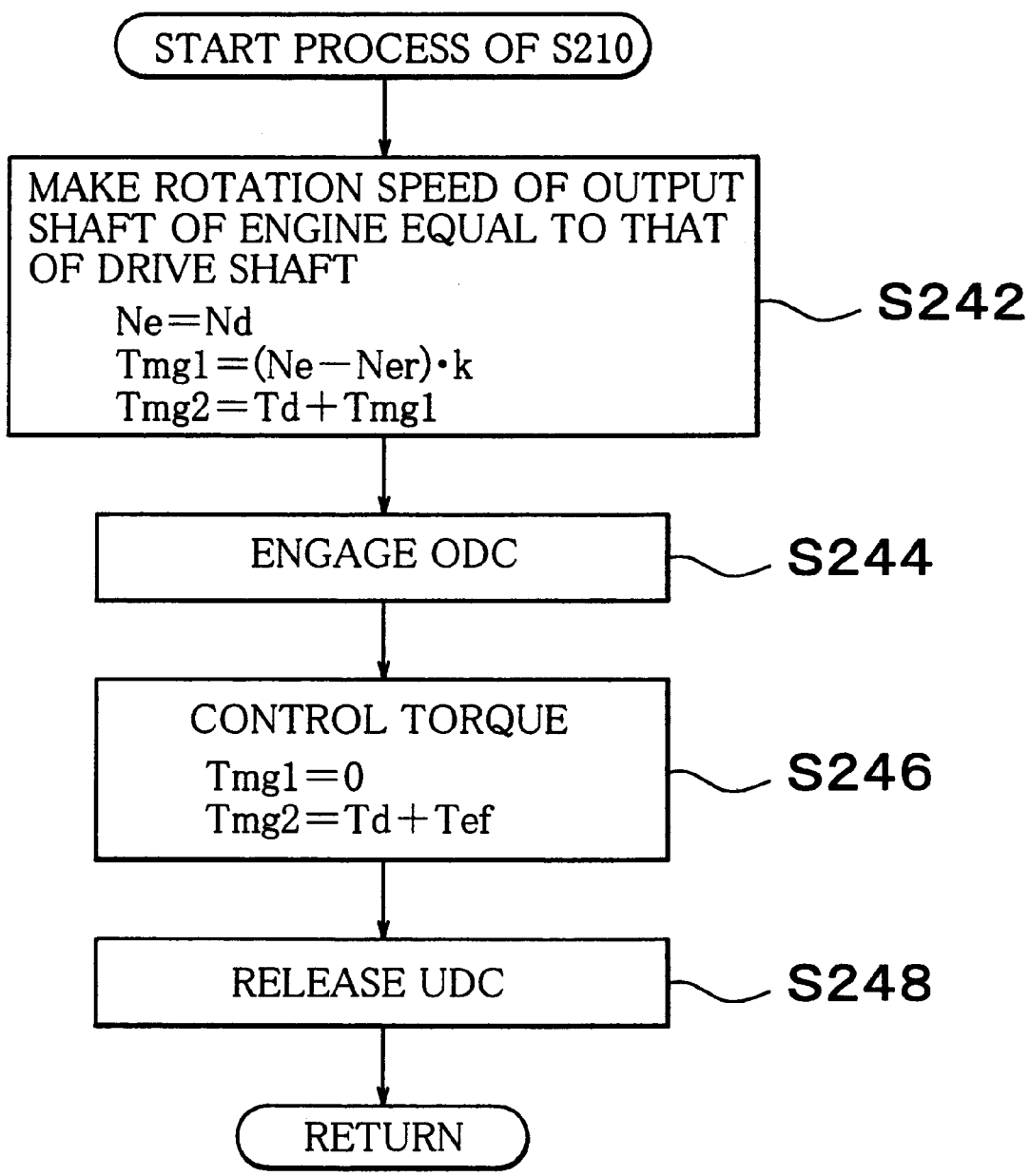
FIG. 13 is a flowchart showing a control routine as the second manner of executing step S210 in FIG. 10.

FIG. 13 is a flowchart showing a control routine according to the second method as indicated above, as another form of the process of step S210 in FIG. 10. Upon the start of the process of step S210, the ECU 60 initially executes step S242 to control the rotation speed of the output shaft of the engine 20 to be substantially equal to the rotation speed of the drive shaft, as in the case of step S142 in FIG. 8. More specifically, the ECU 60 determines the target rotation speed Ne of the engine 20, and the torque Tmg1 of the motor MG1 and the torque Tmg2 of the motor MG2 according to the respective expressions (9) as indicated above, and performs control so as to satisfy the expressions (9), Namely, the ECU 60 controls the MG1 inverter 70 to adjust the torque Tmg1 of the motor MG1 so that the rotation speed Ne of the engine 20 becomes substantially equal to the rotation speed Nd of the drive shaft, and controls the MG2 inverter 72 so that the torque Tmg2 of the motor MG2 becomes substantially equal to the sum of the torque Td of the drive shaft and the torque Tmg1 of the motor MG1. As a result, the rotation speed of the crankshaft 21 as the output shaft of the engine 20 becomes substantially equal to that of the outer rotor shaft 35.

The ECU 60 then executes step S244 to control the switchable clutch assembly 50 so as to engage the overdrive clutch ODC, as in the case of step S232 in FIG. 12. Since the underdrive clutch UDC is also in the engaged state at this time, the rotor shaft 43 of the motor MG2 is coupled with both of the outer rotor shaft 35 and the inner rotor shaft 33 of the motor MG1, and therefore the outer rotor shaft of the motor MG1 and the crankshaft 21 of the engine 20 (the inner rotor shaft 33 of the motor MG1) are directly coupled with each other through the switchable clutch assembly 50.

Subsequently, the ECU 60 executes step S246 to determine the torque of the motor MG1 and the torque Tmg2 of the motor MG2 according to the respective expressions (10), and performs control so as to satisfy these expressions (10).

More specifically, the ECU 60 controls the MG1 inverter 70 to turn off all of the transistors within the MG1 inverter 70, so that the torque Tmg1 of the motor MG1 is made substantially equal to zero. Also, the ECU 60 controls the MG2 inverter 72 so that the torque Tmg2 of the motor MG2 becomes substantially equal to the sum of the target torque Td of the drive shaft and the friction torque Tef of the engine 20.

The operation performed in this step is the same as that of step S234 in FIG. 12, and therefore will not be explained herein.

Subsequently, the ECU 60 controls the switchable clutch assembly 50 to release the underdrive clutch UDC. As a result, the rotor shaft 43 of the motor MG2 that was coupled with the outer rotor shaft 35 and the inner rotor shaft 33 is uncoupled from the outer rotor shaft 35, and coupled only with the inner rotor shaft 33, thus establishing OD coupling.

Upon completion of the process of step S248 as described above, the control routine as shown in FIG. 13 is finished, and the ECU 60 returns to the process as shown in FIG. 10.

In the second method as shown in FIG. 13, the coupling state of the rotor shaft 43 of the motor MG2 switches from UD coupling to OD coupling only after the rotation speed of the inner rotor shaft 33 of the motor MG1 (the crankshaft 21 of the engine 20) is made substantially equal to the rotation speed of the outer rotor shaft 35. Thus, switching from UD coupling to OD coupling can be smoothly accomplished without causing any shock upon switching.

When the UD coupling is switched to the OD coupling in the first method as shown in FIG. 12, the overdrive clutch ODC is immediately engaged as described above. At this time, the crankshaft 21 of the engine 20 (the inner rotor shaft 33 of the engine 20) is at rest and its rotation speed is 0 rpm, while the outer rotor shaft 35 as the drive shaft is rotating. If the rotation speed of the outer rotor shaft 35 is 1000 rpm, for example, a difference between the rotation speed of the crankshaft 21 and that of the outer rotor shaft 35 becomes equal to 1000 rpm. Where a clutch having a small engaging capability (engagement capacity) is used as the overdrive clutch ODC in the switchable clutch assembly 50, the clutch ODC may not be successfully engaged if the difference in the rotation speed is as large as 1000 rpm. In the second method as shown in FIG. 13, on the other hand, the rotation speed of the crankshaft 21 of the engine 20 is made substantially equal to that of the outer rotor shaft 35 prior to engagement of the overdrive clutch ODC, and therefore a difference in the rotation speed between the crankshaft 21 and the outer rotor shaft 35 is substantially equal to 0 rpm. Accordingly, the overdrive clutch ODC may be easily engaged even if a clutch having a small engaging capability (engagement capacity) is used as the overdrive clutch ODC in the clutch assembly 50. This leads to reduction in the size and cost of the switchable clutch assembly 50.

When the overdrive clutch ODC is engaged in the first method as shown in FIG. 12, the rotation speed of the crankshaft 21 of the engine rapidly increases from zero, and torque variations and vibrations may occur as the rotation speed increases. In the second method as shown in FIG. 13, on the other hand, the rotation speed of the crankshaft 21 is increased up to the rotation speed of the drive shaft before the overdrive clutch ODC is engaged, and therefore the rotation speed of the crankshaft 21 need not be rapidly increased upon engagement of the overdrive clutch ODC. It is thus possible to suppress torque variations and vibration that would otherwise occur with a rapid increase in the rotation speed.

As in the case of the first method, the motor MG2 generates torque Tmg2 that is greater than the target torque Td of the drive shaft by an amount corresponding to the friction torque Tef of the engine, during the period from a point of time when the overdrive clutch ODC is engaged to a point of time when the underdrive clutch UDC is released. Thus, the driving torque outputted from the drive shaft will not vary during this period.

In FIG. 10, the process between "A" and "B" is similar to the process as shown in FIG. 9, and therefore will not be explained herein.

(6) Third Control Method

Figure 14:
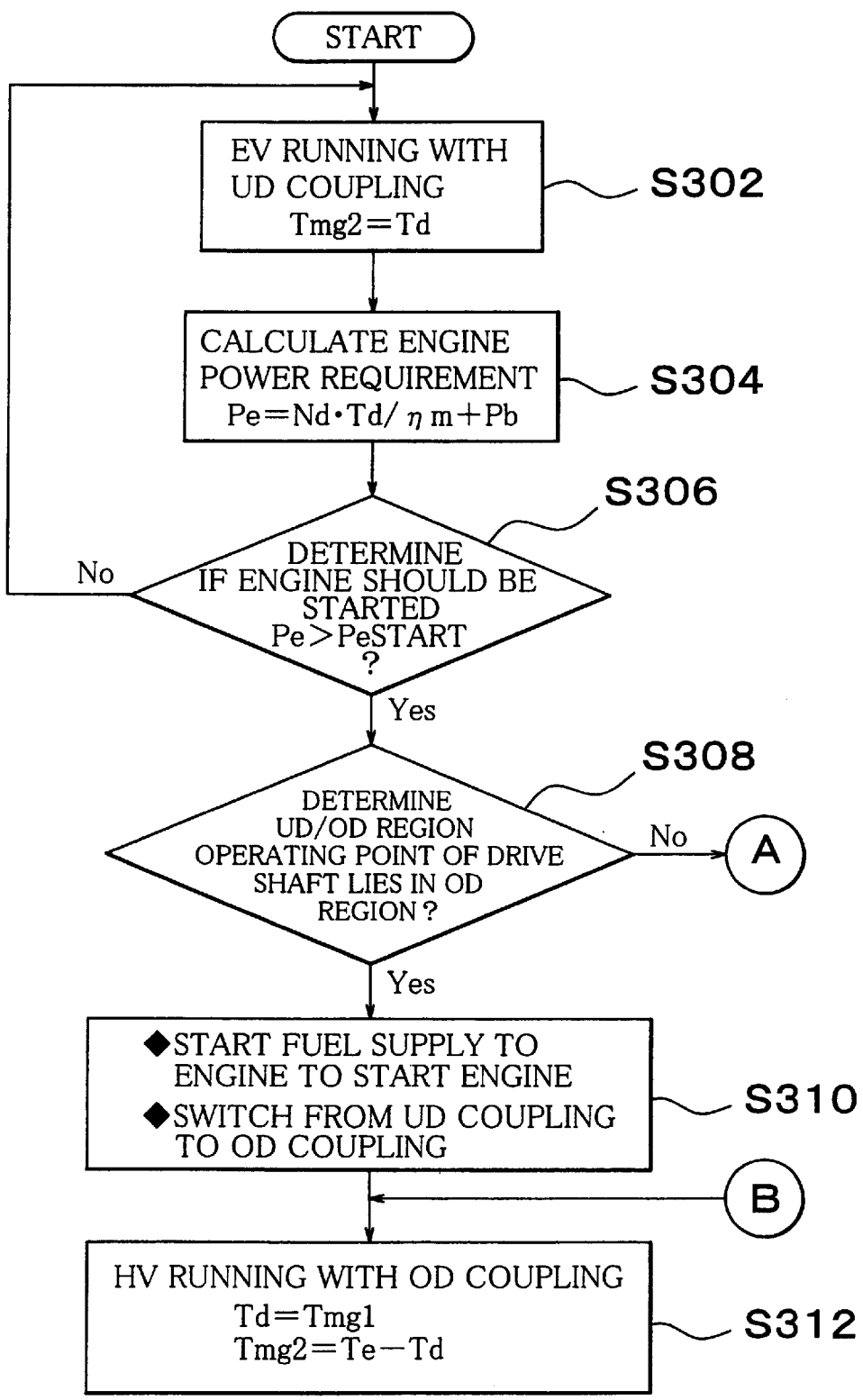
FIG. 14 is a flowchart showing a control routine of the third embodiment according to the third control method of the present invention.
Figure 15:
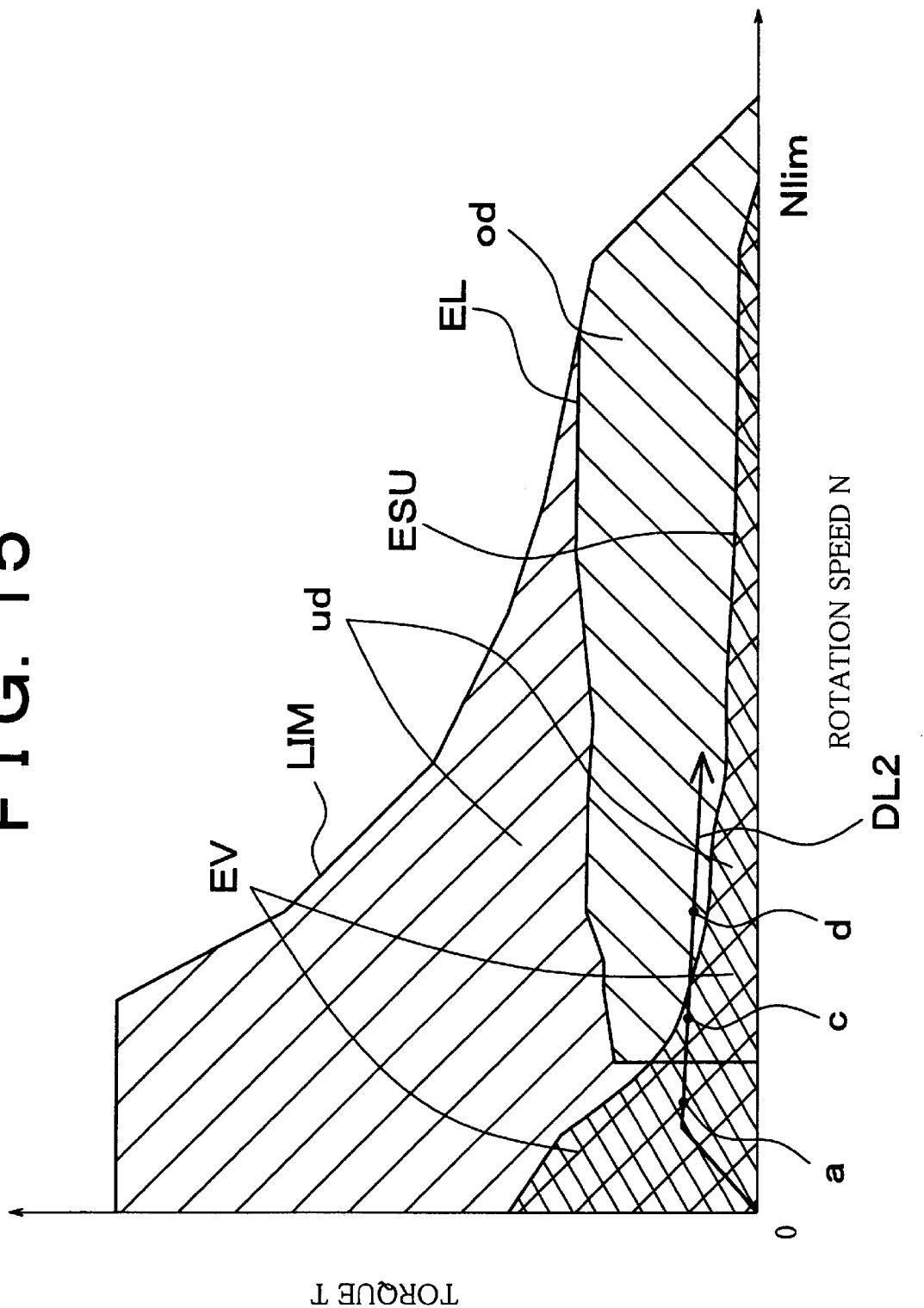
FIG. 15 is a diagram showing EV running region, UD coupling region and OD coupling region when the third control method of the present invention is employed.

FIG. 14 is a flowchart showing a control routine of the third embodiment according to the third control method of the present invention. FIG. 15 is a diagram showing EV running region, UTD coupling region, and OD coupling region when the third control method of the present invention is employed.

In FIG. 15, the vertical axis, horizontal axis, and respective curves and regions represent the same parameters or contents as those of FIG. 5, and thus will not be explained herein.

In the present embodiment, the ECU 60 performs a control operation according to the control routine as shown in FIG. 14 during a period in which the vehicle starts from rest, and is accelerated at a low rate. During this period, the operating point of the outer rotor shaft 35 of the motor MG1 as the drive shaft follows a path as indicated by curve DL2 in FIG. 15.

In the present embodiment, the operations of steps S302, 304 as shown in FIG. 14 are identical with those of steps S202, S204 as shown in FIG. 10, and therefore will not be explained herein.

The ECU 60 then executes step S306 to make an engine start judgement, namely, determine whether the engine 20 should be started or not based on the engine power requirement Pe calculated in step S304. More specifically, the ECU 60 compares the engine power requirement Pe with a predetermined threshold value PeSTART (fixed value), and determines that the engine 20 need not be started when the engine power requirement Pe is smaller than the threshold value PeSTART. In this case, the engine 20 is kept stopped, and the control flow returns to step S302 as shown in FIG. 14, to repeat the same operations as in the last cycle. If the engine power requirement Pe is larger than the threshold value PeSTART, the ECU 60 determines that the engine 20 should be started, and the control flow goes to step S308.

As in the case of step S106 of FIG. 4, the engine start judgement is made in principle by comparing the engine power requirement Pe with the threshold value PeSTART. In exceptional cases, such as when the rotation speed of the outer rotor shaft 35 as the drive shaft is in the vicinity of zero, the engine start judgement line ESU as shown in FIG. 15 is used. More specifically, the ECU 60 determines that the engine 20 should be started if the operating point of the outer rotor shaft 35 as the drive shaft lies in the upper right-hand region defined by the engine start judgement line ESU shown in FIG. 15, and determines that the engine 20 need not be started if the operating point lies in the lower left-hand region.

If the current operating point of the outer rotor shaft 35 as the drive shaft is located at point "a" on curve DL2 in FIG. 15, for example, the ECU 60 determines that the engine 20 need not be started since the operating point lies in the lower left-hand region defined by the engine start judgement line ESU, and returns to step S302 to repeat the above steps S302, S304 and S306.

Even in the case where the current operating point of the outer rotor shaft 35 as the drive shaft is located at point "c" on curve DL2 in FIG. 15, the ECU 60 determines that the engine 20 need not be started since the operating point lies in the lower left-hand region defined by the engine start judgement line ESU, as in the case of point "a", and returns to step S302 to repeat the above steps S302, S304 and S306.

In the present embodiment, switching from UD coupling to OD coupling is not carried out even where the operating point of the drive shaft passes the UD/OD region boundary EL and enters the OD region, and the vehicle is kept running in the EV mode with UD coupling, using only the motor MG2.

If the driver then depresses the accelerator pedal to accelerate the vehicle, and the operating point of the drive shaft reaches point "d" on curve DL2 shown in FIG. 15, the operating point passes the engine start judgement line ESU and enters the upper right-hand region. In this case, the ECU 60 determines that the engine 20 should be started, and the control flow goes to step S308.

In step S308, the ECU 60 makes an UD/OD region judgement. More specifically, the ECU 60 determines whether or not the operating point of the outer rotor shaft 35 as the drive shaft has passed the UD/OD region boundary EL, and lies in the OD region. If the result of the judgement indicates that the operating point of the drive shaft lies in the upper right-hand region defined by the engine start judgement line ESU, but still remains in the UD region without passing the UD/OD region boundary EL, the control flow goes to "A" of FIG. 9 as described above, as shown in FIG. 14. If the operating point of the drive shaft lies in the upper right-hand region defined by the engine start judgement line ESU, and also lies in the OD region beyond the UD/OD region boundary EL, the control flow goes to step S310. If the operating point of the drive shaft is located at point "d" on curve DL2 as shown in FIG. 15, for example, the operating point has passed the engine start judgement line ESU, and further passed the UD/OD region boundary EL to be located in the OD region. In this case, the control flow proceeds to step S310.

In step S310, the ECU 60 controls the engine 20 to start fuel supply to the engine 20 so as to start the engine 20, and controls the switchable clutch assembly 50 to effect switching from UD coupling to OD coupling. Specific contents of the process of step S310 will be briefly described later.

After the engine 20 is started and switching to OD coupling is accomplished in the above manner, the ECU 60 executes step S312 to run the vehicle in the HV mode, using the engine 20 and the motors MG1, MG2. The specific method for running the vehicle in the HV mode with OD coupling is the same as that as explained with respect to step S112 in FIG. 4, and thus will not be described herein.

In the present embodiment as described above, the vehicle runs in the EV mode with UD coupling when it is started. Unlike the second control method, switching from UD coupling OD coupling is not carried out even if the operating point of the drive shaft passes the UD/OD region boundary EL and enters the OD region, and the vehicle is kept running in the EV mode with UD coupling maintained. If the operating point of the drive shaft then passes the engine start judgement line ESU and enters the upper right-hand region defined by the judgement line ESU, fuel begins to be supplied to the engine 20, to start the engine 20, and at the same time switching from UD coupling to OD coupling is effected, so that the vehicle runs in the HV mode with OD coupling.

In the present embodiment, therefore, the entire region on the lower left-hand side of the engine start judgement line ESU, out of the operating region of the power output apparatus 10, provides region EV in which the vehicle runs in the EV mode, and the vehicle runs in the HV mode in the rest of the operating region, as shown in FIG. 15. Also, in the present embodiment, a part of the OD region located on the lower left-hand side of the engine start judgement line ESU, as well as the UD region, provides UD coupling region "ud" in which UD coupling is actually established, and the rest of the OD region provides OD coupling region "od" in which OD coupling is actually established.

In the present embodiment as described above, even if the operating point of the drive shaft enters the OD region from the UD region while the vehicle is running in the EV mode only by means of the motor MG2, switching from UD coupling to OD coupling is not carried out, and the motor MG2 continues to output driving torque. This permits smooth EV running of the vehicle over a wide vehicle speed range, without causing torque variations and vibration that would otherwise occur upon switching of coupling. If the engine start condition is subsequently satisfied, UD coupling is switched to OD coupling, and the vehicle can immediately switch from EV running to HV running.

The specific contents of the process of step S310 in FIG. 14 will be now briefly explained. In the present embodiment, the process of step S310 may be executed in a selected one of three methods as described below, similarly to the process of step S110 in FIG. 4 as described above.

In the first and second methods, fuel supply to the engine 20 is initially started so as to start the engine 20, and subsequently UD coupling is switched to OD coupling. In the third method, on the other hand, UD coupling is initially switched to OD coupling, and then fuel supply to the engine 20 is started so as to start the engine 20. In the first of these methods, the switching from UD coupling to OD coupling is carried out while the drive shaft (the outer rotor shaft 35 of the motor MG1) and the output shaft of the engine (crankshaft 21, inner rotor shaft 33 of the motor MG1) are directly coupled with each other. In the second of these methods, the switching from UD coupling to OD coupling is carried out while the rotor shaft 43 of the motor MG2 is uncoupled or disengaged from both of the drive shaft (outer rotor shaft 35 of the motor MG1) and the output shaft of the engine 20 (crankshaft 21, inner rotor shaft 33 of the motor MG1).

The first method is implemented in the same manner as explained above with reference to FIG. 6, and the second method is implemented in the same manner as explained above with reference to FIG. 7, while the third method is implemented in the same manner as explained above with reference to FIG. 8.

The process between A and B in the control routine FIG. 14 is the same as the process as shown in FIG. 9, and therefore will not be explained herein.

(7) Fourth Control Method

Figure 16:
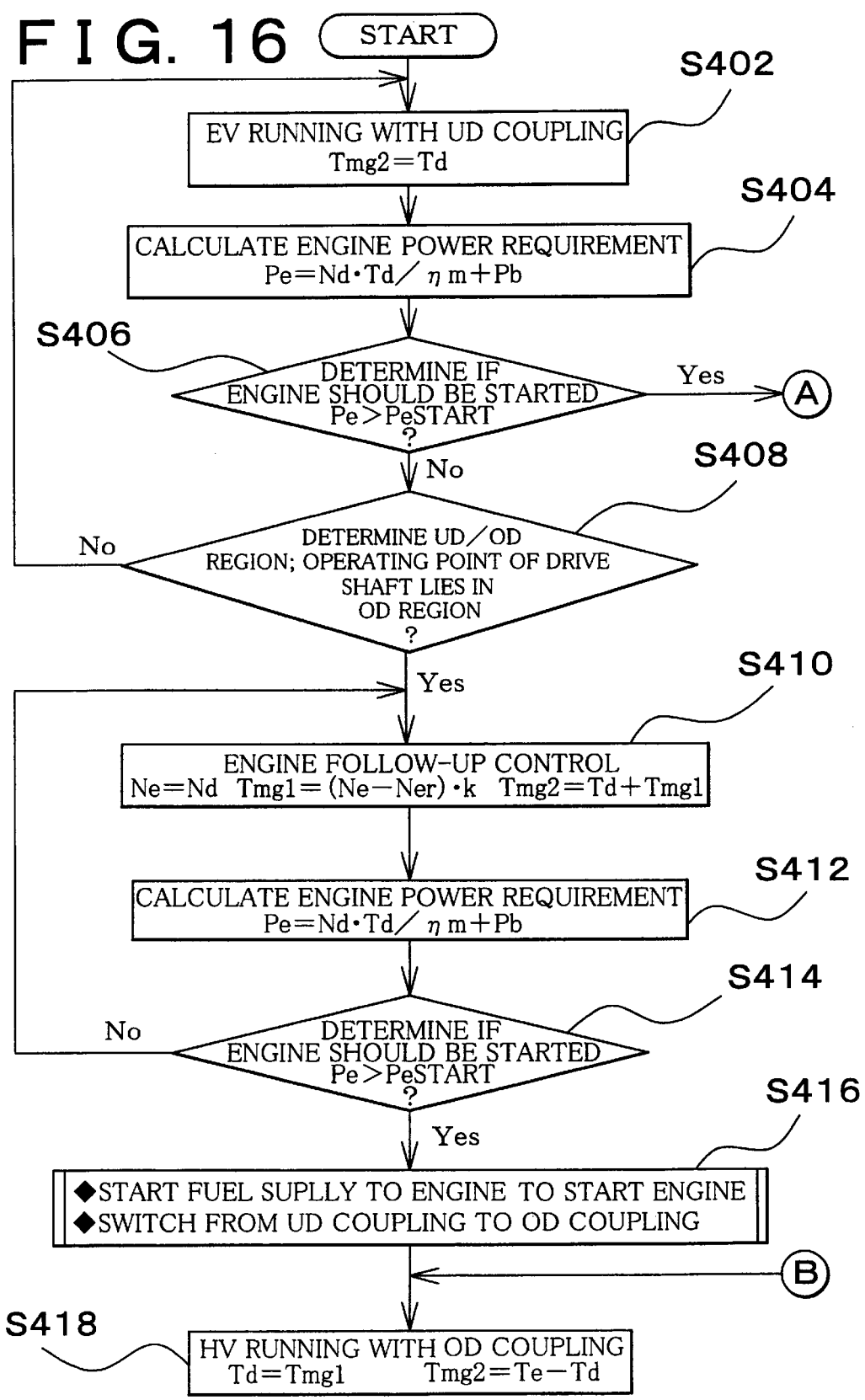
FIG. 16 is a flowchart showing a control routine of the fourth embodiment according to,the fourth control method of the present invention.
Figure 17:
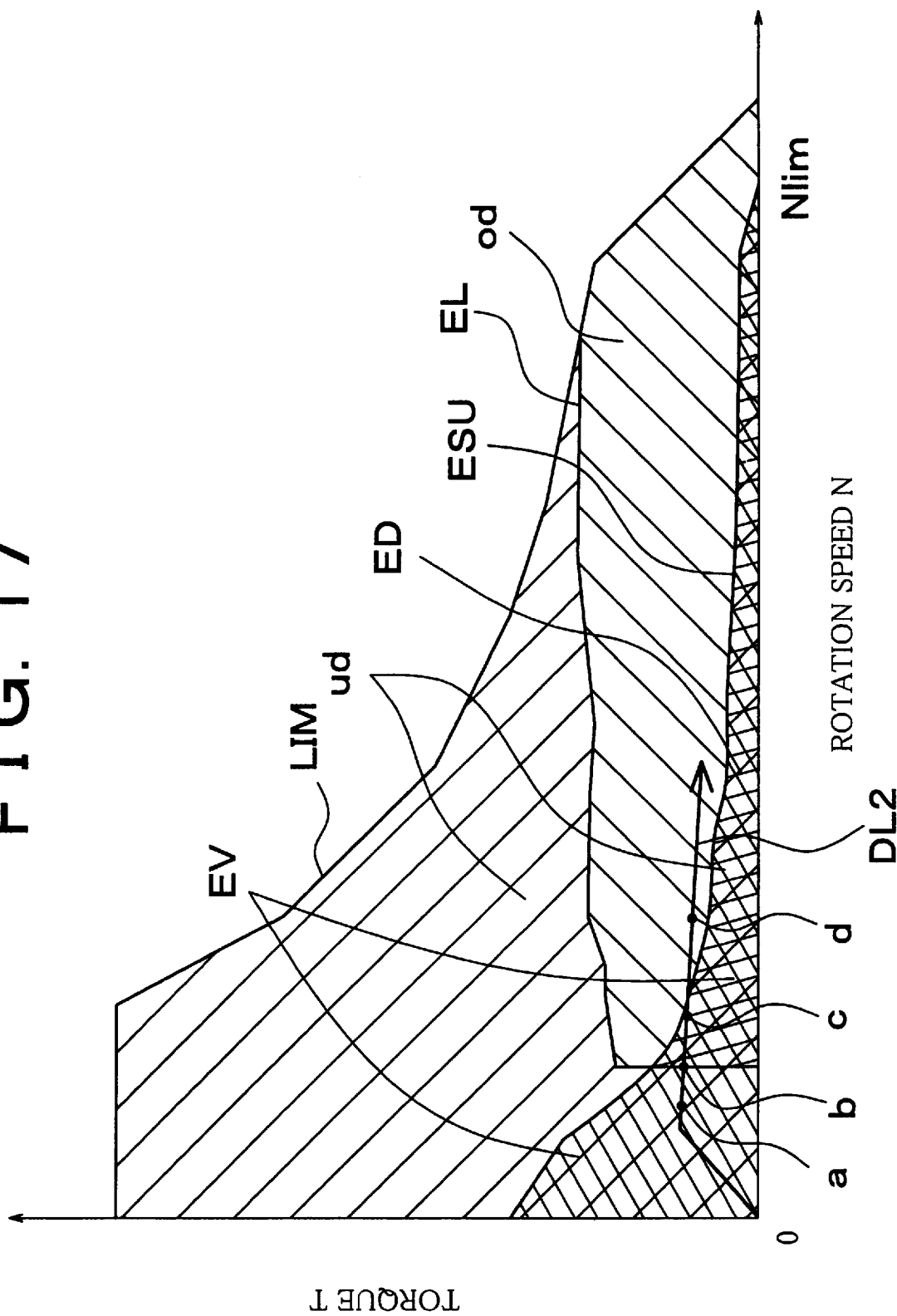
FIG. 17 is a diagram showing EV running region, UD coupling region and OD coupling region when the fourth control method of the present invention is employed.

FIG. 16 is a flowchart showing a control routine of the fourth embodiment according to the fourth control method of the present invention. FIG. 17 is a diagram showing EV running region, UD coupling region, and OD coupling region when the fourth control method of the present invention is employed.

In FIG. 17, the vertical axis, horizontal axis, and respective curves and regions represent the same parameters or contents as those of FIG. 5, and therefore will not be explained herein. In addition, "ED" denotes a region in which engine follow-up control as described later is performed.

In the present embodiment, the ECU 60 performs a control operation according to the control routine as shown in FIG. 16 during a period in which the vehicle starts from rest, and is accelerated at a low rate. During this period, the operating point of the outer rotor shaft 35 of the motor MG1 as the drive shaft follows a path as indicated by curve DL2 in FIG. 17.

In the present embodiment, the operations of steps S402~408 as shown in FIG. 16 are identical with those of steps S102~S108 as shown in FIG. 16, and thus will not be explained herein.

If the current operating point of the drive shaft is located at point "b" on curve DL as shown in FIG. 17, for example, step S408 determines that the operating point has passed the UD/OD region boundary EL and lies in the OD region, and the control flow goes to step S410 in which the ECU 60 performs control (engine follow-up control) so that the rotation speed of the output shaft of the engine 20 becomes substantially equal to that of the drive shaft. More specifically, the ECU 60 determines the rotation speed Ne of the engine, the torque Tmg1 of the motor MG1 and the torque Tmg2 of the motor MG 1, according to the respective expressions (9), and performs control so as to satisfy the expressions (9).

Namely, the ECU 60 controls the MG1 inverter 70 to adjust the torque Tmg1 of the motor MG1 so that the rotation speed Ne of the engine 20 becomes substantially equal to the rotation speed Nd of the drive shaft, and controls the MG2 inverter 72 so that the torque Tmg2 of the motor MG2 becomes substantially equal to the sum of the torque Td of the drive shaft and the torque Tmg1 of the motor MG1.

As a result, the rotation speed of the crankshaft 21 as the output shaft of the engine 20 becomes substantially equal to that of the outer rotor shaft 35, and the engine 20 is caused to rotate by external force.

At this time, the engine 20 itself is at rest with no fuel supplied thereto, and therefore no torque is generated by the engine 20. Also, no switching from UD coupling to OD coupling takes place, and therefore the vehicle is kept running in the EV mode only by means of the motor MG2 with UD coupling maintained.

The ECU 60 then executes step S412 to calculate the engine power requirement Pe again as in step S404, and executes step S414 to make an engine start judgement as in step S406. As described above, the engine start judgement is made based on two criteria, using the threshold value PeSTART and the engine start judgement line ESU. If the current operating point of the drive shaft is located at point "c" on curve DL2 as shown in FIG. 17, for example, the ECU 60 judges, based on the engine start judgement line ESU, that the engine 20 need not be started since the operating point lies in the lower left-hand region defined by the engine start judgement line ESU, and the control flow returns to step S410 as shown in FIG. 16 to repeat the above steps S410, S412 and S414. If the driver depresses the accelerator pedal to accelerate the vehicle, and the operating point of the drive shaft reaches point "d" on the curve DL2, the operating point passes the engine start judgement line ESU and enters the region on the upper right-hand side of the judgement line ESU, and the control flow goes to step S416.

In step S416, the ECU60 controls the engine 20 to start fuel supply to the engine 20 and also fire a spark plug (not shown) of the engine 20, thereby to start the engine 20. The ECU 60 also controls the switchable clutch assembly 50 to effect switching from UD coupling to OD coupling. Specific contents of the process of step S416 will be described later.

After the engine 20 is started, and switching to OD coupling is effected, the ECU 60 executes step S418 to run the vehicle in the HV mode with OD coupling, using the engine 20 and the motors MG1, MG2. The specific method of running the vehicle in the HV mode is the same as that as explained in step S112 in FIG. 4, and therefore will not be explained herein.

In the present embodiment as described above, the vehicle runs in the EV mode with UD coupling when it is started. As in the third control method, switching from UD coupling OD coupling is not carried out even if the operating point of the drive shaft passes the UD/OD region boundary EL and enters the OD region, and the vehicle is kept running in the EV mode with UD coupling maintained. Unlike the third control method, however, the engine follow-up control is performed so that the rotation speed of the output shaft of the engine becomes substantially equal to that of the drive shaft when the operating point of the drive shaft passes the UD/OD region boundary EL and enters the OD region. If the operating point of the drive shaft then passes the engine start judgement line ESU and enters the upper right-hand region defined by the judgement line ESU, fuel begins to be supplied to the engine 20, to start the engine 20, and at the same time switching from UD coupling to OD coupling is effected, so that the vehicle runs in the HV mode with OD coupling.

In the present embodiment, therefore, the entire region on the lower left-hand side of the engine start judgement line ESU, out of the operating region of the power output apparatus 10, provides region EV in which the vehicle runs in the EV mode, and the vehicle runs in the HV mode in the rest of the operating region, as shown in FIG. 17. Also, in the present embodiment, a part of the OD region located on the lower left-hand side of the engine start judgement line ESU, as well as the UD region, provides UD coupling region "ud" in which UD coupling is actually established, and the rest of the OD region provides OD coupling region "od" in which OD coupling is actually established. Also, in the present embodiment, an overlap of the OD region and the region on the lower, left-hand side of the engine start judgement line ESU provides region ED in which engine follow-up control is performed so that the rotation speed of the output shaft of the engine 20 matches that of the drive shaft.

In the present embodiment as described above, even if the operating point of the drive shaft enters the OD region from the UD region while the vehicle is running in the EV mode only by means of the motor MG2, no switching from UD coupling to OD coupling is carried out, and the motor MG2 continues to output driving torque, in a similar manner to the third control method. This permits smooth EV running of the vehicle over a wide vehicle speed range, without causing torque variations and vibration that would otherwise occur upon switching of coupling. Also, in the present embodiment, when the operating point of the drive shaft enters the OD region from the UD region, the output shaft of the engine 20 is caused to rotate by external force, such that the rotation speed of the output shaft becomes substantially equal to that of the drive shaft. Since the rotation speed of the output shaft of the engine 20 need not be increased from zero when the engine start condition is subsequently satisfied, switching from UD coupling to OD coupling and starting of the engine 20 with fuel supply to the engine 20 can be accomplished in a moment, thus enabling the vehicle to immediately start running in the HV mode. This leads to an improved response of the driving torque of the vehicle to an acceleration demand of the driver.

The specific contents of the process of step S416 in FIG. 17 will be now explained. In the present embodiment, the process of step S416 may be executed in a selected one of three methods as described below, similarly to the process of step S110 in FIG. 4 as described above.

In the first and second methods, the fuel supply to the engine 20 is initially started so as to start the engine 20, and then the coupling state in the switchable clutch assembly 50 is switched from UD coupling to OD coupling. In the third method, on the other hand, switching from UD coupling to OD coupling is initially effected, and then the fuel supply to the engine 20 is started so as to start the engine 20. In the first of these methods, the switching from UD coupling to OD coupling is carried out while the drive shaft (the outer rotor shaft 35 of the motor MG1) and the output shaft of the engine (crankshaft 21, inner rotor shaft 33 of the motor MG1) are directly coupled with to each other. In the second of these methods, the switching from UD coupling to OD coupling is carried out while the rotor shaft 43 of the motor MG2 is uncoupled from both of the drive shaft (outer rotor shaft 35 of the motor MG1) and the output shaft of the engine 20 (crankshaft 21, inner rotor shaft 33 of the motor MG1).

Figure 18:
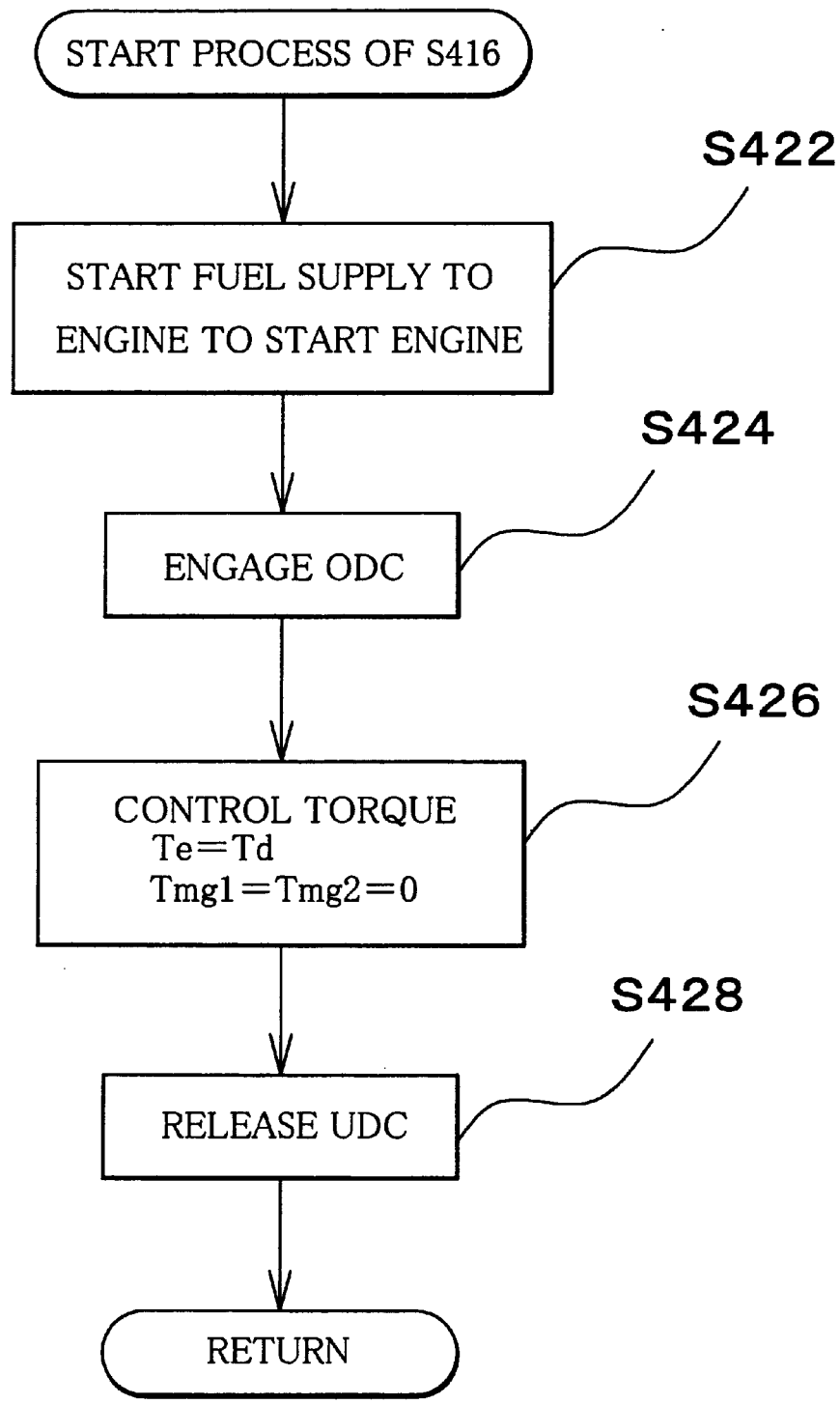
FIG. 18 is a flowchart showing a control routine as the first manner of executing step S416 in FIG. 17.
Figure 19:
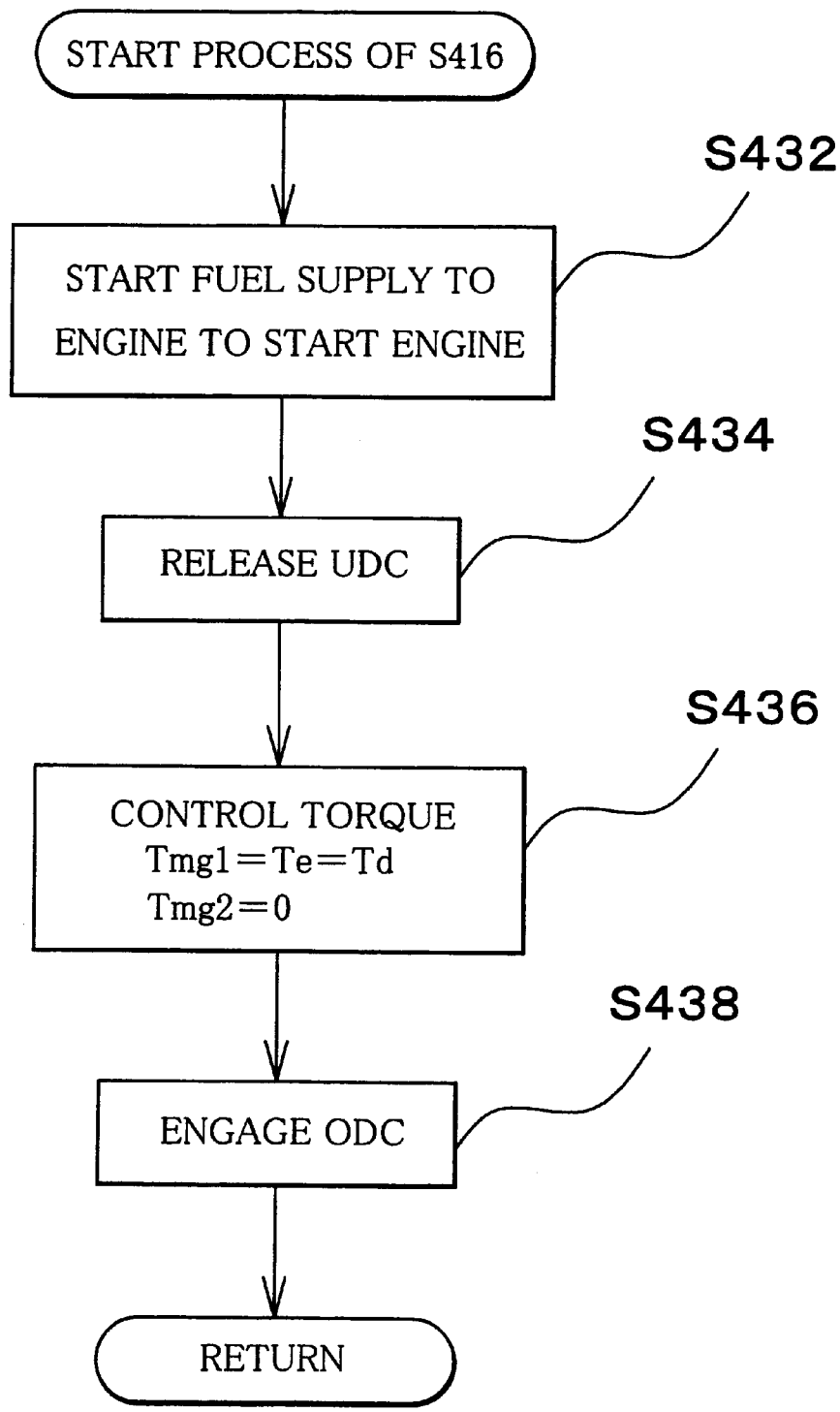
FIG. 19 is a flowchart showing a control routine as the second manner of executing step S416 in FIG. 17.

FIG. 18 is a flowchart showing a control routine according to the first method, as one form of the process of step S416 in FIG. 16. FIG. 19 is a flowchart showing a control routine according to the second method, as another form of the process of step S416 in FIG. 16. The operation of step S422 in FIG. 18 and that of step S432 in FIG. 19 are identical with each other, and will therefore be explained once herein.

Once the process of step S416 is started, the ECU 60 initially executes step S422 or S432 to control the engine 60 to start fuel supply to the engine 20 and also to fire a spark plug (not shown) of the engine 20, thereby to start the engine 20. Since the crankshaft 21 as the output shaft of the engine 20 has been already rotating, the engine 20 is immediately started upon the start of fuel supply to the engine 20. Accordingly, there is no need to cause the motor MG1 to generate the engine start torque at the inner rotor shaft 33 to force the crankshaft 21 of the engine 20 to be rotated, or cause the motor MG2 to cancel the reaction torque that arises at the outer rotor shaft 35, unlike the case of step S122 in FIG. 6 or step S132 in FIG. 7 as described above.

Also, the rotation speed of the crankshaft 21 has already been substantially equal to that of the outer rotor shaft 35 as the drive shaft, owing to the engine follow-up control. It is therefore unnecessary to positively control the engine 20 even after the start of the engine 20 so that the rotation speed of the engine 20 becomes equal to that of the drive shaft, unlike the case of step S122 in FIG. 6 or step S132 in FIG. 7.

In FIG. 18, the operations of step S424~S428 following step S422 are the same as those of steps S124~S128 in FIG. 6 as described above, and therefore will not be explained herein. In FIG. 19, the operations of steps S434~S438 are the same as those of steps S134~S138 in FIG. 7 as described above, and therefore will not be explained herein.

Figure 20:
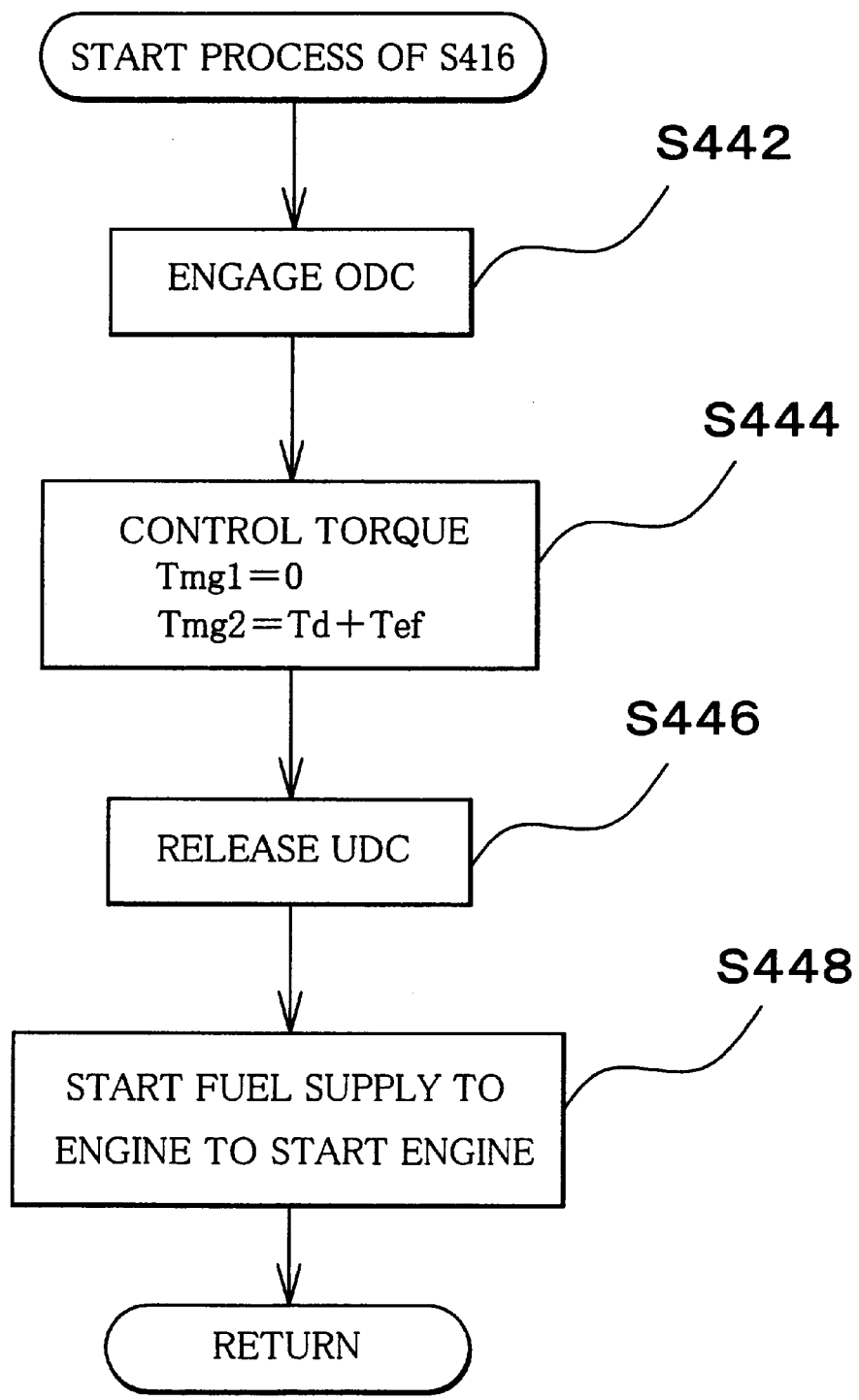
FIG. 20 is a flowchart showing a control routine as the third manner of executing step S416 in FIG. 17.

FIG. 20 is a flowchart showing the control procedure of the third method in which the process of step S416 in FIG. 17 may also be executed. Once step S416 is initiated, the ECU 60 executes step S442 to immediately control the switchable clutch assembly 50 to engage the overdrive clutch ODC.

At this time, the rotation speed of the crankshaft 21 as the output shaft of the engine 20 has been already substantially equal to that of the outer rotor shaft 35 as the drive shaft, owing to the engine follow-up control. This eliminates a need to positively control the engine 20 so that the rotation speed of the output shaft of the engine 20 matches that of the drive shaft, and an operation to switch from UD coupling to OD coupling can be immediately started, unlike the case of step S142 in FIG. 8 as described above.

In FIG. 20, the operations of steps S444~S448 following step S442 are identical with those of steps S146~S150 in FIG. 8 as described above, and therefore will not be explained herein.

Also, the process between A and B in FIG. 17 is similar to that as shown in FIG. 9, and thus will not be explained herein.

(8) Fifth Control Method

In the above-described third control method (third embodiment) as shown in FIG. 14, the process of steps S302~S306 as shown in FIG. 14 is repeated unless the operating point of the outer rotor shaft 35 as the drive shaft passes the engine start judgement line ESU and enters the upper right-hand region of the judgement line ESU, irrespective of whether the operating point of the outer rotor shaft 35 lies in the UD region as indicated by point "a" in FIG. 15, or lies in the OD region as indicated by point "c" in FIG. 15 after passing the UD/OD region boundary EL with the vehicle further accelerated. Thus, the ECU 60 keeps the vehicle running in the EV mode only by means of the motor MG2, without effecting switching from UD coupling to OD coupling.

In the fourth control method (fourth embodiment) as shown in FIG. 16, the process of steps S410~S414 as shown in FIG. 16 is repeated unless the operating point of the outer rotor shaft 35 as the drive shaft passes the engine start judgement line ESU and enters the upper right-hand region of the judgement line ESU, even where the operating point of the outer rotor shaft 35 has passed the UD/OD region boundary EL and lies in the OD region, as indicated by point "c" in FIG. 17. Thus, although the engine follow-up control is performed, no switching from OD coupling to UD coupling is effected, and the vehicle is kept running in the EV mode only by means of the motor MG2 with UD coupling maintained, as in the case of the third control method.

Since the rotor shaft 43 of the motor MG2 is coupled with the outer rotor shaft as the drive shaft when UD coupling is established, the rotation speed Nd of the drive shaft is equal to the speed of the motor MG2 (i.e., the rotation speed of the rotor shaft 43).

In the meantime, a permissible maximum speed of rotation of the motor MG2 is set on the basis of a limit to its performance, and the rotation speed Nmg2 of the motor MG2 is limited to be equal to or lower than the permissible maximum rotation speed.

Accordingly, where the vehicle is kept running in the EV mode only by means of the motor MG2 with the UD coupling maintained as described above, the rotation speed Nd of the outer rotor shaft 35 as the drive shaft is also limited to be equal to or lower than the permissible maximum rotation speed of the motor MG2. It is therefore difficult to run the vehicle in the EV mode while further increasing the rotation speed Nd of the drive shaft.

In this case, if the permissible maximum rotation speed of a motor used as the motor MG2 is set to a speed that is higher than the rotation speed Nlim as shown in FIG. 15 or FIG. 17, for example, the rotation speed Nmg2 of the motor MG2 does not exceed the permissible maximum rotation speed, and also the rotation speed Nd of the drive shaft does not exceed the permissible maximum rotation speed, as long as the operating point of the drive shaft lies in the region on the lower left-hand side of the engine start judgement line ESU. Accordingly, the ECU 60 is able to keep the vehicle running in the EV mode only by means of the motor MG2, with UD coupling maintained. If the motor having such a high permissible maximum rotation speed is used as the motor MG2, however, the size of the motor will be undesirably increased.

In the fifth control method of the present invention, therefore, switching from UD coupling to OD coupling is effected when the rotation speed Nmg2 of the motor MG2 exceeds a predetermined particular rotation speed, so as to solve the above-described problem.

With the OD coupling thus established, the rotor shaft 43 of the motor MG2 is coupled with the crankshaft 21 as the output shaft of the engine 20, and uncoupled or disengaged from the outer rotor shaft 35 as the drive shaft. In this case, therefore, the rotation speed Nd of the drive shaft has no relationship with the rotation speed Nmg2 of the motor MG2 (namely, rotation speed of the rotor shaft 43), and may be higher than the rotation speed Nmg2 of the motor MG2.

There will be now explained the case where the fifth control method of the present invention is applied to the third embodiment as shown in FIG. 14, and the case where the fifth control method is applied to the fourth embodiment as shown in FIG. 16.

Figure 21:
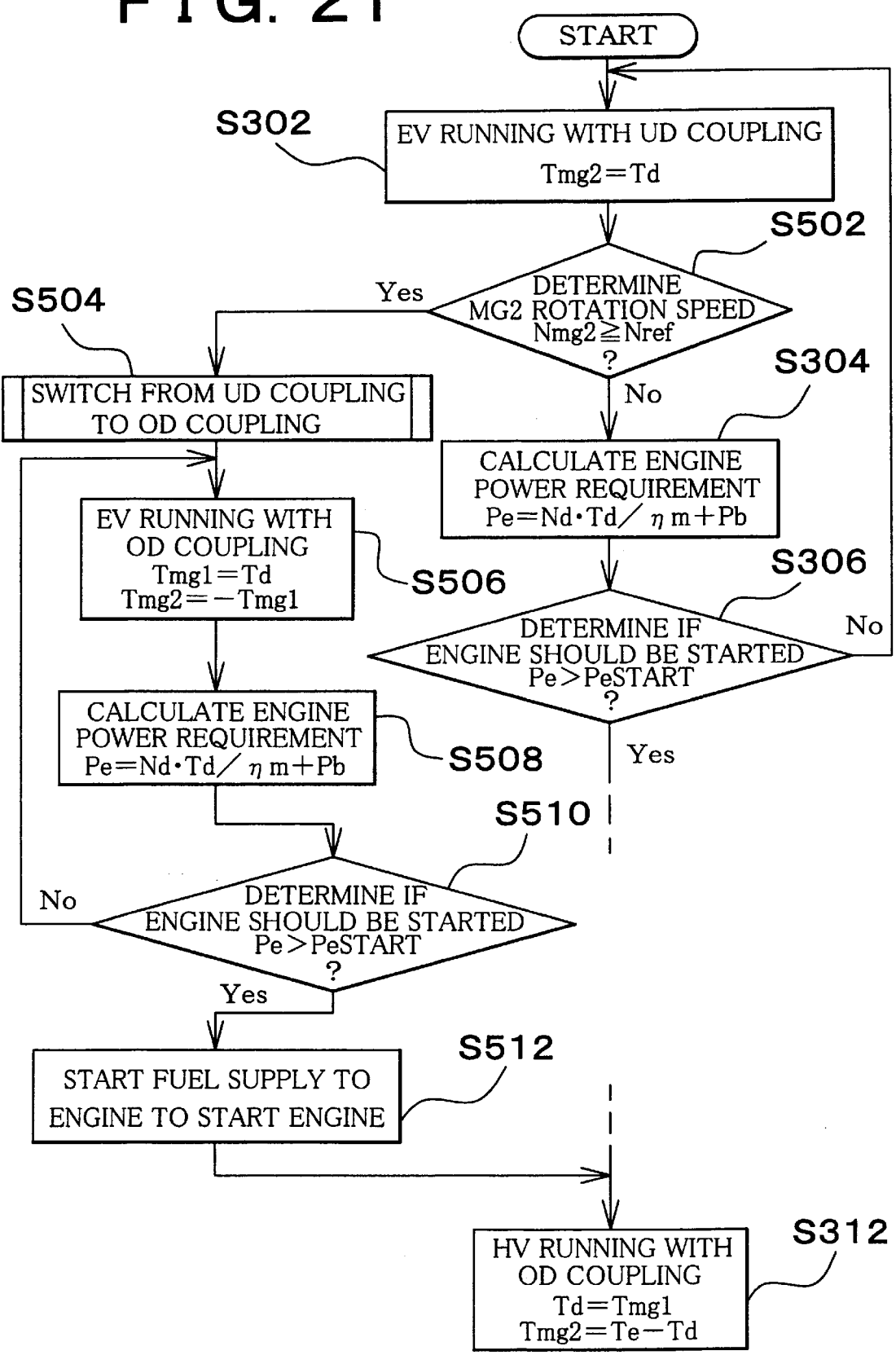
FIG. 21 is a flowchart showing a control routine of the fifth embodiment according to the fifth control method of the present invention.

FIG. 21 is a flowchart showing a control routine of the fifth embodiment according to the fifth control method of the present invention. In the present embodiment, the fifth control method is applied to the third embodiment as shown in FIG. 14.

Figure 22:
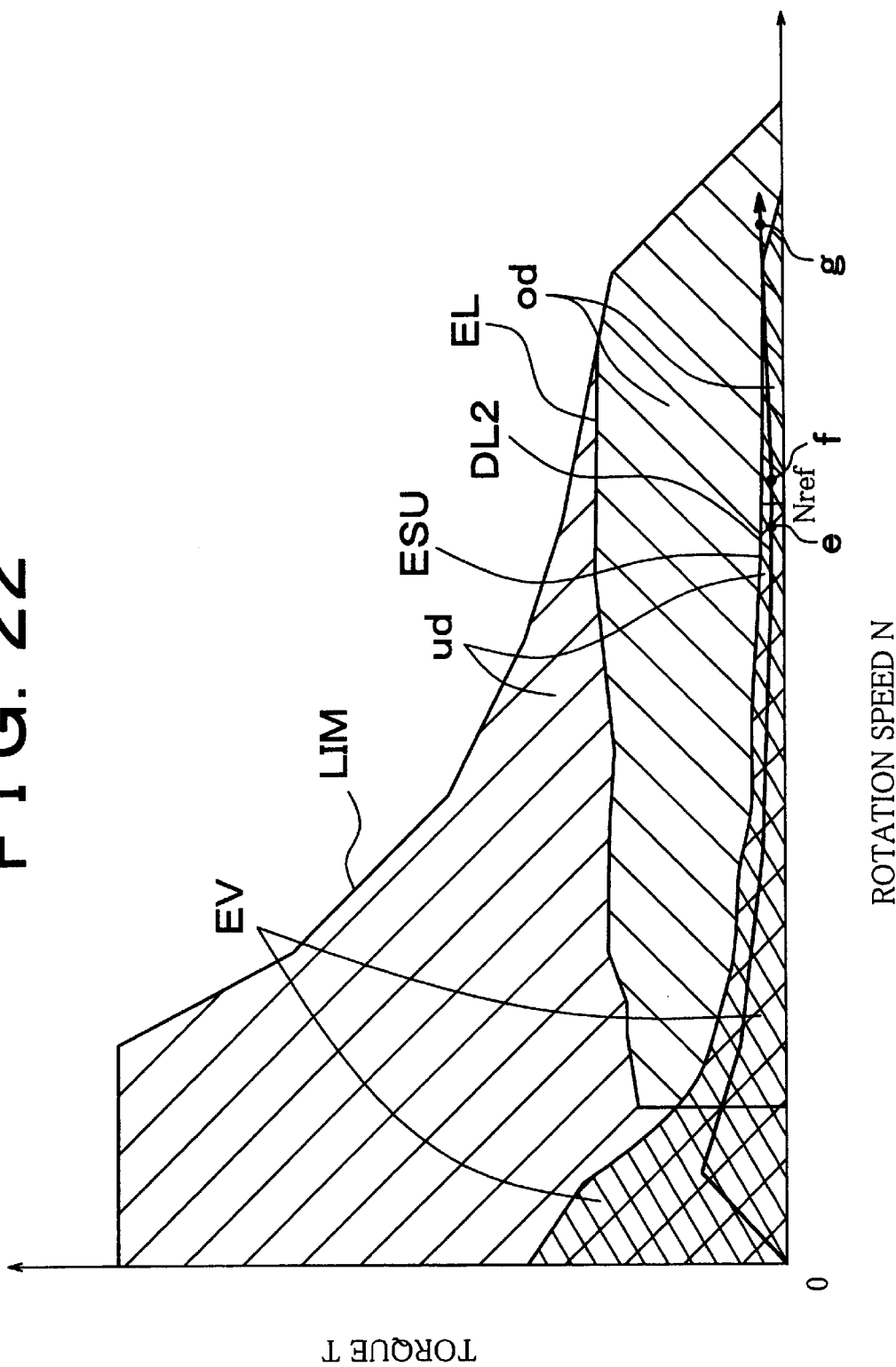
FIG. 22 is a diagram showing EV running region, UD coupling region and OD coupling region when the fifth control method of the present invention is employed.

FIG. 22 is a diagram showing EV running region, UD coupling region, and OD coupling region in the fifth embodiment. In FIG. 22, the vertical axis, horizontal axis, and respective curves and regions represent the same parameters or contents as those of FIG. 5, and thus will not be explained herein.

In the present embodiment, the ECU 60 performs a control operation according to the control routine as shown in FIG. 21 during a period in which the vehicle starts from rest, and is accelerated at a low rate. During this period, the operating point of the outer rotor shaft 35 of the motor MG1 as the drive shaft follows a path as indicated by curve DL2 in FIG. 22.

As described above, in the above-described third control method (third embodiment) as shown in FIG. 14, the process of steps S302~S306 as shown in FIG. 14 is repeated unless the operating point of the outer rotor shaft 35 as the drive shaft passes the engine start judgement line ESU and enters the upper right-hand region defined by the judgement line ESU, even where the operating point of the outer rotor shaft 35 has passed the UD/OD region boundary EL and lies in the OD region. Thus, the ECU 60 keeps the vehicle running in the EV mode only by means of the motor MG2, without effecting switching from UD coupling to OD coupling. In the present embodiment, step S502 as described below is initially executed between the operations of step S302 and step S304, as shown in FIG. 21.

In step S502, the ECU 60 reads the rotation speed Nmg2 of the motor MG2 from a motor speed sensor (not shown), and determines whether the rotation speed Nmg2 is equal to or higher than a predetermined particular rotation speed Nref or not. Here, if the permissible maximum rotation speed of the motor MG2 is set to Nmg2max in view of its performance limit, the particular rotation speed Nref is set to an appropriate value that is equal to or smaller than the permissible maximum rotation speed Nmg2max.

If step S502 determines that the rotation speed Nmg2 of the motor MG2 is lower than the particular rotation speed Nref, the ECU 60 executes the above-indicated step S304. If step S502 determines that the rotation speed Nmg2 is equal to or higher than the particular rotation speed Nref, on the other hand, the control flow goes to step S504.

When the UD coupling is established, the rotor shaft 43 of the motor MG2 is coupled with the outer rotor shaft 35 as the drive shaft as described above, and therefore the rotation speed Nmg2 of the motor MG2 is equal to the rotation speed Nd of the drive shaft. If the current operating point of the drive shaft is located at point "e" on curve DL2 as shown in FIG. 22, therefore, the rotation speed Nd of the outer rotor shaft 35 as the drive shaft (namely, the rotation speed Nmg2 of the motor MG2) is lower than the particular rotation speed Nref, and the control flow goes to step S304. If the driver depresses the accelerator pedal, to accelerate the vehicle until the operating point of the drive shaft reaches point "f" on curve DL2, the rotation speed Nd of the outer rotor shaft 35 as the drive shaft (namely, rotation speed Nmg2 of the motor MG2) exceeds the particular rotation speed Nref, and the control flow goes to step S504.

In step S504, the ECU 60 controls the switchable clutch assembly 50 to perform switching from UD coupling to OD coupling.

At this time, the crankshaft 21 of the engine 20 (the inner rotor shaft 33 of the motor MG1) is at rest, and the engine speed is 0 rpm. On the other hand, the rotation speed Nd of the outer rotor shaft 35 as the drive shaft exceeds Nref, and if the current rotation speed Nd is 5000 rpm, for example, a difference in the rotation speed between the crankshaft 21 and the outer rotor shaft 35 is as large as 5000 rpm. In this situation, the switchable clutch assembly 50 may not be able to perform switching from UTD coupling to OD coupling.

In the present embodiment, therefore, the rotation speed of the crankshaft 21 of the engine 20 is made substantially equal to that of the outer rotor shaft 35 before engagement of the overdrive clutch ODC, and the overdrive clutch ODC is engaged in this condition.

The specific method of switching the coupling state has already been explained with reference to FIG. 13, and thus will not be explained herein.

After switching to OD coupling, the ECU 60 executes step S506 to keep running the vehicle in the EV mode with OD coupling, using the motors MG1, MG2. More specifically, the ECU 60 determines the torque Tmg1 of the motor MG1 and the torque Tmg2 of the motor MG2 according to the above-indicated expressions (12), and performs control so as to satisfy the expressions (12).

More specifically, the ECU 60 controls the MG1 inverter 70 to operate the motor MG1 so that the torque Tmg1 of the motor MG1 becomes substantially equal to the target torque Td of the outer rotor shaft 35 as the drive shaft, and controls the MG2 inverter 72 so that the torque Tmg2 of the motor MG2 becomes substantially equal to the torque (−Tmg1) having the same magnitude as the torque Tmg1 of the motor MG1 and acting in the direction opposite to that of the torque Tmg1.

Since the motor MG1 generates the torque Tmg1 at the outer rotor shaft 35 as the drive shaft, the outer rotor shaft 35 outputs a driving torque that is substantially equal to the target torque Td (=Tmg1) of the drive shaft. At this time, the motor MG2 generates the reverse torque (−Tmg1) of the same magnitude as the torque (Tmg1) generated by the motor MG1, at the rotor shaft 43 connected to the inner rotor shaft 33 of the motor MG1 via the switchable clutch assembly 50, thereby to cancel reaction force produced by the motor MG1. Thus, the vehicle runs in the EV mode with the OD coupling, using the motors MG1, MG2.

The ECU 60 then executes step S508 to calculate the engine power requirement Pe again, and executes step S510 to make an engine start judgement. At this time the engine start judgement is made based on two criteria, using the threshold value PeSTART and the engine start judgement line ESU, as described above. If the current operating point of the drive shaft is located at point "f" on curve DL2 as shown in FIG. 22, for example, the ECU 60 judges based on the engine start judgement line ESU that the engine 20 need not be started since the operating point lies in the lower left-hand region defined by the engine start judgement line ESU, and the control flow returns to step S506 to repeat steps S506, S508 and S510. If the vehicle is further accelerated, and the operating point of the drive shaft reaches point "g" on curve DL2, the control flow goes to step S512 since the operating point has passed the engine start judgement line ESU and enters the upper right-hand region defined by the judgement line ESU.

In step S512, the ECU60 controls the engine 20 to start fuel supply to the engine 20 and also to fire a spark plug (not shown) of the engine 20, thereby to start the engine 20. At the same time, the ECU 60 controls the MG2 inverter 72 to cause the motor MG2 to generate an engine start torque at the rotor shaft 43 linked with the crankshaft 21 of the engine 20 through the switchable clutch assembly 50, to rotate the crankshaft 21 of the engine 20 by external force, thereby to start the engine 20.

Once the engine 20 is started, the ECU 60 executes step S312 to run the vehicle in the HV mode with OD coupling, using the engine 20 and the motors MG1, MG2.

In the present embodiment, the vehicle runs in the EV mode with UD coupling when it is started. When the operating point of the drive shaft passes the UD/OD region boundary EL and enters the OD region, no switching from UD coupling to OD coupling takes place, and the vehicle keeps running in the EV mode with UD coupling. If the rotation speed Nmg2 of the motor MG2 becomes equal to or higher than the particular rotation speed Nref, however, switching from UD coupling to OD coupling is effected, and thereafter the vehicle runs in the EV mode with OD coupling. If the operating point of the drive shaft further passes the engine start judgement line ESU and enters the upper right-hand region defined by the judgement line ESU, fuel begins to be supplied to the engine 20, to thus start the engine 20, and thereafter the vehicle runs in the HV mode with OD coupling.

In the present embodiment, therefore, the entire region on the lower left-hand side of the engine start judgement line ESU within the operating region of the power output apparatus 10 provides region EV in which the vehicle runs in the EV mode. In the rest of the operating region, the vehicle runs in the HV mode. Also, in the present embodiment, the UD region and a part of the OD region on the lower left-hand side of the engine start judgement line ESU in which the rotation speed (Nmg2) is lower than the particular rotation speed Nref provides an UD coupling region "ud" in which the UD coupling is actually established, and the rest of the OD region provides an OD coupling region "od" in which the OD coupling is actually established.

In the present embodiment, if the rotation speed Nmg2 of the motor MG2 becomes equal to or higher than the particular rotation speed Nerf while the vehicle is running in the EV mode only by means of the motor MG2 with UD coupling, switching from UD coupling to OD coupling is carried out, so that the outer rotor shaft 35 as the drive shaft is uncoupled from the rotor shaft 43 of the motor MG2. As a result, the rotation speed Nd of the drive shaft bears no relation to the rotation speed Nmg2 of the motor MG2 any longer, and can be increased to be higher than the rotation speed Nmg2 of the motor MG2. Thus, the rotation speed Nd of the drive shaft is not limited to the permissible maximum rotation speed Nmg2max of the motor MG2, and therefore the motor MG2 may consist of a motor whose permissible maximum rotation speed Nmg2max is set relatively low, resulting in reduction in the size and cost of the motor.

Figure 23:
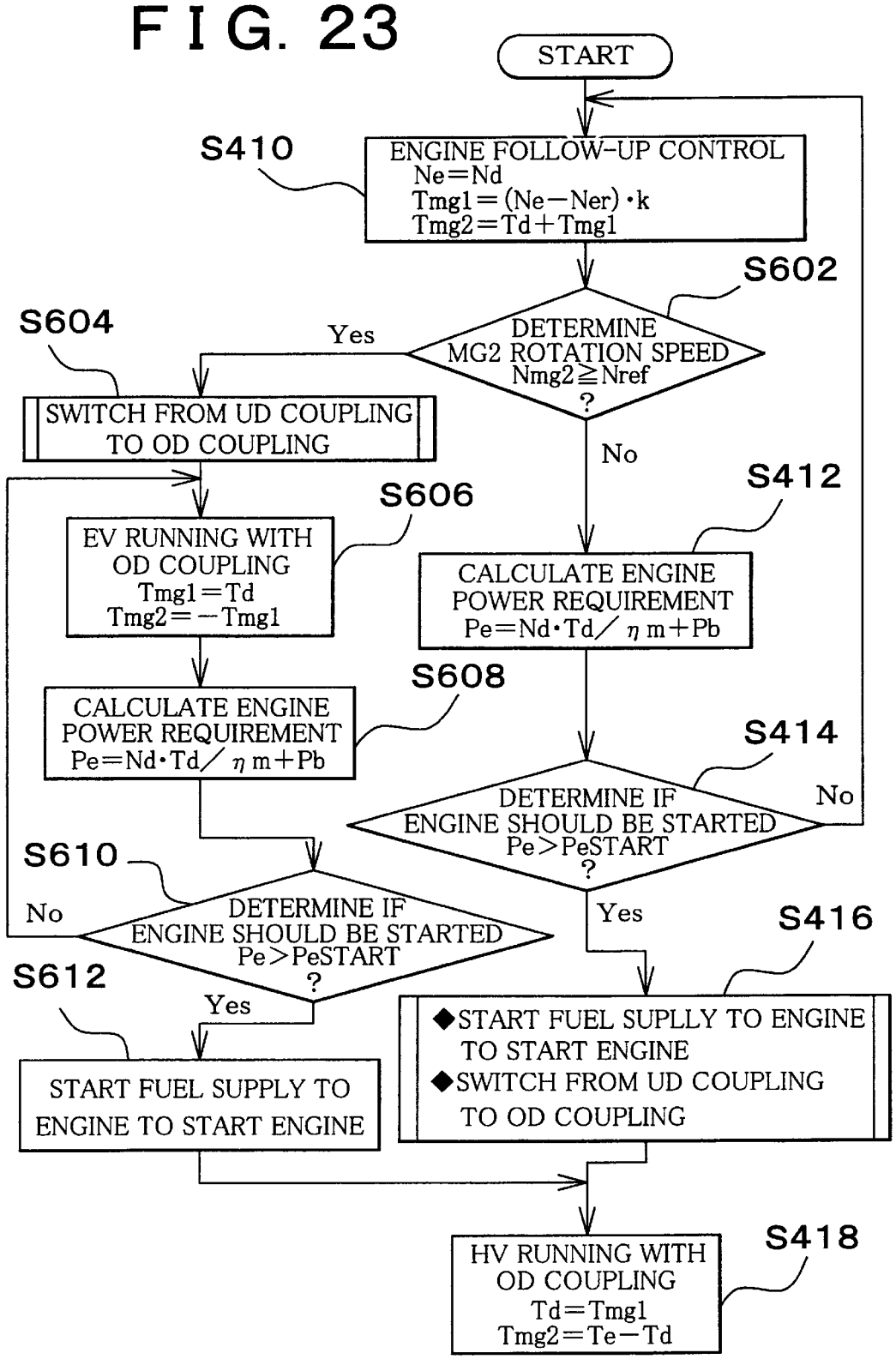
FIG. 23 is a flowchart showing a control routine of the sixth embodiment according to the fifth control method of the present invention.

FIG. 23 is a flowchart showing a control routine of the sixth embodiment according to the fifth control method of the present invention. In the present embodiment, the fifth control method is applied to the fourth embodiment as shown in FIG. 16.

Figure 24:
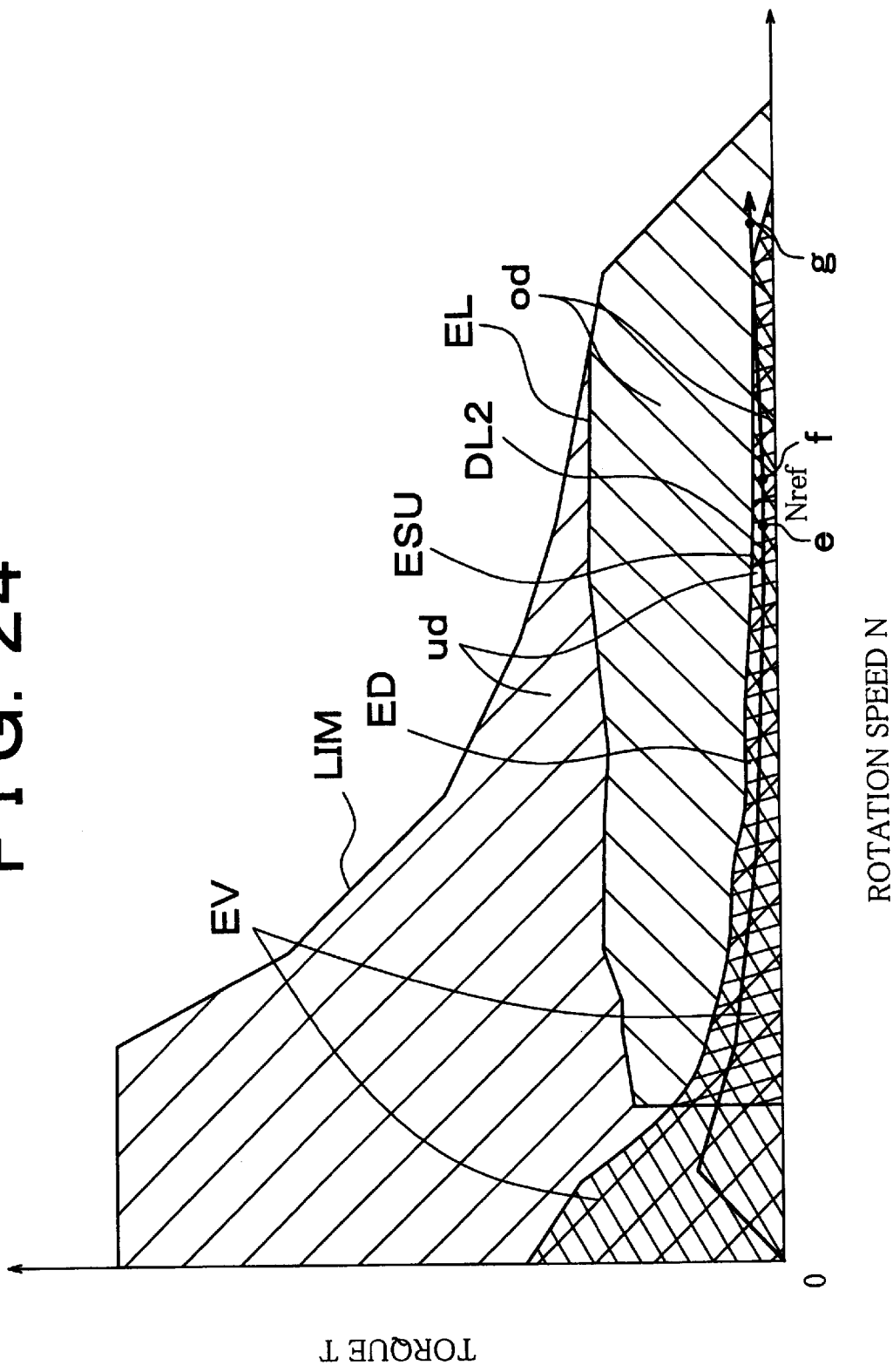
FIG. 24 is a diagram showing EV running region, UD coupling region and OD coupling region in the sixth embodiment.

FIG. 24 is a diagram showing the EV running region, UD coupling region, and OD coupling region in the sixth embodiment. In FIG. 24, the vertical axis, horizontal axis, and respective curves and regions represent the same parameters or contents as those of FIG. 5, and thus will not be explained herein.

In the present embodiment, the ECU 60 performs a control operation according to the control routine as shown in FIG. 23 during a period in which the vehicle starts from rest, and is accelerated at a low rate. During this period, the operating point of the outer rotor shaft 35 of the motor MG1 as the drive shaft follows a path as indicated by curve DL2 in FIG. 24.

As described above, in the above-described fourth control method (fourth embodiment) as shown in FIG. 16, the process of steps S410–S414 as shown in FIG. 16 is repeated unless the operating point of the outer rotor shaft 35 as the drive shaft passes the engine start judgement line ESU and enters the upper right-hand region defined by the judgement line ESU, even where the operating point of the outer rotor shaft 35 has passed the UD/OD region boundary EL and currently lies in the OD region. Thus, although the engine follow-up control is performed, the ECU 60 keeps the vehicle running in the EV mode only by means of the motor MG2 with UD coupling, without effecting switching from UD coupling to OD coupling. In the present embodiment, step S602 as described below, similar to step S502 in FIG. 22, is executed between step S410 and step S412, as shown in FIG. 23.

In step S602, the ECU 60 reads the rotation speed Nmg2 of the motor MG2 from a motor speed sensor (not shown), and determines whether the rotation speed Nmg2 is equal to or higher than a predetermined particular rotation speed Nref or not. If step S602 determines that the rotation speed Nmg2 of the motor MG2 is lower than the particular rotation speed Nref, the control flow goes to step S412 as described above. If step S602 determines that the rotation speed Nmg2 is equal to or higher than the particular rotation speed Nref, on the other hand, the control flow goes to step S604.

If the current operating point of the drive shaft is located at point "e" on curve DL2 as shown in FIG. 24, the rotation speed Nd of the outer rotor shaft 35 as the drive shaft (namely, the rotation speed Nmg2 of the motor MG2) is lower than the particular rotation speed Nref, and the control flow goes to step S412. If the vehicle is accelerated, and the operating point of the drive shaft reaches point "f" on curve DL2, for example, the rotation speed Nd of the outer rotor shaft 35 as the drive shaft (namely, rotation speed Nmg2 of the motor MG2) exceeds the particular rotation speed Nref, and the control flow goes to step S604.

In the present embodiment, the process of steps S604~S612 as shown in FIG. 23 is identical with the process of steps S504~S512 as shown in FIG. 21, and thus will not be explained herein.

It is, however, to be noted that upon switching from UD coupling to OD coupling in step S504 as shown in FIG. 21, the rotation speed of the crankshaft 21 of the engine 20 is controlled to be substantially equal to that of the outer rotor shaft 35 before engagement of the overdrive clutch ODC. In the present embodiment, on the other hand, the rotation speed of the crankshaft 21 of the engine 20 has already been substantially equal to that of the outer rotor shaft 35, owing to the engine follow-up control in step S410, and therefore the overdrive clutch ODC may be immediately engaged in the switchable clutch assembly 50.

Accordingly, the above-described switching method as shown in FIG. 12 is employed in this case.

In the present embodiment as described above, the vehicle runs in the EV mode with UTD coupling when it is started. When the operating point of the drive shaft passes the UD/OD region boundary EL and enters the OD region, no switching from UD coupling to OD coupling is effected though the engine follow-up control is performed, and the vehicle is kept running in the EV mode with UD coupling. If the rotation speed Nmg2 of the motor MG2 becomes equal to or higher than the particular rotation speed Nref, however, switching from UTD coupling to OD coupling is carried out, and thereafter the vehicle runs in the EV mode with OD coupling. If the operating point of the drive shaft further proceeds to pass the engine start judgement line ESU and enters the upper right-hand region defined by the judgement line ESU, fuel begins to be supplied to the engine 20, to thus start the engine 20, and thereafter the vehicle runs in the HV mode with OD coupling.

In the present embodiment, therefore, the entire region on the lower left-hand side of the engine start judgement line ESU, out of the operating region of the power output apparatus 10, provides region EV in which the vehicle runs in the EV mode. In the rest of the operating region, the vehicle runs in the HV mode. Also, in the present embodiment, the UD region and a part of the OD region on the lower left-hand side of the engine start judgement line ESU in which the rotation speed (Nmg2) is lower than the particular rotation speed Nref provides an UD coupling region "ud" in which the UD coupling is actually established, and the rest of the OD region provides an OD coupling region "od" in which the OD coupling is actually established. Furthermore, in the present embodiment, a part of the OD region which is also on the lower left-hand side of the engine start judgement line ESU and in which the rotation speed is lower than the particular rotation speed Nref provides region ED in which the ECU 60 performs engine follow-up control so that the rotation speed of the output shaft of the engine 20 matches that of the drive shaft.

In the present embodiment, if the rotation speed Nmg2 of the motor MG2 becomes equal to or higher than the particular rotation speed Nerf when the ECU 60 runs the vehicle in the EV mode only by means of the motor MG2 with UD coupling while performing the engine follow-up control, switching from UTD coupling to OD coupling is carried out, so that the rotation speed Nd of the drive shaft can be increased to be higher than the rotation speed Nmg2 of the motor MG2. Similarly to the fifth embodiment, therefore, the rotation speed Nd of the drive shaft is not limited to the permissible maximum rotation speed Nmg2max of the motor MG2, and therefore the motor MG2 may consist of a motor whose permissible maximum rotation speed Nmg2max is set at a relatively low value, resulting in reduction in the size and cost of the motor.

In the power output apparatus 10 as shown in FIG. 1, the motor MG1 in the form of a doubled-rotor electric motor is employed as a power adjusting device for increasing or reducing the power generated by the engine 20 by conversion to electric power. The present invention, however, is not limited to this type of power adjusting device, but a combination of a motor MG3 as an ordinary electric motor, rather than a doubled-rotor motor, and a planetary gear train may be used as a power adjusting device.

Figure 25:
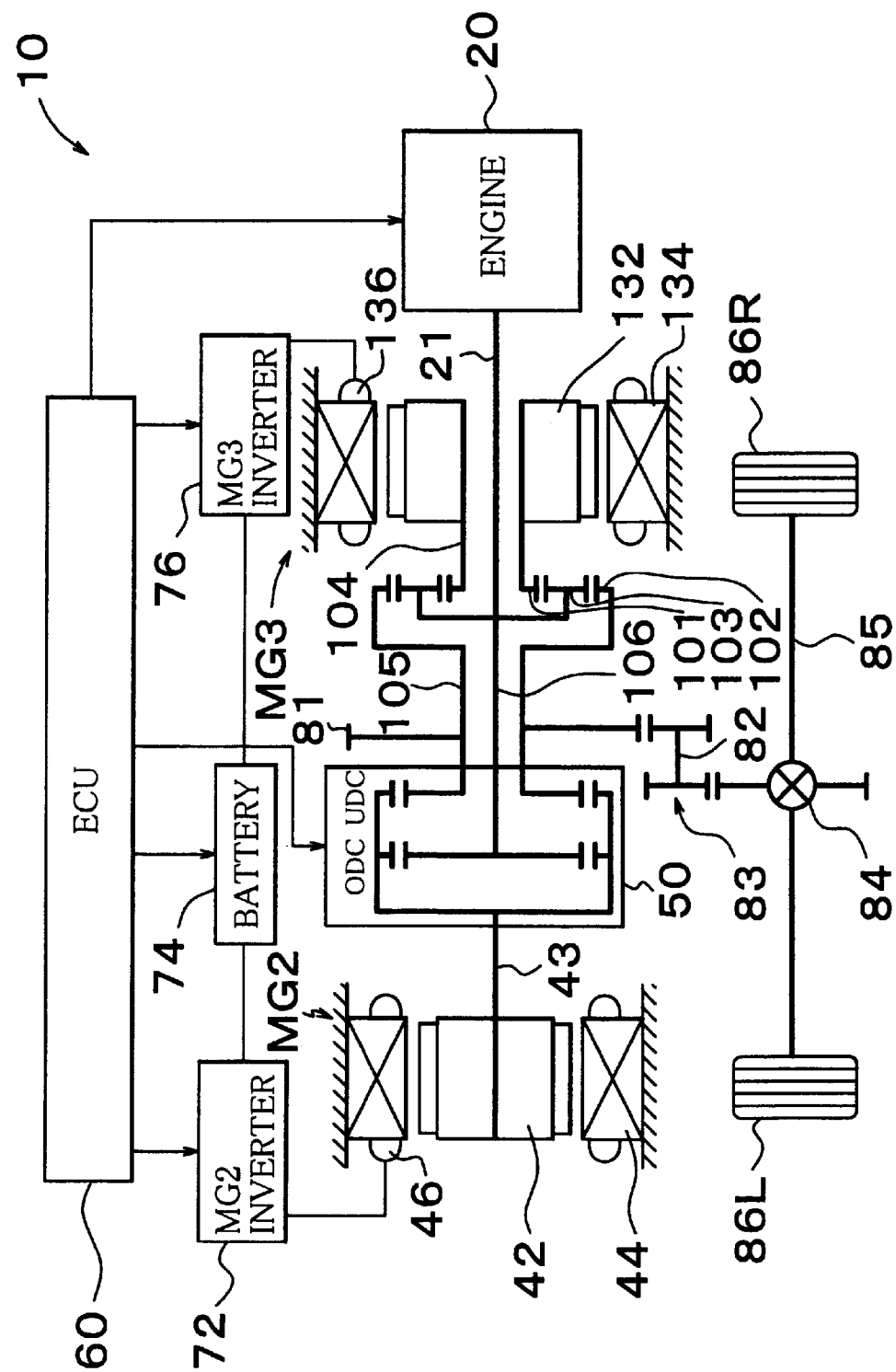
FIG. 25 is a view showing the construction of a modified example of the power output apparatus of FIG. 1.

FIG. 25 shows a modified example of the power output apparatus of FIG. 1. The construction of the modified example is basically identical with that of the power output apparatus as shown in FIG. 1 except that the motor MG3 as an ordinary electric motor and a planetary gear train 100 are used as a power adjusting device in the modified example.

The planetary gear train 100 includes a sun gear 101 that rotates at the center of the gear train, a planetary carrier 103 including a planetary pinion gear that revolves around the sun gear 101 while rotating on its own axis, and a ring gear 102 that rotates around the planetary carrier 103. The sun gear 101, planetary carrier 103 and the ring gear 102 have respective axes of rotation. A sun gear shaft 104 serving as a rotation axis of the sun gear 101 consists of a hollow shaft, and is coupled with the rotor 132 of the motor MG2. A planetary carrier shaft 106 serving as a rotation axis of the planetary carrier 103 is coupled with the crankshaft 21 of the engine 20 via a damper (not shown). A ring gear shaft 105 serving as a rotation axis of the ring gear 102 is a drive shaft, and is coupled with a transmission shaft 82 through an output gear 82. The transmission shaft 82 is in turn coupled with axles 85 provided with drive wheels 86R, 86L, via reduction gears 83 and differential gears 84.

In the planetary gear train 100, the relationships as indicated below are established among the rotation speeds and torques of three shafts, i.e., the sun gear shaft 104, planetary carrier shaft 106 and the ring gear shaft 105, as well known in the art from its mechanism. If the operating states of two rotation axes, out of the above three rotation axes, are determined, therefore, the operating state of the remaining rotation axis is determined based on the following expressions.

$$Ns=(1+\rho)/\rho \times Nc-Nr/\rho$$

$$Nc=\rho/(1+\rho) \times Ns+Nr/(1+\rho)$$

$$Nr=(1+\rho) Nc-\rho Ns$$

$$Ts=Tc \times \rho/(1+\rho)=\rho Tr$$

$$Tr=Tc/(1+\rho)$$

$\rho$=number of teeth of sun gear 101/number of teeth of ring gear 102 (13)

where, Ns is the rotation speed of the sun gear shaft 104, Ts is the torque of the sun gear shaft 104, Nc is the rotation speed of the planetary carrier shaft 106 (i.e., Ne), Tc is the torque of the planetary carrier shaft 106 (i.e., Te), Nr is the rotation speed of the ring gear shaft 105 (i.e., Nd), and Tr is the torque of the ring gear shaft 105 (i.e., Td).

In FIG. 25, the motor MG3 has the same construction as the motor MG2. More specifically, the motor MG3 consists of a three-phase synchronous motor having a stator 134 around which a coil 136 is wound, and a rotor 132 to which a permanent magnet is attached. The stator 134 is fixed to the case. If three-phase alternating current is caused to flow through the coil 136 wound around the stator 134, a rotating magnetic field is produced, which interacts with a magnetic field produced by the permanent magnet attached to the rotor 132, to rotate the rotor 132. If the rotor 132 is rotated by external force, the motor MG3 also functions as a generator for regenerating power due to the external force as electric power. Like the motor MG1 of FIG. 2, the coil 136 wound around the stator 134 of the motor MG3 is electrically connected to the MG3 inverter 70. Thus, the ECU 60 is able to control the operation of the motor MG3 by turning on/off transistors in the MG1 inverter 70.

In this modified example, the motor MG3 as an ordinary electric motor cooperates with the planetary gear train 100 to perform an equivalent function to the motor MG1 in the form of a doubled-rotor electric motor as shown in FIG. 1. The planetary carrier shaft 106 of the planetary gear train 100 is equivalent to the inner rotor shaft 33 of the motor MG1 shown in FIG. 1, and the ring gear shaft 105 is equivalent to the outer rotor shaft 35 as the drive shaft. In this modified example, the combination of the motor MG3 and the planetary gear train 100 functions as a power adjusting device in the manner as described below.

If power is applied from the engine 20 to the planetary carrier shaft 106, the ring gear 102 and the sun gear 101 are rotated according to the expressions (13) as indicated above. It is also possible to stop rotation of either of the ring gear 102 and the sun gear 101. With the ring gear 102 rotated, a part of the power generated by the engine 20 may be transmitted in mechanical form to the ring gear shaft 105 as the drive shaft. With the sun gear 101 rotated, a part of the power generated by the engine 20 may be regenerated as electric power. During power running of the motor MG3, on the other hand, the torque outputted from the motor MG3 can be mechanically transmitted to the ring gear shaft 105 as the drive shaft, through the sun gear 101, planetary gear 103 and the ring gear 102. With power running of the motor MG3, therefore, the torque generated by the engine 20 may be increased and outputted to the ring gear shaft 105 as the drive shaft. Thus, in this modified example, the motor MG3 as an ordinary electric motor cooperates with the planetary gear train 100 to perform substantially the same function as the motor MG1 in the form of a doubled-rotor electric motor as shown in FIG. 1.

In the modified example as described above, the switchable clutch assembly 50 is adapted to switch between a coupling state in which the rotor shaft 43 of the motor MG2 is coupled with the ring gear shaft 105 of the planetary gear train 100, and a coupling state in which the rotor shaft 43 is coupled with the planetary carrier shaft 106. The switchable clutch assembly 50 includes an underdrive clutch UDC and an overdrive clutch ODC. When the underdrive clutch UDC is engaged, the rotor shaft 43 of the motor MG2 is coupled to the ring gear shaft 105 of the planetary gear train 100. When the underdrive clutch UUDC is released, the rotor shaft 43 is uncoupled from the ring gear shaft 105. When the overdrive clutch ODC is engaged, the rotor shaft 43 of the motor MG2 is coupled to the planetary carrier shaft 106 of the planetary gear train 100. When the overdrive clutch ODC is released, the rotor shaft 43 is uncoupled from the planetary carrier shaft 106. These clutches UDC, ODC are adapted to be operated by a hydraulic circuit (not shown).

Thus, UD coupling is established when the underdrive clutch UDC is engaged and the rotor shaft 43 of the motor MG2 is coupled to the ring gear shaft 105 as the drive shaft. When the overdrive clutch ODC is engaged, and the rotor shaft 43 of the motor MG2 is coupled to the planetary carrier shaft 106, the rotor shaft 43 is coupled to the crankshaft 21 of the engine 20 via the planetary carrier shaft 106 and a damper, whereby OD coupling is established.

In the switchable clutch assembly 50, the underdrive clutch UDC and the overdrive clutch ODC may be both brought into the engaged states, as in the case of FIG. 1. In this case, the rotor shaft 43 of the motor MG2 is coupled to both the ring gear shaft 105 and the planetary carrier shaft 106. As a result, the ring gear shaft 105 as the drive shaft and the crankshaft 21 of the engine 20 (planetary carrier shaft 106 of the planetary gear train 100) are mechanically coupled to each other via the switchable clutch assembly 50. To the contrary, the underdrive clutch UDC and the overdrive clutch OC may be both brought into the released states. In this case, the rotor shaft 43 of the motor MG2 is uncoupled from both the ring gear shaft 105 and the crankshaft 21 of the engine 20 (the planetary carrier shaft 106 of the planetary gear train 100).

The operations to switch from UD coupling to OD coupling as described above in the first through sixth embodiments may be performed without any change in the apparatus constructed as described above, and the modified example may yield the same effects as provided in the first through sixth embodiments.

The present invention may also be applied to a four wheel drive vehicle. The power output apparatus 10 as shown in FIG. 1 or FIG. 25 may be provided for front wheels of the vehicle, and another electric motor for driving may be provided for axles of rear wheels, so as to construct a hybrid vehicle capable of four wheel driving. If the present invention is applied to control of the power output apparatus in this type of vehicle, various advantageous effects as described above in the illustrated embodiments can be also obtained.

While some preferred embodiments of the present invention have been described above, the present invention is not limited to details of the illustrated embodiments, but may be otherwise embodied with various modifications, changes or improvements, without departing from the scope of the invention as defined in the appended claims.

In the illustrated embodiments, the switchable clutch assembly 50 is used for switching the coupling state of the rotor shaft 43 of the motor MG2. The switchable clutch assembly 50 may be replaced by a switching device including a first gear coupled with the outer rotor shaft 35 of the motor MG2, a second gear coupled with the inner rotor shaft 33, a first movable gear that is engageable with the first gear, and a second movable gear that is engageable with the second gear. The first movable gear is coupled with a first movable member that is slidably joined to the rotor shaft 43 of the motor MG2 via a spline, and the second movable gear is coupled with a second movable member that is slidably joined to the rotor shaft 43 of the motor MG2 via a spline. With this arrangement, the first and second movable gears are movable independently of each other in the axial direction of the rotor shaft 32 while being rotated with the rotor shaft 43. Thus, the positions of the first and second movable gears as viewed in the axial direction may be changed independently of each other, so that the first movable gear is engaged with or disengaged from the first gear, or the second movable gear is engaged with or disengaged from the second gear. When the first movable gear engages with the first gear, the rotor shaft 43 of the motor MG2 is coupled to the outer rotor shaft 35 of the motor MG2, and UD coupling is established. When the second movable gear engages with the second gear, the rotor shaft 43 of the motor MG2 is coupled to the outer rotor shaft 35 of the motor MG2 (the crankshaft 21 of the engine 20), and OD coupling is established. The switching device is provided with an actuator that operates to drive the first and second movable members, so as to change the positions of the first and second movable gears. The actuator may be provided by a motor, solenoid, or the like, and controlled by the ECU 60.

In the illustrated embodiments, the engine 20 takes the form of a gasoline engine. The present invention, however, may be applied to other reciprocating engines, such as diesel engines, and other types of internal combustion engines or external combustion engines, such as turbine engines, jet engines, and rotary engines.

While PM (Permanent Magnet) type synchronous motors are used as the motors in the illustrated embodiments, other types of motors may also be used. If regenerative operations and power running operations are to be performed, VR (Variable Reluctance) type synchronous motor, vernier motor, d.c. motor, induction motor, superconducting motor and other types of motors may be used. If only power running is to be performed, d.c. motor, step motor and other types of motors may be used.

The relationship between the inner and outer rotors and external rotary shafts may be reversed in the motor MG1 as a doubled-rotor motor as shown in FIG. 1. The outer rotor and inner rotor may also be replaced by disc-like rotors that are opposed to each other.

While transistor inverters are used as the MG1 inverter 70 and MG2 inverter 72 in the illustrated embodiments, other types of inverters may also be used which include IGBT (Insulated Gate Bipolar Transistor) inverters, thyristor inverters, voltage PWM (Pulse Width Modulation) inverters, square-wave inverters (voltage type inverters, current type inverters), and other types of inverters.

While the battery 74 as a secondary battery may consist of a Pb battery, NiMH battery, Li battery, or the like, a capacitor may be used instead of the battery 97. Also, the CPU implements various control processes by executing software programs in the illustrated embodiments, these control processes may be realized by hardware systems.

While the power output apparatus of the present invention is installed on a hybrid vehicle in the illustrated embodiments, the present invention is not limited to this application, but the present power output apparatus may also be installed on other transportation means, such as ships or airplanes, or various types of industrial equipment, such as machine tools.

What is claimed is:

1. A method of controlling a power output apparatus which includes an engine including an output shaft, a drive shaft that outputs power, a power adjusting device that includes a first electric motor and is coupled with the output shaft and the drive shaft, said power adjusting device being capable of adjusting at least the power transmitted to the drive shaft by means of the first electric motor, a second electric motor having a rotary shaft, and a coupling device operable to couple the rotary shaft of the second electric motor to at least one of the drive shaft and the output shaft, said power output apparatus having an operating region represented by the relationship between the torque and the speed of rotation, said operating region being divided by a predetermined boundary into a first region in which the rotary shaft of the second electric motor is coupled with the drive shaft, and a second region in which the rotary shaft of the second electric motor is coupled with the output shaft, said method comprising the steps of:

(a) operating the second electric motor while keeping the engine stopped when an operating point of the drive shaft lies in the first region and the rotary shaft of the second electric motor is coupled with the drive shaft through the coupling device; and (b) when the operating point of the drive shaft passes the boundary and enters the second region, starting fuel supply to the engine so as to start the engine, while at the same time causing the coupling device to switch coupling of the rotary shaft of the second electric motor from a first coupling state in which the rotary shaft is coupled with the drive shaft, to a second coupling state in which the rotary shaft is coupled with the output shaft of the engine.

2. A method according to claim 1, wherein the step (b) comprises the steps of:

starting fuel supply to the engine so as to start the engine when the operating point of the drive shaft passes the boundary and enters the second region;

controlling the first electric motor and the engine so that the rotation speed and torque of the output shaft of the engine become substantially equal to those of the drive shaft after the engine is started; and causing the coupling device to switch coupling of the rotary shaft of the second electric motor from the first coupling state with the drive shaft to the second coupling state with the output shaft, after the rotation speed and torque of the output shaft become substantially equal to those of the drive shaft.

3. A method according to claim 2, wherein the coupling device switches coupling of the rotary shaft of the second electric motor from the first coupling state with the drive shaft to the second coupling state with the output shaft of the engine, by coupling the rotary shaft of the second electric motor to the output shaft while maintaining coupling of the rotary shaft of the second electric motor with the drive shaft, and subsequently uncoupling the rotary shaft of the second electric motor from the drive shaft.

4. A method according to claim 2, wherein the coupling device switches coupling of the rotary shaft of the second electric motor from the first coupling state with the drive shaft to the second coupling state with the output shaft of the engine, by uncoupling the rotary shaft of the second electric motor from the drive shaft, and subsequently coupling the rotary shaft of the second electric motor to the output shaft.

5. A method according to claim 1, wherein the step (b) comprises the steps of:

controlling the first electric motor and the engine so that the rotation speed and torque of the output shaft become substantially equal to those of the drive shaft when the operating point of the drive shaft passes the boundary and enters the second region;

causing the coupling device to switch coupling of the rotary shaft of the second electric motor from the first coupling state with the drive shaft to the second coupling state with the output shaft, after the rotation speed and torque of the output shaft become substantially equal to those of the drive shaft; and starting fuel supply to the engine so as to start the engine after switching to the second coupling state in which the rotary shaft of the second electric motor is coupled with the output shaft.

6. A method according to claim 2, wherein the coupling device switches coupling of the rotary shaft of the second electric motor from the first coupling state with the drive shaft to the second coupling state with the output shaft of the engine, by coupling the rotary shaft of the second electric motor to the output shaft while maintaining coupling of the rotary shaft of the second electric motor with the drive shaft, and subsequently uncoupling the rotary shaft of the second electric motor from the drive shaft.

7. A method according to claim 1, wherein said power adjusting device comprises a doubled-rotor motor as said first electric motor, said doubled-rotor motor including a first rotor coupled to the output shaft and a second rotor coupled to the drive shaft.

8. A method according to claim 1, wherein said power adjusting device comprises a planetary gear train in addition to the first electric motor, said planetary gear train including three rotary shafts that are respectively coupled to the output shaft, the drive shaft, and the rotary shaft of the first electric motor.

9. A method of controlling a power output apparatus which includes an engine including an output shaft, a drive shaft that outputs power, a power adjusting device that includes a first electric motor and is coupled with the output shaft and the drive shaft, said power adjusting device being capable of adjusting at least the power transmitted to the drive shaft by means of the first electric motor, a second electric motor having a rotary shaft, and a coupling device operable to couple the rotary shaft of the second electric motor to at least one of the drive shaft and the output shaft, said power output apparatus having an operating region represented by the relationship between the torque and the speed of rotation, said operating region being divided by a predetermined boundary into a first region in which the rotary shaft of the second electric motor is coupled with the drive shaft, and a second region in which the rotary shaft of the second electric motor is coupled with the output shaft, said method comprising the steps of:

(a) operating the second electric motor while keeping the engine stopped so that the second electric motor outputs driving torque to the drive shaft when an operating point of the drive shaft lies in the first region and the rotary shaft of the second electric motor is coupled with the drive shaft through the coupling device;

(b) causing the coupling device to switch coupling of the rotary shaft of the second electric motor from a first coupling state in which the rotary shaft is coupled with the drive shaft, to a second coupling state in which the rotary shaft is coupled with the output shaft of the engine, when the operating point of the drive shaft passes the boundary and enters the second region;

(c) after switching to the second coupling state in which the rotary shaft of the second electric motor is coupled with the output shaft of the engine, causing the first electric motor to output driving torque to the drive shaft, instead of the second electric motor, while causing the second electric motor to cancel reactive torque generated by the first electric motor at the output shaft.

10. A method according to claim 9, wherein the step (b) comprises the steps of:

controlling the first electric motor so that the rotation speed and torque of the output shaft become substantially equal to those of the drive shaft when the operating point of the drive shaft passes the boundary and enters the second region; and causing the coupling device to switch coupling of the rotary shaft of the second electric motor from the first coupling state with the drive shaft to the second coupling state with the output shaft, after the rotation speed and torque of the output shaft become substantially equal to those of the drive shaft.

11. A method according to claim 10, wherein the coupling device switches coupling of the rotary shaft of the second electric motor from the first coupling state with the drive shaft to the second coupling state with the output shaft of the engine, by coupling the rotary shaft of the second electric motor to the output shaft while maintaining coupling of the rotary shaft of the second electric motor with the drive shaft, and subsequently uncoupling the rotary shaft of the second electric motor from the drive shaft.

12. A method according to claim 9, wherein the coupling device switches coupling of the rotary shaft of the second electric motor from the first coupling state with the drive shaft to the second coupling state with the output shaft of the engine, by coupling the rotary shaft of the second electric motor to the output shaft while maintaining coupling of the rotary shaft of the second electric motor with the drive shaft, and subsequently uncoupling the rotary shaft of the second electric motor from the drive shaft.

13. A method according to claim 9, wherein said power adjusting device comprises a doubled-rotor motor as said first electric motor, said doubled-rotor motor including a first rotor coupled to the output shaft and a second rotor coupled to the drive shaft.

14. A method according to claim 9, wherein said power adjusting device comprises a planetary gear train in addition to the first electric motor, said planetary gear train including three rotary shafts that are respectively coupled to the output shaft, the drive shaft, and the rotary shaft of the first electric motor.

15. A method of controlling a power output apparatus which includes an engine including an output shaft, a drive shaft that outputs power, a power adjusting device that includes a first electric motor and is coupled with the output shaft and the drive shaft, said power adjusting device being capable of adjusting at least the power transmitted to the drive shaft by means of the first electric motor, a second electric motor having a rotary shaft, and a coupling device operable to couple the rotary shaft of the second electric motor to at least one of the drive shaft and the output shaft, said power output apparatus having an operating region represented by the relationship between the torque and the speed of rotation, said operating region being divided by a predetermined boundary into a first region in which the rotary shaft of the second electric motor is coupled with the drive shaft, and a second region in which the rotary shaft of the second electric motor is coupled with the output shaft, said method comprising the steps of:

(a) operating the second electric motor while keeping the engine stopped when an operating point of the drive shaft lies in the first region and the rotary shaft of the second electric motor is coupled with the drive shaft through the coupling device;

(b) when the operating point of the drive shaft passes the boundary and enters the second region, keeping the rotary shaft of the second electric motor coupled with the drive shaft through the coupling device, and operating the second electric motor while keeping the engine stopped; and (c) when a target power to be outputted from the drive shaft satisfies a predetermined condition, starting fuel supply to the engine so as to start the engine, and causing the coupling device to switch from a first coupling state in which the rotary shaft of the second electric motor is coupled with the drive shaft, to a second coupling state in which the rotary shaft is coupled with the output shaft of the engine.

16. A method according to claim 15, wherein the step (c) comprises the steps of:

starting fuel supply to the engine so as to start the engine when the target power satisfies the predetermined condition;

controlling the first electric motor and the engine so that the rotation speed and torque of the output shaft of the engine become substantially equal to those of the drive shaft after the engine is started; and causing the coupling device to switch coupling of the rotary shaft of the second electric motor from the first coupling state to the second coupling state, after the rotation speed and torque of the output shaft become substantially equal to those of the drive shaft.

17. A method according to claim 16, wherein, the coupling device switches coupling of the rotary shaft of the second electric motor from the first coupling state with the drive shaft to the second coupling state with the output shaft of the engine, by coupling the rotary shaft of the second electric motor to the output shaft while maintaining coupling of the rotary shaft of the second electric motor with the drive shaft, and subsequently uncoupling the rotary shaft of the second electric motor from the drive shaft.

18. A method according to claim 16, wherein the coupling device switches coupling of the rotary shaft of the second electric motor from the first coupling state with the drive shaft to the second coupling state with the output shaft of the engine, by uncoupling the rotary shaft of the second electric motor from the drive shaft, and subsequently coupling the rotary shaft of the second electric motor to the output shaft.

19. A method according to claim 15, wherein the step (c) comprises the steps of:

controlling the first electric motor so that the rotation speed of the output shaft of the engine becomes substantially equal to that of the drive shaft when the target power satisfies the predetermined condition;

causing the coupling device to switch coupling of the rotary shaft of the second electric motor from the first coupling state to the second coupling state, after the rotation speed of the output shaft of the engine becomes substantially equal to that of the drive shaft; and starting fuel supply to the engine so as to start the engine after switching to the second coupling state in which the rotary shaft of the second electric motor is coupled with the rotary shaft.

20. A method according to claim 19, wherein the coupling device switches coupling of the rotary shaft of the second electric motor from the first coupling state with the drive shaft to the second coupling state with the output shaft of the engine, by coupling the rotary shaft of the second electric motor to the output shaft while maintaining coupling of the rotary shaft of the second electric motor with the drive shaft, and subsequently uncoupling the rotary shaft of the second electric motor from the drive shaft.

21. A method according to claim 15, further comprising the step of:

(d) causing the coupling device to switch coupling of the rotary shaft of the second electric motor from the first coupling state with the drive shaft to the second coupling state with the output shaft when the rotation speed of the rotary shaft of the second electric motor exceeds a predetermined speed.

22. A method according to claim 21, wherein the step (d) comprises the steps of:

controlling the first electric motor so that the rotation speed of the output shaft of the engine becomes substantially equal to that of the drive shaft when the rotation speed of the rotary shaft of the second electric motor exceeds the predetermined speed; and causing the coupling device to switch coupling of the rotary shaft of the second electric motor from the first coupling state with the drive shaft to the second coupling state with the output shaft after the rotation speed of the output shaft becomes substantially equal to that of the drive shaft.

23. A method according to claim 15, wherein said power adjusting device comprises a doubled-rotor motor as said first electric motor, said doubled-rotor motor including a first rotor coupled to the output shaft and a second rotor coupled to the drive shaft.

24. A method according to claim 15, wherein said power adjusting device comprises a planetary gear train in addition to the first electric motor, said planetary gear train including three rotary shafts that are respectively coupled to the output shaft, the drive shaft, and the rotary shaft of the first electric motor.

25. A method of controlling a power output apparatus which includes an engine including an output shaft, a drive shaft that outputs power, a power adjusting device that includes a first electric motor and is coupled with the output shaft and the drive shaft, said power adjusting device being capable of adjusting at least the power transmitted to the drive shaft by means of the first electric motor, a second electric motor having a rotary shaft, and a coupling device operable to couple the rotary shaft of the second electric motor to at least one of the drive shaft and the output shaft, said power output apparatus having an operating region represented by the relationship between the torque and the speed of rotation, said operating region being divided by a predetermined boundary into a first region in which the rotary shaft of the second electric motor is coupled with the drive shaft, and a second region in which the rotary shaft of the second electric motor is coupled with the output shaft, said method comprising the steps of:

(a) operating the second electric motor while keeping the engine stopped when an operating point of the drive shaft lies in the first region and the rotary shaft of the second electric motor is coupled with the drive shaft through the coupling device;

(b) keeping the rotary shaft of the second electric motor coupled with the drive shaft through the coupling device, and operating the second electric motor while keeping the engine stopped, when the operating point of the drive shaft passes the boundary and enters the second region;

(c) controlling the first electric motor so that the rotation speed of the output shaft of the engine becomes substantially equal to that of the drive shaft when the operating point of the drive shaft passes the boundary and enters the second region; and (d) when a target power to be outputted from the drive shaft satisfies a predetermined condition after the rotation speed of the output shaft of the engine is made substantially equal to that of the drive shaft, starting fuel supply to the engine so as to start the engine, and causing the coupling device to switch from a first coupling state in which the rotary shaft of the second electric motor is coupled with the drive shaft, to a second coupling state in which the rotary shaft is coupled with the output shaft of the engine.

26. A method according to claim 25, wherein the step (d) comprises the steps of:

starting fuel supply to the engine so as to start the engine when the target power satisfies the predetermined condition; and causing the coupling device to switch coupling of the rotary shaft of the second electric motor from the first coupling state to the second coupling state after the engine is started.

27. A method according to claim 26, wherein, the coupling device switches coupling of the rotary shaft of the second electric motor from the first coupling state with the drive shaft to the second coupling state with the output shaft of the engine, by coupling the rotary shaft of the second electric motor to the output shaft while maintaining coupling of the rotary shaft of the second electric motor with the drive shaft, and subsequently uncoupling the rotary shaft of the second electric motor from the drive shaft.

28. A method according to claim 26, wherein the coupling device switches coupling of the rotary shaft of the second electric motor from the first coupling state with the drive shaft to the second coupling state with the output shaft of the engine, by uncoupling the rotary shaft of the second electric motor from the drive shaft, and subsequently coupling the rotary shaft of the second electric motor to the output shaft.

29. A method according to claim 25, wherein the step (d) comprises the steps of:

causing the coupling device to switch coupling of the rotary shaft of the second electric motor from the first coupling state to the second coupling state when the target power satisfies the predetermined condition; and starting fuel supply to the engine so as to start the engine after switching to the second coupling state in which the rotary shaft of the second electric motor is coupled with the output shaft of the engine.

30. A method according to claim 29, wherein the coupling device switches coupling of the rotary shaft of the second electric motor from the first coupling state with the drive shaft to the second coupling state with the output shaft of the engine, by coupling the rotary shaft of the second electric motor to the output shaft while maintaining coupling of the rotary shaft of the second electric motor with the drive shaft, and subsequently uncoupling the rotary shaft of the second electric motor from the drive shaft.

31. A method according to claim 25, further comprising the step of:

(e) causing the coupling device to switch coupling of the rotary shaft of the second electric motor from the first coupling state with the drive shaft to the second coupling state with the output shaft when the rotation speed of the rotary shaft of the second electric motor exceeds a predetermined speed.

32. A method according to claim 25, wherein said power adjusting device comprises a doubled-rotor motor as said first electric motor, said doubled-rotor motor including a first rotor coupled to the output shaft and a second rotor coupled to the drive shaft.

33. A method according to claim 25, wherein said power adjusting device comprises a planetary gear train in addition to the first electric motor, said planetary gear train including three rotary shafts that are respectively coupled to the output shaft, the drive shaft, and the rotary shaft of the first electric motor.

34. A method of controlling a power output apparatus which includes an engine including an output shaft, a drive shaft that outputs power, a power adjusting device that includes a first electric motor and is coupled with the output shaft and the drive shaft, said power adjusting device being capable of adjusting at least the power transmitted to the drive shaft by means of the first electric motor, a second electric motor having a rotary shaft, and a coupling device operable to couple the rotary shaft of the second electric motor to at least one of the drive shaft and the output shaft, said power output apparatus having an operating region represented by the relationship between the torque and the speed of rotation, said operating region being divided by a predetermined boundary into a first region in which the rotary shaft of the second electric motor is coupled with the drive shaft, and a second region in which the rotary shaft of the second electric motor is coupled with the output shaft, said method comprising the steps of:

(a) operating the second electric motor while keeping the engine stopped when an operating point of the drive shaft lies in the first region and the rotary shaft of the second electric motor is coupled with the drive shaft through the coupling device; and (b) causing the coupling device to switch from a first coupling state in which the rotary shaft of the second electric motor is coupled with the drive shaft, to a second coupling state in which the rotary shaft is coupled with the output shaft of the engine, when the rotation speed of the rotary shaft of the second electric motor exceeds a predetermined speed.

35. A method according to claim 34, wherein the coupling device switches coupling of the rotary shaft of the second electric motor from the first coupling state with the drive shaft to the second coupling state with the output shaft of the engine, by coupling the rotary shaft of the second electric motor to the output shaft while maintaining coupling of the rotary shaft of the second electric motor with the drive shaft, and subsequently uncoupling the rotary shaft of the second electric motor from the drive shaft.

36. A method according to claim 34, wherein the coupling device switches coupling of the rotary shaft of the second electric motor from the first coupling state with the drive shaft to the second coupling state with the output shaft of the engine, by uncoupling the rotary shaft of the second electric motor from the drive shaft, and subsequently coupling the rotary shaft of the second electric motor to the output shaft.

37. A method according to claim 34, wherein said power adjusting device comprises a doubled-rotor motor as said first electric motor, said doubled-rotor motor including a first rotor coupled to the output shaft and a second rotor coupled to the drive shaft.

38. A method according to claim 34, wherein said power adjusting device comprises a planetary gear train in addition to the first electric motor, said planetary gear train including three rotary shafts that are respectively coupled to the output shaft, the drive shaft, and the rotary shaft of the first electric motor.

* * * * *